US012672031B2

(12) United States Patent
Palermo et al.

(10) Patent No.: US 12,672,031 B2
(45) Date of Patent: Jun. 30, 2026

(54) 5G TERRESTRIAL NETWORK ZONES

(71) Applicant: Intel Corporation, Santa Clara, CA (US)

(72) Inventors: Stephen T. Palermo, Chandler, AZ (US); Valerie J. Parker, Portland, OR (US); Jason K. Smith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/122,413

(22) Filed: Mar. 16, 2023

(65) Prior Publication Data

US 2023/0239740 A1 Jul. 27, 2023

Related U.S. Application Data

(60) Provisional application No. 63/320,432, filed on Mar. 16, 2022, provisional application No. 63/412,743, filed on Oct. 3, 2022.

(51) Int. Cl.
| | |
|---|---|
| *H04W 28/18* | (2009.01) |
| *H04W 16/28* | (2009.01) |
| *H04W 64/00* | (2009.01) |

(52) U.S. Cl.
CPC .......... *H04W 28/18* (2013.01); *H04W 16/28* (2013.01); *H04W 64/00* (2013.01)

(58) Field of Classification Search
CPC ...... H04W 28/18; H04W 16/28; H04W 64/00
See application file for complete search history.

(56) References Cited

U.S. PATENT DOCUMENTS

| | | | | |
|---|---|---|---|---|
| 2016/0242098 A1* | 8/2016 | Tsukamoto | ........... | H04W 40/20 |
| 2017/0270803 A1* | 9/2017 | High | ......................... | G08G 5/55 |
| 2023/0145081 A1* | 5/2023 | Schuh | .................... | H01Q 1/246 |
| | | | | 343/705 |
| 2023/0292221 A1* | 9/2023 | Ozturk | .................. | H04W 24/08 |

\* cited by examiner

*Primary Examiner* — Justin Y Lee
(74) *Attorney, Agent, or Firm* — Schwegman Lundberg & Woessner, P.A.

(57) ABSTRACT

Various approaches for the deployment and coordination of terrestrial cellular (e.g., 5G) network exclusion or mitigation zone, for the dynamic deployment of radio frequency blocking for in-motion aerial devices are described. Approaches are also described for a space-based non-terrestrial network exclusion or mitigation zone, including for maintenance or multi-constellation/multi-orbit coordination. The calculation, distribution, deployment and use of exclusion and inclusion zones are described for coordination with such a terrestrial cellular network or non-terrestrial satellite network.

21 Claims, 38 Drawing Sheets

SET EZ/IZ/MZ (OUTPUT IMPACTING TN ZONE)

810A   *DISABLE FREQUENCIES IN ANTENNA ON A RADIO*

| BSn.ID.NAME | ... | BSn.ANTENNAn.TOGGLE | BSn.ANTENNA1.TOGGLE | BSn.ANTn.FREQn.TOGGLE | | |
| --- | --- | --- | --- | --- | --- | --- |
| | | | | BSn.ANT1.FREQ1 | BSn.ANT1.FREQ2 | BSn.ANT1.FREQ3 |
| BS1 | | | | ENABLE | ENABLE | ENABLE |
| BS2 | | | | ENABLE | ENABLE | ENABLE |
| ... | | | | ... | ... | ... |
| BS7 | | | | ENABLE | VALUE1 | ENABLE |
| BS8 | | | | ENABLE | ENABLE | ENABLE |
| ... | | | | ... | ... | ... |
| BS22 | | | | ENABLE | VALUE2 | ENABLE |
| BS23 | | | | ENABLE | ENABLE | ENABLE |
| ... | | | | ... | ... | ... |

820A   VALUE 1:
FREQ2= 3.7-3.8
BS7.ANTENNA1.3.7-3.8.DISABLE
START 2021-03-03 21:43:56
END 2021-03-03 21:45:06

820B   VALUE 2:
FREQ2= 3.7-3.8
BS22.ANTENNA1.3.7-3.8.DISABLE
START 2021-03-03 21:43:56
END 2021-03-03 21:45:06

*FIG. 8A*

SET EZ/IZ/MZ (OUTPUT IMPACTING TN ZONE)

810B — *DISABLE FREQUENCIES IN ANTENNA ON A RADIO*

| BSn.ID.NAME ... | BSn.ANTENNA2.TOGGLE | BSn.ANTn.FREQn.TOGGLE BSn.ANT2.FREQ1 | BSn.ANT2.FREQ2 | BSn.ANT2.FREQ3 |
|---|---|---|---|---|
| BS1 | | ENABLE | ENABLE | ENABLE |
| BS2 | | ENABLE | ENABLE | ENABLE |
| ... | | ... | ... | ... |
| BS7 | | ENABLE | VALUE1 | ENABLE |
| BS8 | | ENABLE | ENABLE | ENABLE |
| ... | | ... | ... | ... |
| BS22 | | ENABLE | VALUE2 | ENABLE |
| BS23 | | ENABLE | ENABLE | ENABLE |
| ... | | ... | ... | ... |

820C —
VALUE 1:
FREQ2= 3.7-3.8
BS7.ANTENNA2.3.7-3.8.DISABLE
START 2021-03-03 21:43:56
END 2021-03-03 21:45:06

820D —
VALUE 2:
FREQ2= 3.7-3.8
BS22.ANTENNA2.3.7-3.8.DISABLE
START 2021-03-03 21:43:56
END 2021-03-03 21:45:06

1222 — Determine Aerial Device in zone (EZ/IZ/MZ)

1224 — Adjust Cell Characteristic(s) to limit Uplink Terrestrial Communication with the Aerial Device 1226 — Store Operation Times Of Use (and Definition) of EZ / IZ / MZ

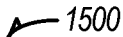
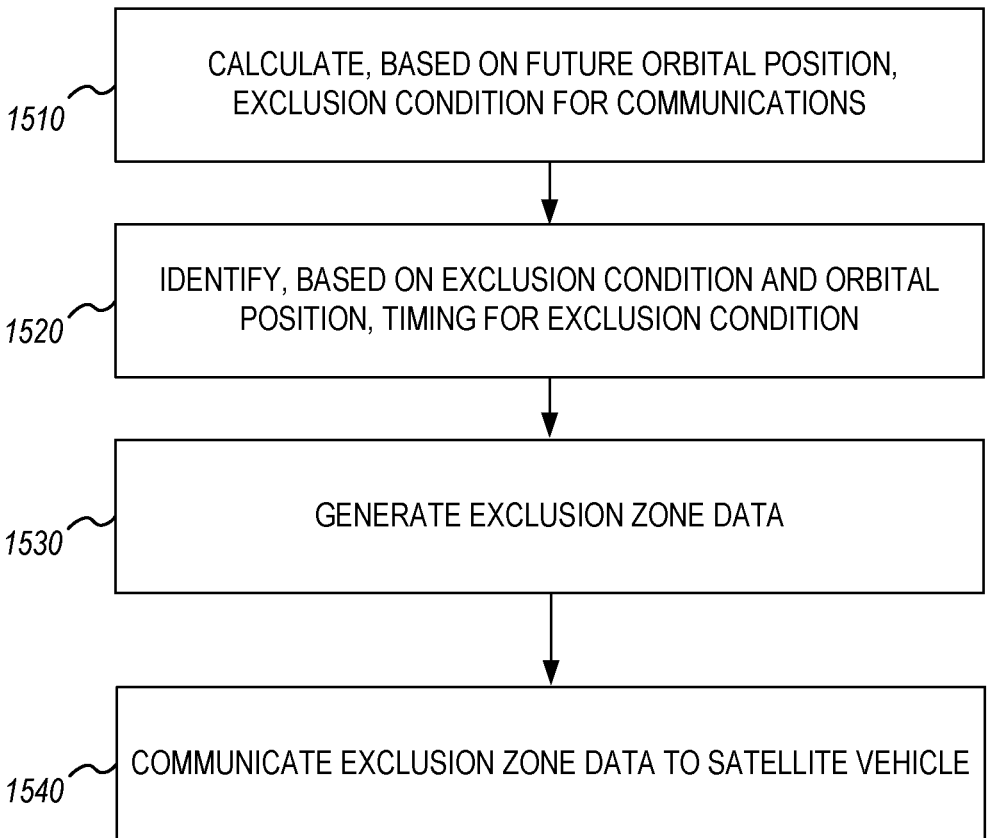
1510 — CALCULATE, BASED ON FUTURE ORBITAL POSITION, EXCLUSION CONDITION FOR COMMUNICATIONS
1520 — IDENTIFY, BASED ON EXCLUSION CONDITION AND ORBITAL POSITION, TIMING FOR EXCLUSION CONDITION
1530 — GENERATE EXCLUSION ZONE DATA
1540 — COMMUNICATE EXCLUSION ZONE DATA TO SATELLITE VEHICLE
*FIG. 15*

Top View

| SAT | Antenna | Time |
|-----|---------|------|
| 7 | 7f, 7l, 7a, 7f | X-X' |
| 8 | 8l | X-X' |

SET EZ (OUTPUT PER CONSTELLATION)

*DISABLE DIFFERENT FREQUENCY IN DIFFERENT SPOTBEAMS*

| SVn.ID.NAME | SVn.SPOTn.TOGGLE | SVn.SPOT1.TOGGLE | SVn.SPOTn.FREQn.TOGGLE | | |
| --- | --- | --- | --- | --- | --- |
| | | | SVn.SPOT1.FREQ1 | SVn.SPOT1.FREQ2 | SVn.SPOT1.FREQ3 |
| SV1 | | ENABLE | ENABLE | ENABLE | ENABLE |
| SV2 | | ENABLE | ENABLE | ENABLE | ENABLE |
| SV3 | | ENABLE | ENABLE | ENABLE | ENABLE |
| SV4 | | ENABLE | ENABLE | ENABLE | ENABLE |
| SV5 | | ENABLE | ENABLE | ENABLE | ENABLE |
| SV6 | | ENABLE | ENABLE | ENABLE | ENABLE |
| SV7 | | ENABLE | ENABLE | VALUE1 | ENABLE |
| SV8 | | ENABLE | ENABLE | ENABLE | ENABLE |
| SV9 | | ENABLE | ENABLE | ENABLE | ENABLE |
| ... | ... | ... | ... | ... | ... |

1810A

1820A

VALUE 1:
SV7.SPOT1.FREQ2.DISABLE
START 2021-03-03 21:43:56;
STOP 2021-03-03 21:45:06;

*FIG. 18A*

SET EZ (OUTPUT PER CONSTELLATION)

1810B   *DISABLE ALL FREQUENCIES OF SPOTBEAMS*

| SVn.ID.NAME | ... | SVn.SPOT2.TOGGLE | SVn.SPOTn.FREQn.TOGGLE | | |
|---|---|---|---|---|---|
| | | | SVn.SPOT2.FREQ1 | SVn.SPOT2.FREQ2 | SVn.SPOT2.FREQ3 |
| SV1 | | | ENABLE | ENABLE | ENABLE |
| SV2 | | | ENABLE | ENABLE | ENABLE |
| SV3 | | | ENABLE | ENABLE | ENABLE |
| SV4 | | | ENABLE | ENABLE | ENABLE |
| ... | | | ... | ... | ... |
| SV12 | | | ENABLE | ENABLE | ENABLE |
| SV13 | | | VALUE2 | VALUE2 | VALUE2 |
| SV14 | | | ENABLE | ENABLE | ENABLE |
| SV15 | | | ENABLE | ENABLE | ENABLE |
| ... | | | ... | ... | ... |

1820B   VALUE 2:
SV13.SPOT2.DISABLE
START 2021-05-04 22:43:56;
STOP 2021-05-04 22:46:06;

*FIG. 18B*

SET EZ (OUTPUT PER CONSTELLATION)

1810C — *DISABLE INTER-SATELLITE LINKS PER DIRECTION*

| SVn.ID.NAME | ... | | SVn.ISL.FORE | SVn.ISL.AFT | SVn.ISL.RIGHT | SVn.ISL.LEFT | |
|---|---|---|---|---|---|---|---|
| SV1 | | | ENABLE | ENABLE | ENABLE | ENABLE | |
| .. | | | ... | ... | ... | ... | |
| SV15 | | | ENABLE | ENABLE | ENABLE | ENABLE | |
| SV16 | | | ENABLE | VALUE5 | ENABLE | ENABLE | |
| SV17 | | | ENABLE | ENABLE | VALUE6 | ENABLE | |
| SV18 | | | ENABLE | ENABLE | ENABLE | VALUE8 | |
| SV19 | | | VALUE3 | ENABLE | VALUE7 | ENABLE | |
| SV20 | | | ENABLE | ENABLE | ENABLE | ENABLE | |
| SV21 | | | VALUE4 | VALUE4 | VALUE4 | VALUE4 | |
| SV22 | | | ENABLE | ENABLE | ENABLE | ENABLE | |
| ... | | | ... | ... | ... | ... | |

1820C — VALUE 3:
SV19.ISL.FORE.DISABLE
START 2021-05-04 22:43:56;
STOP 2021-05-04 22:46:06;

1820D — VALUE 4:
SV21.ISL.{FORE, AFT, RIGHT, LEFT}.DISABLE
START 2021-05-04 22:43:56;
STOP 2021-05-04 22:46:06;

1820E — VALUE 5:
SV16.ISL.AFT.DISABLE
START 2021-05-04 22:43:56;
STOP 2021-05-04 22:46:06;

1820F — VALUE 6:
SV17.ISL.RIGHT.DISABLE
START 2021-05-04 22:43:56;
STOP 2021-05-04 22:46:06;

1820G — VALUE 7:
SV19.ISL.RIGHT.DISABLE
START 2021-05-04 22:43:56;
STOP 2021-05-04 22:46:06;

1820H — VALUE 8:
SV18.ISL.LEFT.DISABLE
START 2021-05-04 22:43:56;
STOP 2021-05-04 22:46:06;

*FIG. 18C*

Figure 18D:
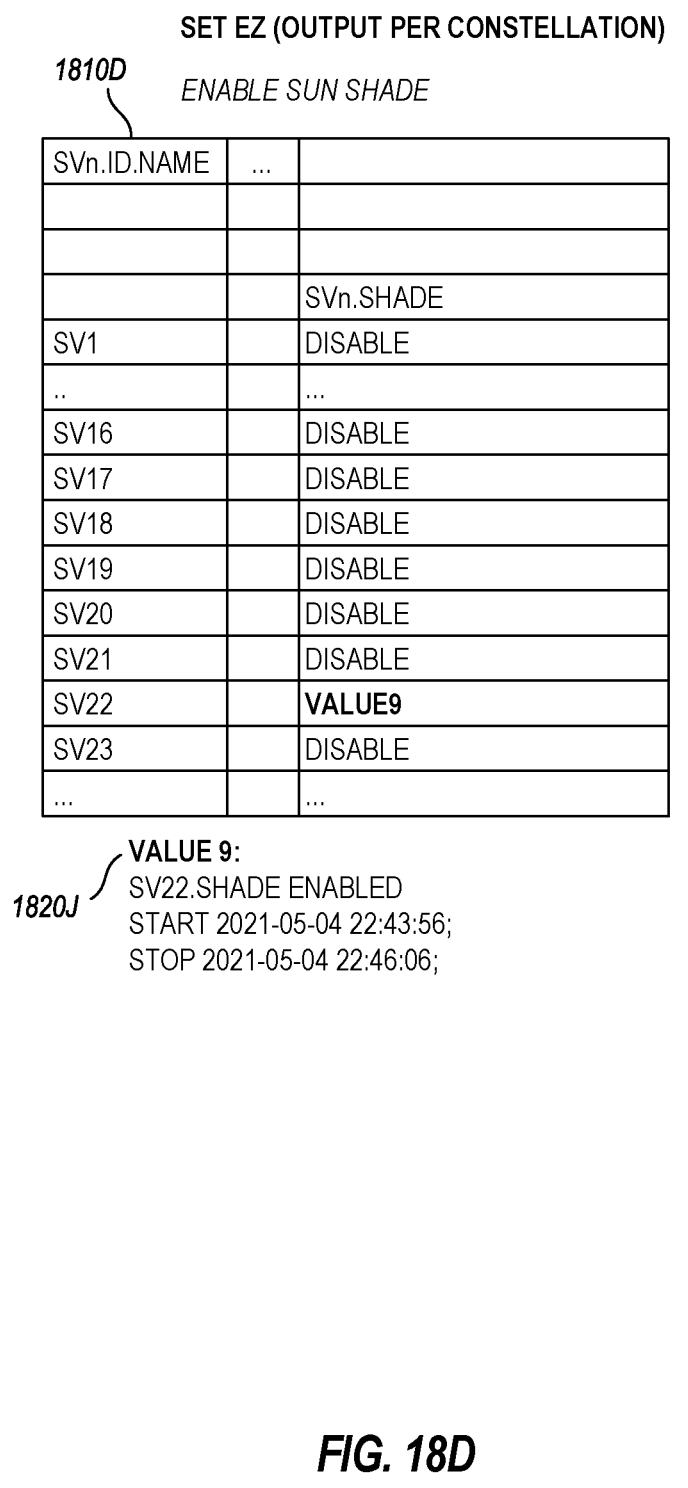

SET EZ (OUTPUT PER CONSTELLATION)

*1810D*

*ENABLE SUN SHADE*

| SVn.ID.NAME | ... | |
|---|---|---|
| | | |
| | | |
| | | SVn.SHADE |
| SV1 | | DISABLE |
| .. | | ... |
| SV16 | | DISABLE |
| SV17 | | DISABLE |
| SV18 | | DISABLE |
| SV19 | | DISABLE |
| SV20 | | DISABLE |
| SV21 | | DISABLE |
| SV22 | | VALUE9 |
| SV23 | | DISABLE |
| ... | | ... |

VALUE 9:
SV22.SHADE ENABLED
*1820J*    START 2021-05-04 22:43:56;
STOP 2021-05-04 22:46:06;

☑ KEEP Inter-Satellite Links (ISLs)
☒ BLOCK SPOT/FREQ Signal(s)
☑ KEEP Light Reflections OK Prevent NGOS Interference w/Terrestrial
*POWER FLUX DENSITY LIMITS- / 22.2, M.1583*

1910A

☑ KEEP Inter-Satellite Links (ISLs)
☒ BLOCK SPOT/FREQ Signal(s)
☑ KEEP Light Reflections OK Prevent NGOS Interference w/Terrestrial
*POWER FLUX DENSITY LIMITS- / 22.2, M.1583*

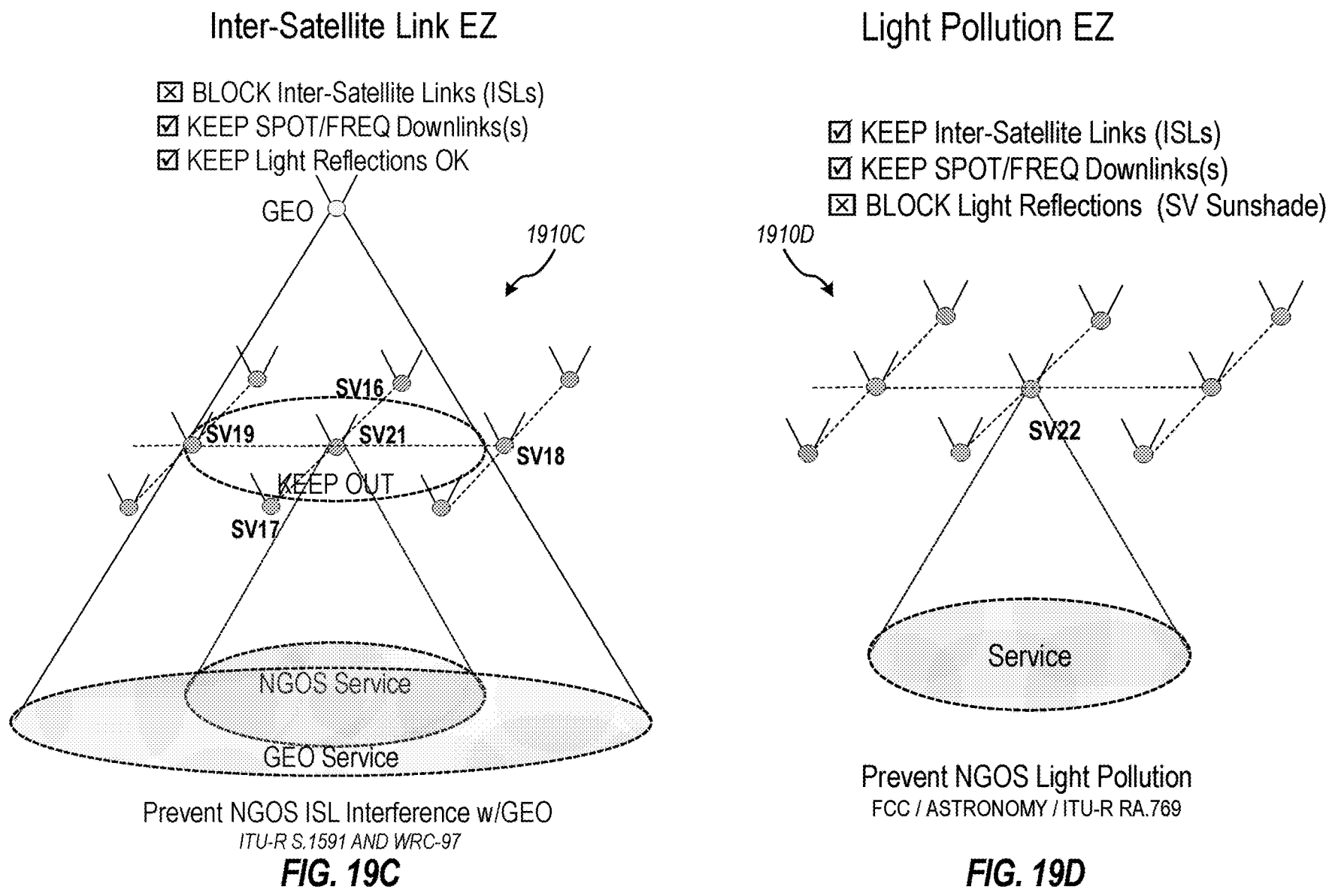

Light Pollution EZ

☑ KEEP Inter-Satellite Links (ISLs)
☑ KEEP SPOT/FREQ Downlinks(s)
☒ BLOCK Light Reflections (SV Sunshade)

SV22

Service

1910D

Prevent NGOS Light Pollution
FCC / ASTRONOMY / ITU-R RA.769

*FIG. 19D*

Inter-Satellite Link EZ

☒ BLOCK Inter-Satellite Links (ISLs)
☑ KEEP SPOT/FREQ Downlinks(s)
☑ KEEP Light Reflections OK

1910C

GEO

SV18

SV16

SV21

SV19

SV18

KEEP OUT

SV17

NGOS Service

GEO Service

Prevent NGOS ISL Interference w/GEO
ITU-R S.1591 AND WRC-97

*FIG. 19C*

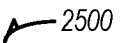
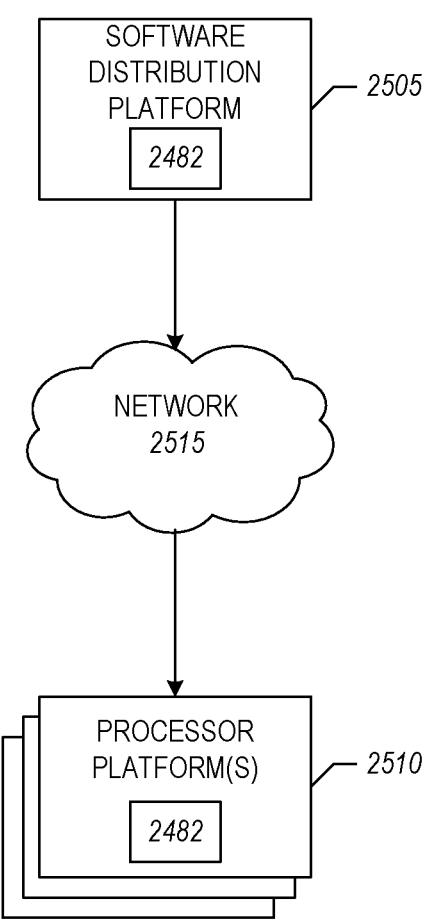
*FIG. 25*

5G TERRESTRIAL NETWORK ZONES

PRIORITY CLAIM

This application claims the benefit of priority under 35 U.S.C. 119 (e) to: U.S. Provisional Patent Application No. 63/320,432, filed Mar. 16, 2022, and titled "NETWORK BASED 5G TERRESTRIAL NETWORK EXCLUSION ZONE"; and United States Provisional Patent Application No. 63/412,743, filed Oct. 3, 2022, and titled "SATELLITE EXCLUSION ZONE MANAGEMENT AND NETWORK BASED 5G TERRESTRIAL NETWORK EXCLUSION ZONES": each of which is incorporated herein by reference in their entirety.

TECHNICAL FIELD

Embodiments described herein generally relate to network communication scenarios, and specifically coordination and interference from non-terrestrial (e.g., low-earth orbit satellite) networks or terrestrial (e.g., 5th generation (5G) cellular) networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 8A and 8B illustrate detailed usage of applicable settings for implementing a terrestrial radio zone at particular base stations, frequencies, and antennas, according to an example:

FIG. 9 depicts timing for uplink signals, according to an example:

FIG. 15 illustrates a flowchart of an example method of implementing zones for inter-satellite communications in a non-terrestrial communication network, according to an example:

FIGS. 17 and 18A-18D illustrate tables of settings for establishing zones in a non-terrestrial communication network, according to an example:

FIGS. 19A-19D illustrate further views of zones implemented by a non-terrestrial communication network, according to an example:

FIG. 25 illustrates a software distribution platform to distribute software instructions and derivatives, according to an example.

OVERVIEW

The following discussion relates to various aspects of coordinating communications provided by non-terrestrial and terrestrial networks, such as satellite low-earth orbit networks and 5G networks.

Figure 1:
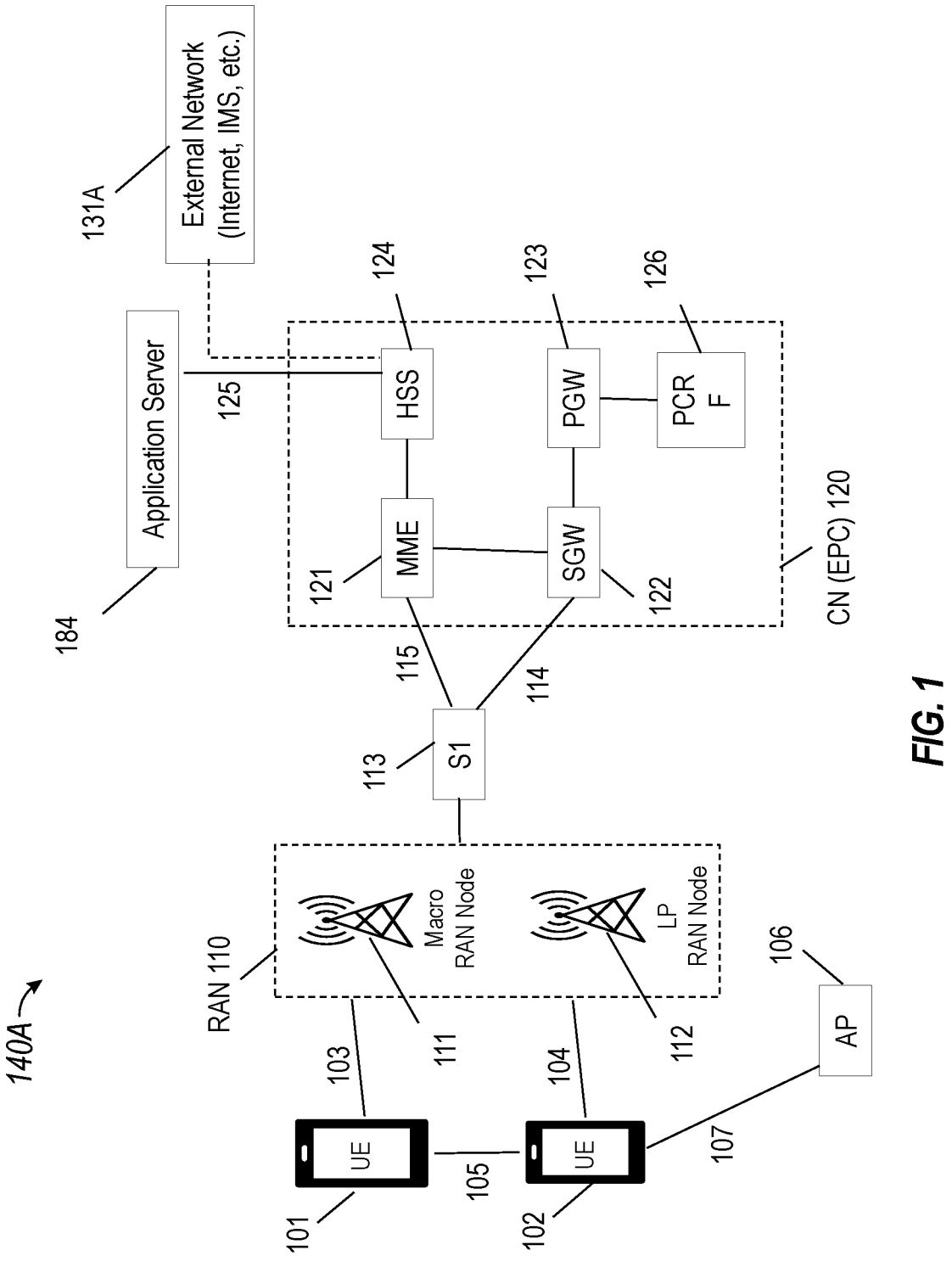
FIG. 1 illustrates an architecture of a network, according to an example.

FIG. 1 illustrates an architecture of a network according to an example. The network 140A includes 3GPP LTE/4G and next generation (NG) network functions that may be extended to 6G and later generation functions. Accordingly, although 5G will be referred to, it is to be understood that this is to extend as able to 6G (and later) structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units.

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units-a Central Unit (CU), at least one Distributed Unit (DU), and a Remote Radio Head (RRH) (or Remote Radio Unit (RRU)). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs. The CU and DU may include physical and/or virtual machines.

The RRH may act as a transceiver to the mobile devices and may include an antenna array arranged in different directions to cover an area surrounding a cell tower. The RRH may include a transceiver module that implements RF processing and a front end module (FEM) that may have one or more power amplifiers (PAS), low noise amplifiers (LNAs), transmit/receive switches, filters, etc. . . . , for transmission by antenna elements (e.g., one or more antenna arrays).

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer: in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi R) router. In this example, the AP 106 is shown to be connected to the Internet without connecting to the core network of the wireless system (described in further detail below).

The RAN 110 can include one or more access nodes that enable the connections 103 and 104. These access nodes (ANs) may be referred to as E2 nodes, base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). As described in more detail below, the coverage provided by such stations may be coordinated to provide inclusion or exclusion zones in which specific communications are able to be regulated accordingly. In some aspects, the communication nodes 111 and 112 may be transmission-reception points (TRPs). In instances when the communication nodes 111 and 112 are NodeBs (e.g., eNBs, gNBs or later generations), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and may be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrow band-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and later generation NodeBs may be coupled to each other via Xn interfaces.

In some aspects, the NG system architecture can use reference points between various nodes. In some aspects, each of the gNBs and the NG-eNBs may be implemented as a base station, a mobile edge server, a small cell, a home eNB, and so forth. In some aspects, a gNB may be a master node (MN) and NG-eNB may be a secondary node (SN) in a 5G architecture.

Figure 2A:
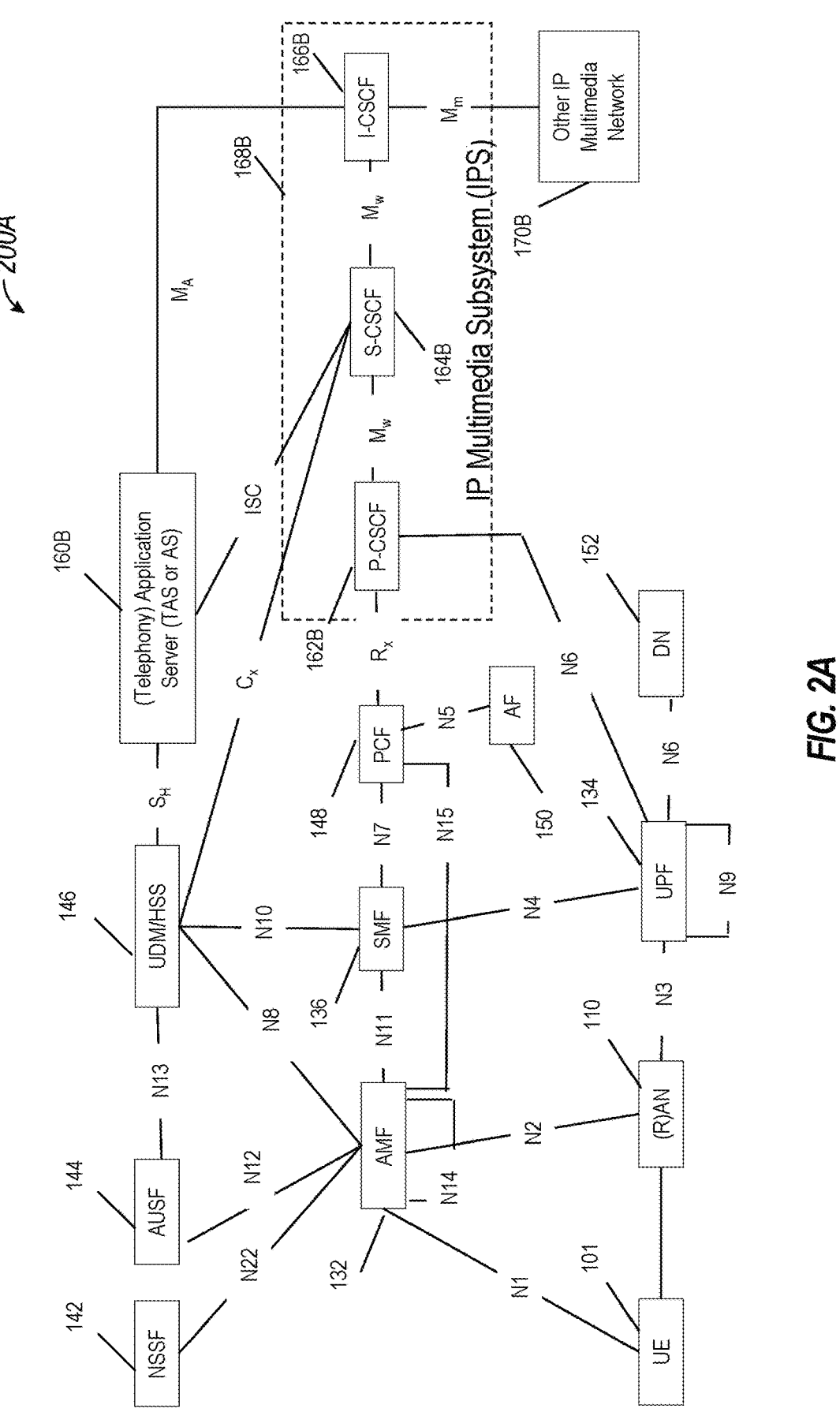
FIG. 2A illustrates a non-roaming 5G system architecture according to an example.

FIG. 2A illustrates a non-roaming 5G system architecture according to an example. In particular, FIG. 2A illustrates a 5G system architecture 200A in a reference point representation, which may be extended to a 6G system architecture. More specifically, UE 102 may be in communication with RAN 110 as well as one or more other CN network entities. The 5G system architecture 200B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 may be used to manage access control and mobility and can also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 200B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 2A), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 170B, e.g., an IMS operated by a different network operator.

In some aspects, the UDM/HSS 146 may be coupled to an application server (AS) 160B, which can include a telephony application server (TAS) or another application server. The AS 160B may be coupled to the IMS 168B via the S-CSCF 164B or the I-CSCF 166B.

A reference point representation shows that interaction can exist between corresponding NF services. For example, FIG. 2A illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 2A can also be used.

Figure 2B:
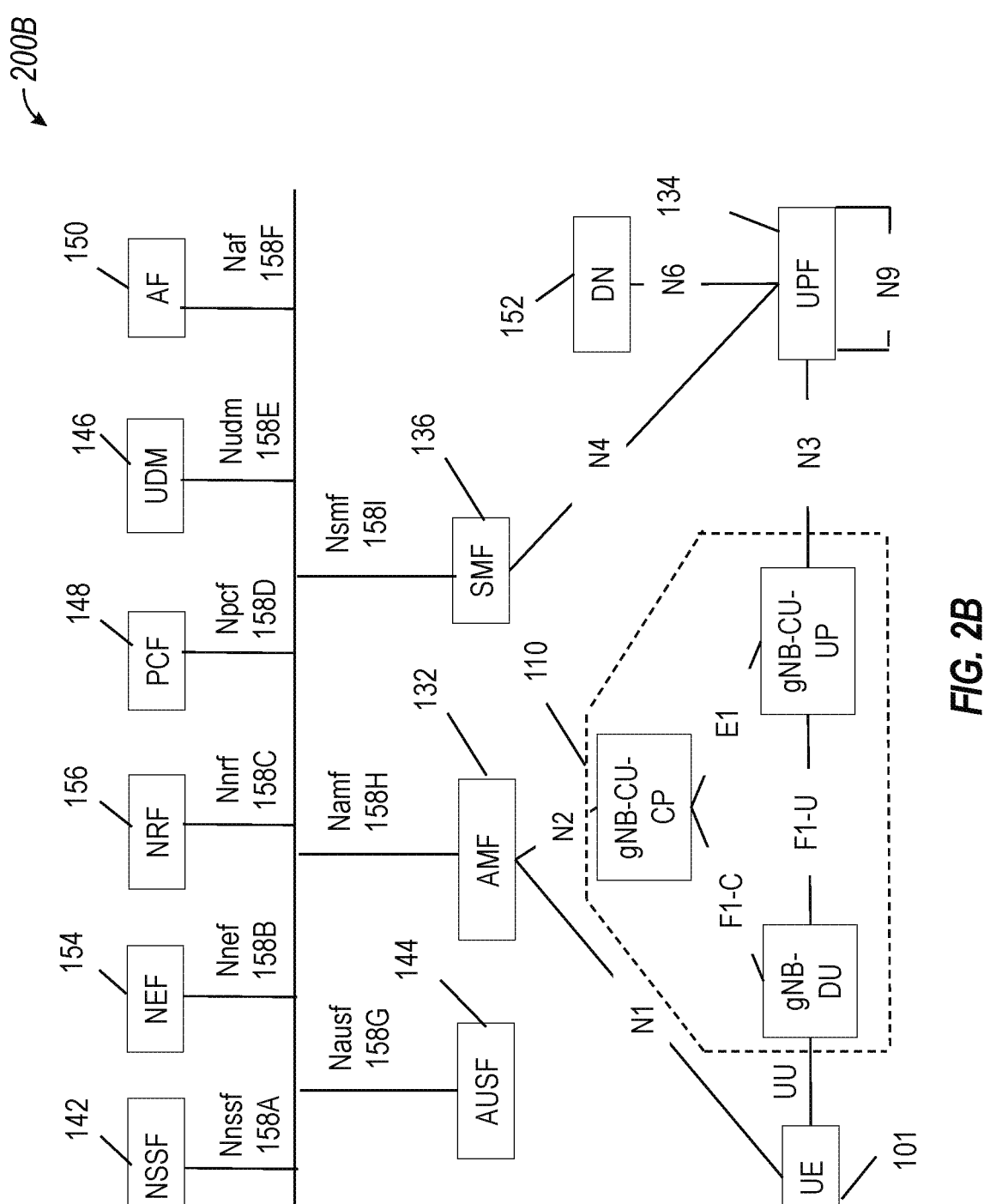
FIG. 2B illustrates a non-roaming 5G system architecture according to an example.

FIG. 2B illustrates a 5G system architecture 200B and a service-based representation. In addition to the network entities illustrated in FIG. 2A, system architecture 200B can also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 200B can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

A communication device as discussed herein may be a network device, such as a RAN node or AP, or a personal device, such as a wireless station (STA), a mobile station (MS), or UE, according to an example and to perform one or more of the techniques disclosed herein. In various aspects, the communication device may operate as a standalone device or may be connected (e.g., networked) to other communication devices. The communication device may be any machine capable of executing instructions (sequential or otherwise) that specify actions to be taken by that machine. For example, the communication device may be implemented as one or more of the devices shown in FIGS. 1, FIG. 2A, or FIG. 2B. Note that communications described herein may be encoded before transmission by the transmitting entity (e.g., UE, gNB) for reception by the receiving entity (e.g., gNB, UE) and decoded after reception by the receiving entity.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHZ and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to- Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHZ), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHZ, 3.4-3.6 GHZ, 3.6-3.8 GHZ and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3300-3600 MHz, 3400-3800 MHz, 3800-4200 MHz, (C-bands equivalent to the NR operating bands 3300-3800 MHz or 3300-4200 MHz), 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHZ (note: allocated for example in South Korea, 5925-7125 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHZ range, etc.), spectrum made available under FCC's "Spectrum Frontier" 5G initiative (including 27.5-28.35 GHZ, 29.1-29.25 GHZ, 31-31.3 GHZ, 37-38.6 GHz, 38.6-40 GHz, 42-42.5 GHZ, 57-64 GHz, 71-76 GHz, 81-86 GHz and 92-94 GHZ, etc), the ITS (Intelligent Transport Systems) band of 5.9 GHz (typically 5.85-5.925 GHz) and 63-64 GHZ, bands currently allocated to WiGig such as WiGig Band 1 (57.24-59.40 GHZ), WiGig Band 2 (59.40-61.56 GHz) and WiGig Band 3 (61.56-63.72 GHZ) and WiGig Band 4 (63.72-65.88 GHz), 57-64/66 GHz (note:

this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHZ, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Figure 3:
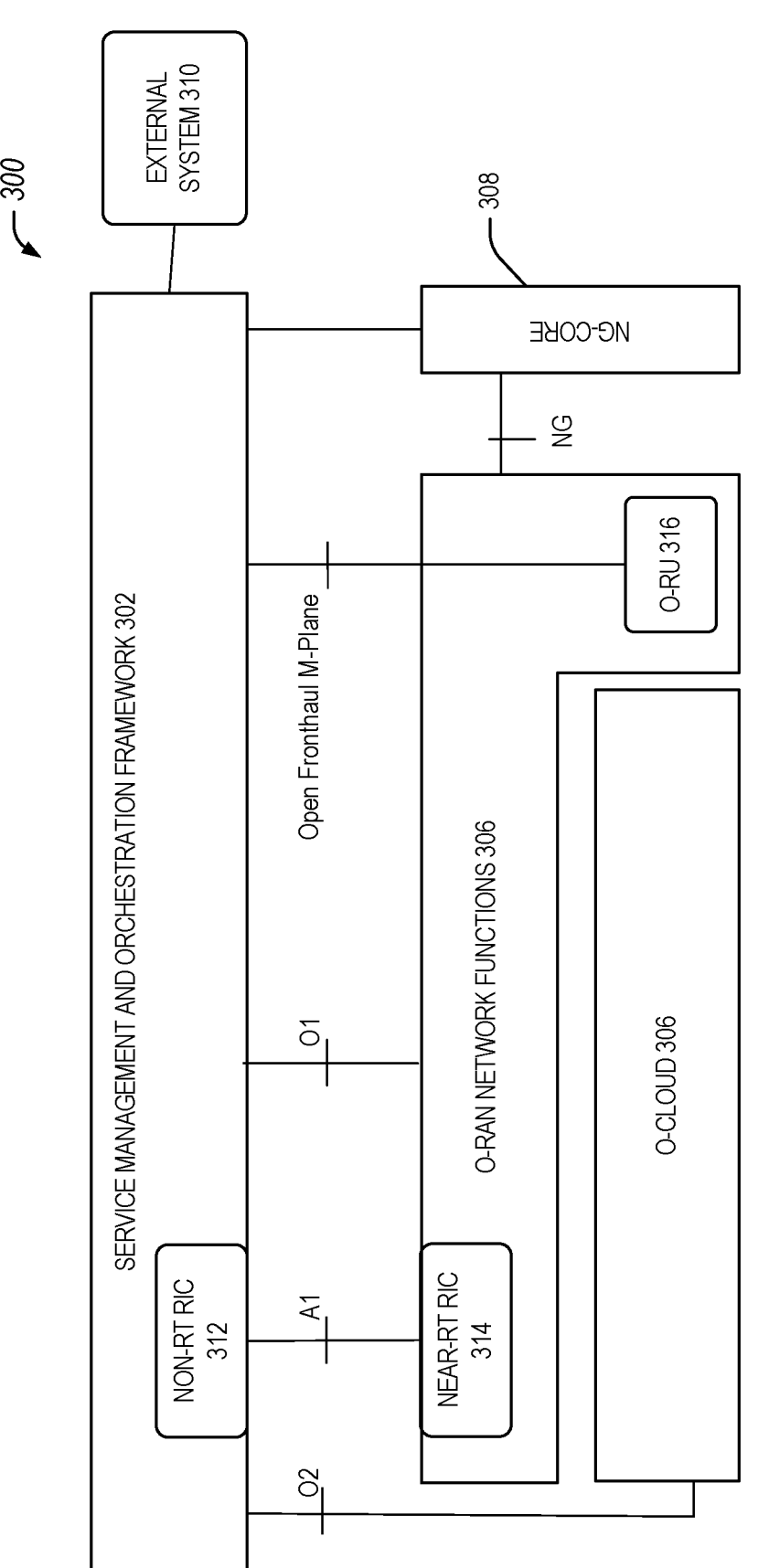
FIG. 3 illustrates a high-level view of an O-RAN architecture, according to an example.

FIG. 3 illustrates an O-RAN architecture, according to an example. In FIG. 3, the O-RAN architecture 300 includes four O-RAN defined interfaces-namely, the A1 interface, the O1 interface, the O2 interface, and the Open Fronthaul Management (M)-plane interface-which connect the Service Management and Orchestration (SMO) framework 302 to O-RAN network functions (NFs) 304 and the O-Cloud 306. The SMO 302 also connects with an external system 310, which provides data to the SMO 302. FIG. 3 also illustrates that the A1 interface terminates at an O-RAN Non-Real Time (RT) RAN Intelligent Controller (RIC) 312 in or at the SMO 302 and at the O-RAN Near-RT RIC 314 in or at the O-RAN NFs 304. The O-RAN NFs 304 may be VNFs such as VMs or containers, sitting above the O-Cloud 306 and/or Physical Network Functions (PNFs) utilizing customized hardware. All O-RAN NFs 304 are expected to support the O1 interface when interfacing the SMO framework 302. The O-RAN NFs 304 connect to the NG-Core 308 via the NG interface (which is a 3GPP defined interface). The Open Fronthaul M-plane interface between the SMO 302 and the O-RAN Radio Unit (O-RU) 316 supports the O-RU 316 management in the O-RAN hybrid model. The Open Fronthaul M-plane interface is an optional interface to the SMO 302 that is included for backward compatibility purposes and is intended for management of the O-RU 316 in hybrid mode only. The management architecture of flat mode and its relation to the O1 interface for the O-RU 316 is for future study. The O-RU 316 termination of the O1 interface towards the SMO 302.

Figure 4:
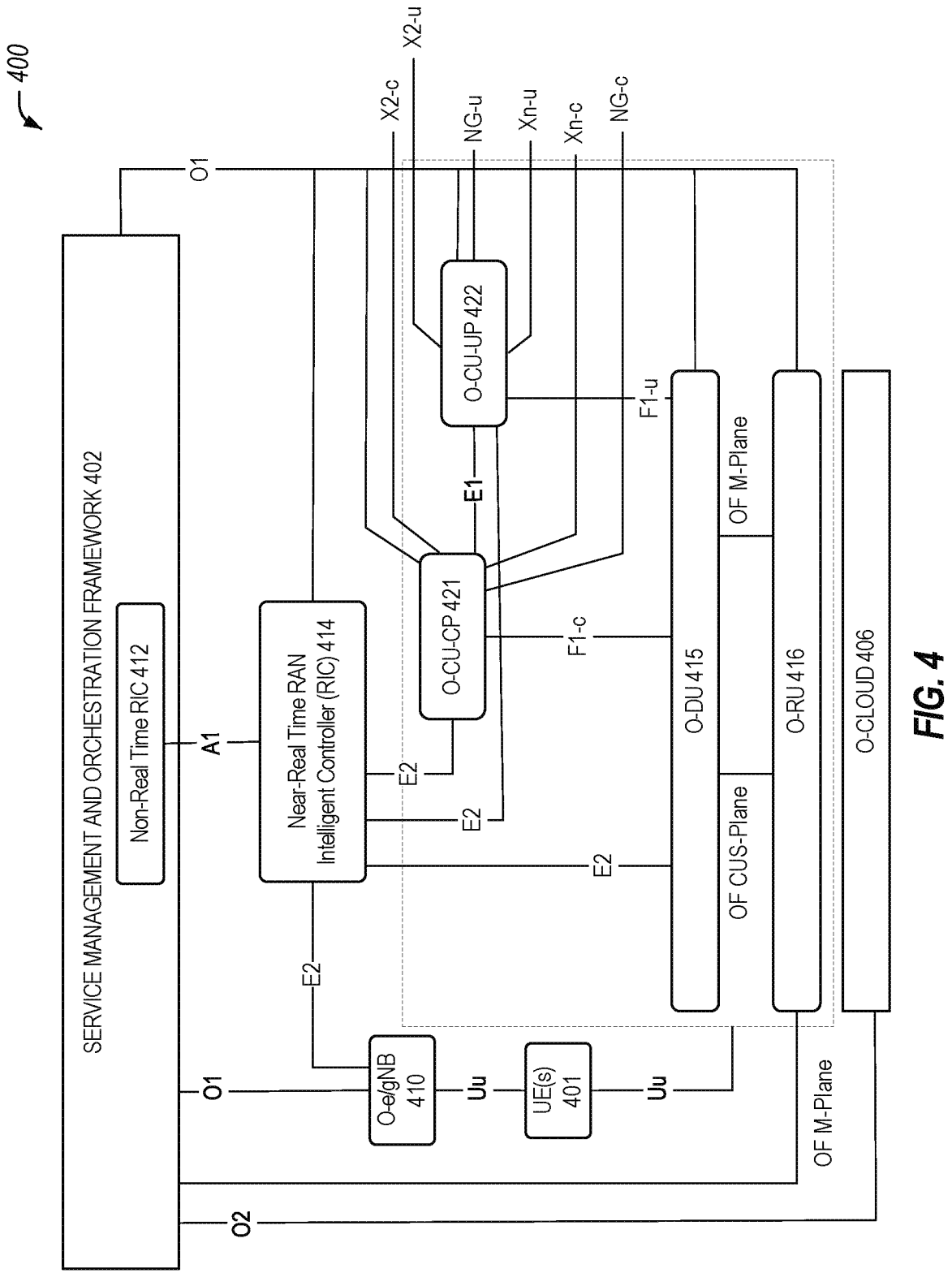
FIG. 4 illustrates an O-RAN logical architecture, according to an example.

FIG. 4 illustrates the Uu interface between components in the O-RAN architecture, according to an example. FIG. 4 shows an O-RAN logical architecture 400 corresponding to the O-RAN architecture 300 of FIG. 3. In FIG. 4, the SMO 402 corresponds to the SMO 302, O-Cloud 406 corresponds to the O-Cloud 306, the non-RT RIC 412 corresponds to the non-RT RIC 312, the near-RT RIC 414 corresponds to the near-RT RIC 314, and the O-RU 416 corresponds to the O-RU 316 of FIG. 3, respectively. The O-RAN logical architecture 400 includes a radio portion and a management portion.

The management portion/side of the architectures 400 includes the SMO Framework 402 containing the non-RT RIC 412 and may include the O-Cloud 406. The O-Cloud 406 is a cloud computing platform including a collection of physical infrastructure nodes to host the relevant O-RAN functions (e.g., the near-RT RIC 414, O-CU-CP 421, O-CU-UP 422, and the O-DU 415), supporting software components (e.g., OSs, VMMs, container runtime engines, ML engines, etc.), and appropriate management and orchestration functions.

The radio portion/side of the logical architecture 400 includes the near-RT RIC 414, the O-RAN Distributed Unit (O-DU) 415, the O-RU 416, the O-RAN Central Unit-Control Plane (O-CU-CP) 421, and the O-RAN Central Unit-User Plane (O-CU-UP) 422 functions. The radio portion/side of the logical architecture 400 may also include the O-e/gNB 410.

The O-DU 415 is a logical node hosting RLC, MAC, and higher PHY layer entities/elements (High-PHY layers) based on a lower layer functional split. The O-RU 416 is a logical node hosting lower PHY layer entities/elements (Low-PHY layer) (e.g., FFT/iFFT, PRACH extraction, etc.) and RF processing elements based on a lower layer functional split. Virtualization of O-RU 416 is FFS. The O-CU-CP 421 is a logical node hosting the RRC and the control plane (CP) part of the PDCP protocol. The O O-CU-UP 422 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 421, O-CU-UP 422, O-DU 415, or any combination of elements. For E-UTRA access the E2 nodes include the O-e/gNB 410. As shown in FIG. 8, the E2 interface also connects the O-e/gNB 410 to the Near-RT RIC 414. The protocols over E2 interface are based exclusively on Control Plane (CP) protocols. The E2 functions are grouped into the following categories: (a) near-RT RIC 414 services (RE-PORT, INSERT, CONTROL and POLICY); and (b) near-RT RIC 414 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 4 also shows the Uu interface between a UE 401 and O-e/gNB 410 as well as between the UE 401 and O-RAN components. The Uu interface is a 3GPP defined interface (see e.g., sections 5.2 and 5.3 of TS 38.401), which includes a complete protocol stack from L1 to L3 and terminates in the NG-RAN or E-UTRAN. The O-e/gNB 410 is an LTE eNB, a 5G gNB or ng-eNB that supports the E2 interface. There may be multiple UEs 401 and/or multiple O-e/gNB 410, each of which may be connected to one another the via respective Uu interfaces. Although not shown in FIG. 4, the O-e/gNB 410 supports O-DU 415 and O-RU 416 functions with an Open Fronthaul interface between them.

The Open Fronthaul (OF) interface(s) is/are between O-DU 415 and O-RU 416 functions. The OF interface(s) includes the Control User Synchronization (CUS) Plane and Management (M) Plane. FIGS. 3 and 4 also show that the O-RU 416 terminates the OF M-Plane interface towards the O-DU 415 and optionally towards the SMO 402. The O-RU 416 terminates the OF CUS-Plane interface towards the O-DU 415 and the SMO 402.

The F1-c interface connects the O-CU-CP 421 with the O-DU 415. As defined by 3GPP, the F1-c interface is between the gNB-CU-CP and gNB-DU nodes. However, for purposes of O-RAN, the F1-c interface is adopted between the O-CU-CP 421 with the O-DU 415 functions while reusing the principles and protocol stack defined by 3GPP and the definition of interoperability profile specifications.

The F1-u interface connects the O-CU-UP 422 with the O-DU 415. As defined by 3GPP, the F1-u interface is between the gNB-CU-UP and gNB-DU nodes. However, for purposes of O-RAN, the F1-u interface is adopted between the O-CU-UP 422 with the O-DU 415 functions while reusing the principles and protocol stack defined by 3GPP and the definition of interoperability profile specifications.

The NG-c interface is defined by 3GPP as an interface between the gNB-CU-CP and the AMF in the 5GC. The NG-c is also referred as the N2 interface (see TS 38.300). The NG-u interface is defined by 3GPP, as an interface between the gNB-CU-UP and the UPF in the 5GC. The NG-u interface is referred as the N3 interface (see TS 38.300). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., TS 36.420 and TS 38.300). In O-RAN, X2-c and X2-u protocol stacks defined by 3GPP are reused and may be adapted for O-RAN purposes.

The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., TS 38.420 and TS 38.300). In O-RAN, Xn-c and Xn-u protocol stacks defined by 3GPP are reused and may be adapted for O-RAN purposes.

The E1 interface is defined by 3GPP as being an interface between the gNB-CU-CP (e.g., gNB-CU-CP 3728) and gNB-CU-UP (see e.g., TS 38.401 and TS 38.460). In O-RAN, E1 protocol stacks defined by 3GPP are reused and adapted as being an interface between the O-CU-CP 421 and the O-CU-UP 422 functions.

The O-RAN Non-Real Time (RT) RAN Intelligent Controller (RIC) 412 is a logical function within the SMO framework 302, 402 that enables non-real-time control and optimization of RAN elements and resources: AI/machine learning (ML) workflow(s) including model training, inferences, and updates: and policy-based guidance of applications/features in the Near-RT RIC 414.

The O-RAN near-RT RIC 414 is a logical function that enables near-real-time control and optimization of RAN elements and resources via fine-grained data collection and actions over the E2 interface. The near-RT RIC 414 may include one or more AI/ML workflows including model training, inferences, and updates.

The non-RT RIC 412 may be an ML training host to host the training of one or more ML models. ML training may be performed offline using data collected from the RIC, O-DU 415 and O-RU 416. For supervised learning, non-RT RIC 412 is part of the SMO 402, and the ML training host and/or ML model host/actor may be part of the non-RT RIC 412 and/or the near-RT RIC 414. For unsupervised learning, the ML training host and ML model host/actor may be part of the non-RT RIC 412 and/or the near-RT RIC 414. For reinforcement learning, the ML training host and ML model host/actor may be co-located as part of the non-RT RIC 412 and/or the near-RT RIC 414. In some implementations, the non-RT RIC 412 may request or trigger ML model training in the training hosts regardless of where the model is deployed and executed. ML models may be trained and not currently deployed.

In some implementations, the non-RT RIC 412 provides a query-able catalog for an ML designer/developer to publish/install trained ML models (e.g., executable software components). In these implementations, the non-RT RIC 412 may provide discovery mechanism if a particular ML model may be executed in a target ML inference host (MF), and what number and type of ML models may be executed in the MF. For example, there may be three types of ML catalogs made discoverable by the non-RT RIC 412: a design-time catalog (e.g., residing outside the non-RT RIC 412 and hosted by some other ML platform(s)), a training/deployment-time catalog (e.g., residing inside the non-RT RIC 412), and a run-time catalog (e.g., residing inside the non-RT RIC 412). The non-RT RIC 412 supports necessary capabilities for ML model inference in support of ML assisted solutions running in the non-RT RIC 412 or some other ML inference host. These capabilities enable executable software to be installed such as VMs, containers, etc. The non-RT RIC 412 may also include and/or operate one or more ML engines, which are packaged software executable libraries that provide methods, routines, data types, etc., used to run ML models. The non-RT RIC 412 may also implement policies to switch and activate ML model instances under different operating conditions.

The non-RT RIC 42 is able to access feedback data (e.g., FM and PM statistics) over the O1 interface on ML model performance and perform necessary evaluations. If the ML model fails during runtime, an alarm may be generated as feedback to the non-RT RIC 412. How well the ML model is performing in terms of prediction accuracy or other operating statistics it produces can also be sent to the non-RT RIC 412 over O1. The non-RT RIC 412 can also scale ML model instances running in a target MF over the O1 interface by observing resource utilization in MF. The environment where the ML model instance is running (e.g., the MF) monitors resource utilization of the running ML model. This may be done, for example, using an ORAN-SC component called ResourceMonitor in the near-RT RIC 414 and/or in the non-RT RIC 412, which continuously monitors resource utilization. If resources are low or fall below a certain threshold, the runtime environment in the near-RT RIC 414 and/or the non-RT RIC 412 provides a scaling mechanism to add more ML instances. The scaling mechanism may include a scaling factor such as a number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The AI interface is between the non-RT RIC 412 (within or outside the SMO 402) and the near-RT RIC 414. The A1 interface supports three types of services, including a Policy Management Service, an Enrichment Information Service, and ML Model Management Service. A1 policies have the following characteristics compared to persistent configuration: A1 policies are not critical to traffic: A1 policies have temporary validity: A1 policies may handle individual UE or dynamically defined groups of UEs: A1 policies act within and take precedence over the configuration; and A1 policies are non-persistent, i.e., do not survive a restart of the near-RT RIC.

As above, network resources may be coordinated, whether provided by terrestrial sources (e.g., fixed base stations located at cell towers) or non-terrestrial sources (e.g., 5G and other service provided by orbiting satellites, drones, balloons, etc.). With the advent of IoT and other devices and technologies, wireless spectrum is increasingly becoming more crowded. This has generated an interest in increasing the frequencies used for communication, including allowing network use of the FR1, FR2 and FR2-2 bands, as well as the reallocation of frequency bands by the FCC. However, with the implementation of communication use over the wide variety of frequency bands, the potential for wireless network interference between UEs and the network also increases. A number of techniques may be used to avoid such interference.

Recent real-world events highlight the interference issue, such as the restrictions (introduced in January 2022) which reduced 5G rollout around United States airports due to concern about the interference potential with airplane equipment used for low-visibility landings. Specifically, some service providers had original plans to deploy 5G in reallocated C-band frequencies in many large cities, including at communication towers near airports, although such frequencies are known to present possible interference with older airplane altimeters. This possibility of interference has arisen with 5G C-Band enabled in the 3.7 and 3.8 GHz band-even though the current low-visibility altimeters operate at about 4.2-4.4 GHz and may have as much as a 220 MHz guard band (4.2-3.98 GHz). The future use of smaller guard bands, and thus overlap or interference is likely. Service providers (e.g., AT&T and Verizon) have proposed buffer zones around the airport (up to a few miles): no information yet exists, however, on the manner to implement or provide telemetry to record and certify such a solution.

This situation highlights the risk of unforeseen geographically-anchored interference issues. The aviation devices (altimeters) in most aircraft were designed and built before use of directional higher powered antennas: they are very costly to replace. Accordingly, current workarounds that focus on UE-based solutions (e.g., just replace the altimeter to use a different band) to enable use of the problematic 5G frequency bands by UEs in the aircraft may not provide a practically feasible solution. Currently, many older radio equipment receivers were built long before 5G systems were developed and may experience unanticipated interference when encountering newer 5G directional beam forming transmissions. For example, individual use of a 5G-enabled UE by a passenger on an airplane may result in formation of a directional beam directed at the aircraft and thereby saturating the aircraft 5G signals toward.

Current interference issues provide just one example in the 3.7-3.8 GHz band of a larger interference management problem. Once other service providers begin using frequencies up to 3.98 GHz the issue may become worse, because the 3.98 GHz is closer to the low-end of legacy altimeter devices. Although service providers are actively investigating workarounds, many of these workarounds may resort to replacement or restriction of devices that were designed to operate without older C-band reception (including overhead lower power GEO satellite communications compared to higher powered upward facing MIMO directional beams).

The following techniques use a network-based approach that prevents operation of potentially interfering beams at the Edge using predefined or dynamically-defined exclusion zones for objects in transit, such as for aerial devices (devices that are flying such as airplanes or drones). Exclusion zones (either corporative or provider-specific zones) are defined for a particular fixed (or mobile) area that sets predetermined limits for specific frequency intensity limits, specific power, specific bands, specific nodes, specific TX/RX thresholds, or specific antenna angles for a specific time frame.

Other interference situations that may occur can disable certain uplink (UL) and/or downlink (DL) signals, for example sounding reference signals (SRS). In this situation an exclusion zone prevents such uplink signals from being transmitted by the UE. SRS is a UL-only signal transmitted by a UE to help gNBs obtain channel state information (CSI) specific to that UE. CSI is used to measure the characteristics of the channel used by the UE to communicate with the gNB. CSI represents various transmission effects including scattering, fading, and power decay. The gNB uses the CSI to determine desired transmission characteristics (e.g., modulation and code rate, beam forming) and for resource scheduling, link adaptation, massive MIMO (mMIMO) optimizations, and beam management improvements.

The various zones may include a Mitigation Zone (MZ), an Exclusion Zone (EZ), and Inclusion Zone (IZ). In the exclusion zone, the UE may be prohibited from communicating in some or all frequencies in a defined area. In the inclusion zone, the UE may be allowed to communicate in some or all frequencies in the defined area. In the mitigation zone, modifying actions may be taken to reduce chances of interference. Such actions may include tilting the RAN node antenna, modifying what signals are permitted to be used or are unable to be used by devices in the defined area, reducing signal power, or switching to use of another frequency (modifying the normal operation of the network). Thus, a mitigation zone may include an exclusion zone.

The exclusion zone, inclusion zone, and mitigation zone may be determined for one or more specific geographical areas for one or more RAN nodes. The exclusion zone may be partial, allowing for all other downlink and uplink transmissions except for specific uplink synchronization, control and/or data signals determined to be interfering signals. An exclusion zone may be defined to permit all downlink signals but prevent uplink signals. An example exclusion zone may allow downlink control signals such as Demodulation Reference Signals (DM-RS), Channel State Information Reference Signal (CSI-RS), and Phase Tracking Reference Signals (PTRS) and/or data on a PDCCH and/or PDSCH while preventing UL control and/or data on a PUCCH and/or PUSCH as well as UL sync signals such as SRS and PRACH signals. Other combinations of exclusion may be used in other aspects.

Other situations may prohibit non-essential or network services or capabilities within a particular zone that depend on certain signals. For example, an exclusion zone may be defined to prevent location-technologies from working to prevent interference or prevent operation of equipment for safety reasons. An example includes preventing transmission of UL SRS signals, so that a drone that uses directional or location services is prevented from operating in the exclusion zone.

The following terrestrial zone definitions accommodate unexpected frequency overlaps due to spectrum changes and mitigate future interference by enabling the service provider to control which frequencies are used on by a particular edge system or RAN node. The terrestrial zones discussed herein may thus allow communications in unoffending frequencies while limiting communications in offending frequencies (e.g., 5G C-band). Zone dynamic updates may be used to accommodate new, unforeseen localized interference restrictions. The updates may be provided from the RAN node to the UE to adjust the transmission parameters.

Another aspect discussed herein relates to definitions and uses of various zones for mitigation or adjustment for operational scenarios, including to handle scenarios relating to the implementation of in-orbit exclusion zones for debris, exclusion zone mitigation or re-mapping (re-routing), and other operational maintenance or servicing. For instance, an exclusion zone may be defined in space to avoid collisions and or prevent operation within the exclusion zone, in-orbit, based on a predefined value. Likewise, an in-orbit/maintenance mode exclusion zone may be defined to help remap (reroute) a particular SV. As an example, an exclusion zone may define an outage ahead of time, and edge communication routing may then account accordingly for such an outage.

Figure 5A:
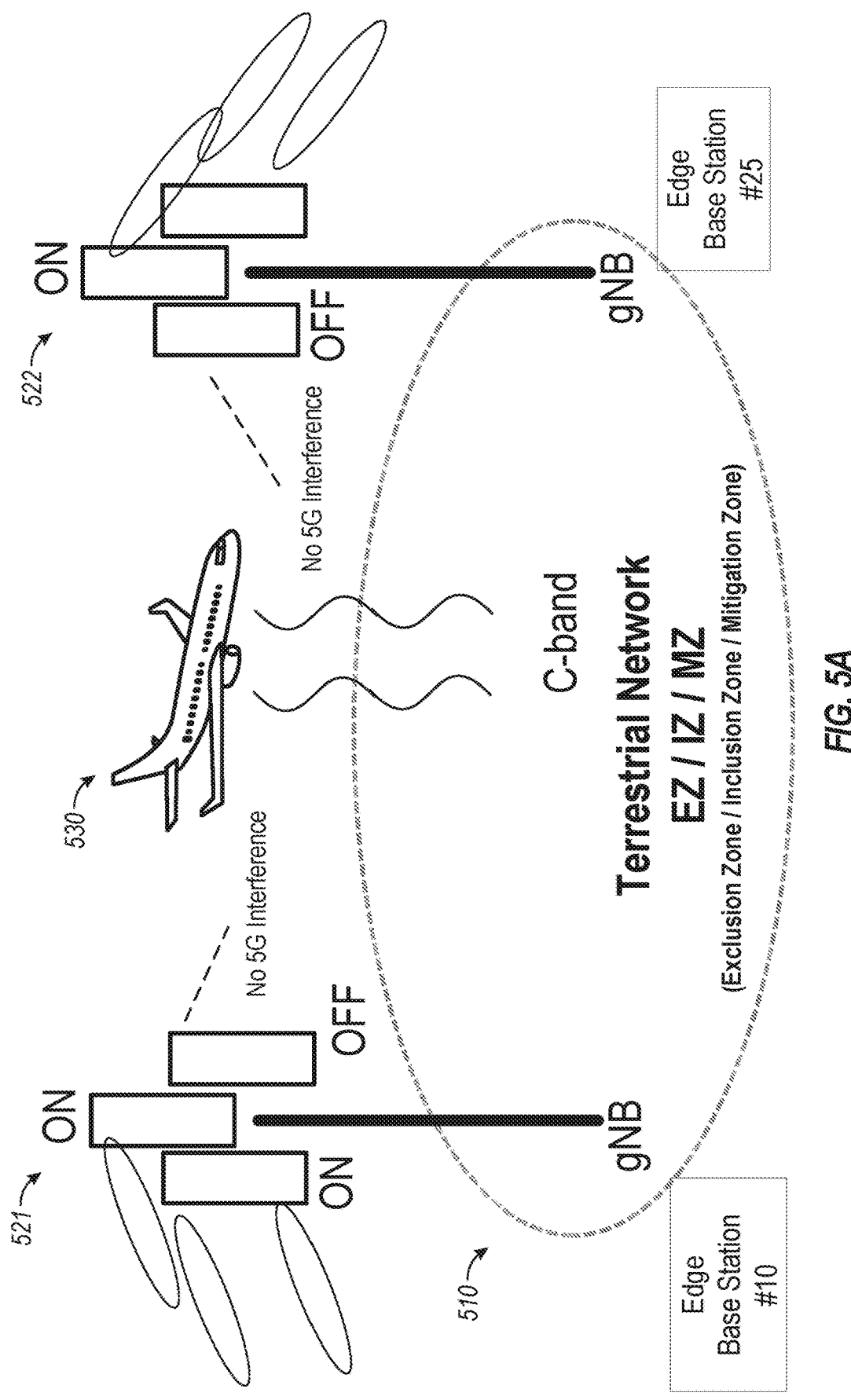
FIG. 5A illustrates an implementation of a terrestrial network zone for a terrestrial communication network, according to an example.

FIG. 5A illustrates an implementation of a terrestrial network zone for a terrestrial communication network, according to an example. In FIG. 5A, the zone may be an area-based mitigation or exclusion zone for a terrestrial (e.g., cellular/5G) communication network. Here, the zone is established within area 510, to prevent interference between cellular radio communications at base stations (shown as gNBs) 521, 522 and radio communications at airplane 530.

Within the scenario of FIG. 5A, the airplane 530 includes an older low-power C-band "auto-land" altimeter. The altimeter may be used miles away from landing area (airport) of the airplane 530. 5G antennas often are able to transmit at higher power than previous generation antennas, and may be pointed horizontally (e.g., in the United States), causing the radio frequency to interfere with activity of the altimeter within the range of the 5G antennas. Here, the presence of 5G C-band interference can result in degraded deceleration performance, increased landing distance, and runway excursion, specifically when the airplane 530 transitions from AIR to GROUND mode. Quick resolutions involving new altimeters or modifications to existing altimeters may be difficult because older altimeters are pre-certified and/or due to prohibitive cost restrictions.

A terrestrial network zone implementation established by the operator may provide a variety of mitigations. These mitigations may include physical adjustments such as removing or adjusting angles of (tilting) the antennas, as well as operation adjustments such as disabling antennas communications on all or only on some frequencies or certain types of communications or reducing the antenna power or power of such communications in a particular geographical area. The latter operational adjustments may be based on current weather situations. Specifically, such zones may be defined to change the characteristics of one or more specific base stations to reduce or eliminate radio interference.

In an example, the node characteristics that may be modified include but are not limited to: radio power down: antenna power down; and physical radio or antenna adjustments (e.g., tilt and angle adjustments: RX/TX power levels adjustments). Such exclusion/inclusion zones may be dynamic in nature, and flexibly deployed based on the actual, forecasted, predicted, or expected position of the airplane or other object in transit. Thus, the "5G interference" from a base station may be none or selective.

Figure 5B:
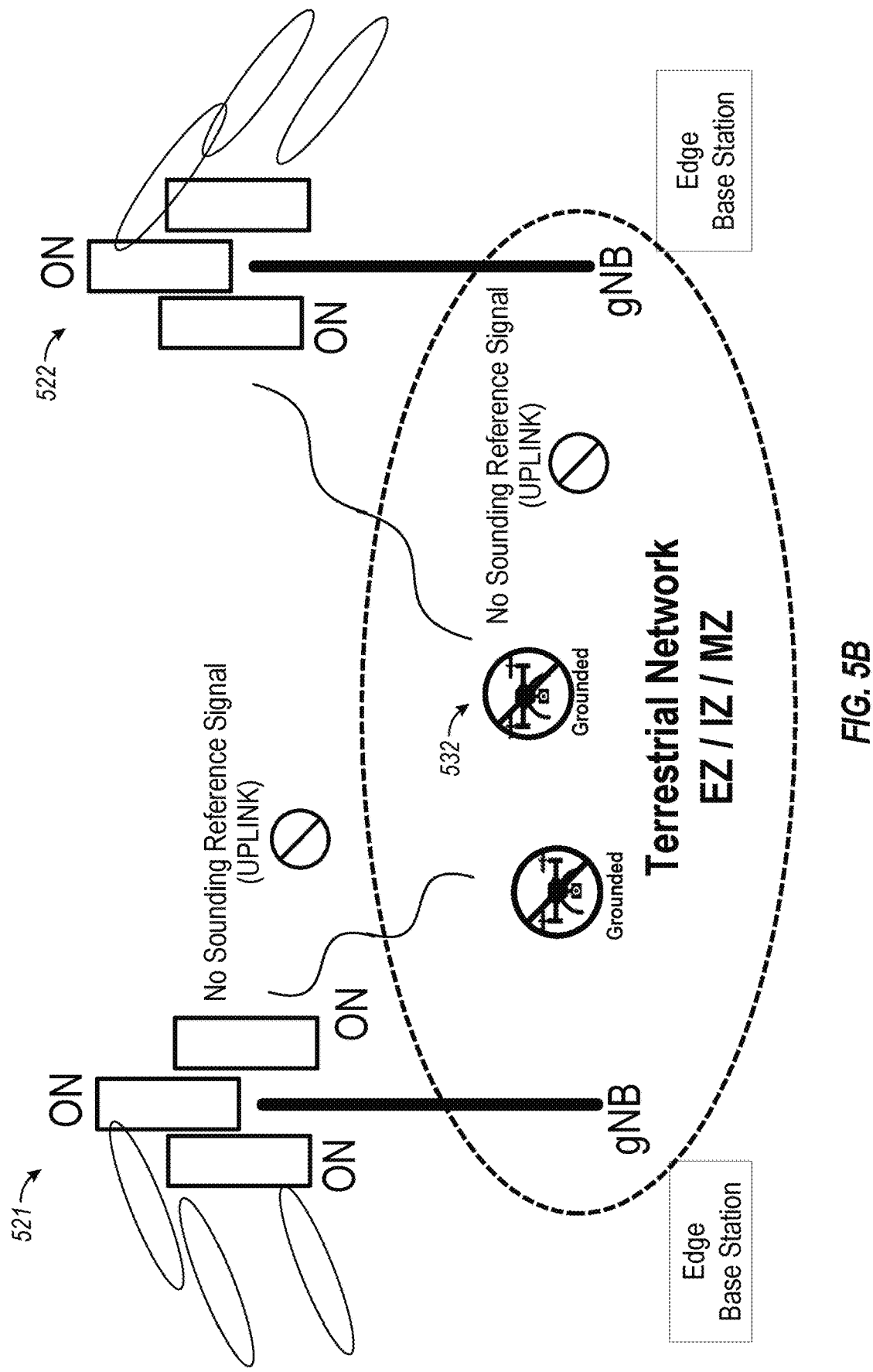
FIG. 5B illustrates another implementation of a terrestrial network zone, where specific signals are prohibited or mitigated, according to an example.

FIG. 5B illustrates a terrestrial network zone, where specific signals are prohibited, according to an example. In particular, uplink SRS signals are prohibited from devices in the zone, such as from aerial devices 532 (drones). Downlink control information (DCI) sent to the UE in a PDCCH may control triggering of the SRS signals, whether periodic, aperiodic, or semi-persistent. The DCI may be sent in response to a determination by the base station that the UE is within the zone or is about to enter the zone (based on, e.g., the heading and speed of the UE) or based on handover to the base station. As above, signals other than SRS signals may also be adjusted using the same or different DCI. Similarly, power control of the signals may be adjusted by the DCI (or RRC message) using a change in the maximum allowable power for PUCCH, PUSCH, or specific signals (e.g., SRS). Thus, the zone may provide a capability to turn off or adjust the power of signals that are attached to network services, in particular potentially interfering uplink signals.

This may prevent the operation of services that depend on 5G NR signals for navigation, such drones, while only inhibiting certain operations of other communication devices, such as smartphone. Such zones may not be limited to airports, but may be applied to other locations such as military or governmental institutions or locations. An example of how an uplink signal may be prohibited from the zone is depicted in FIG. 5B, but it will be understood that other types of exclusions, mitigations, and prohibitions may also be established.

Figure 6:
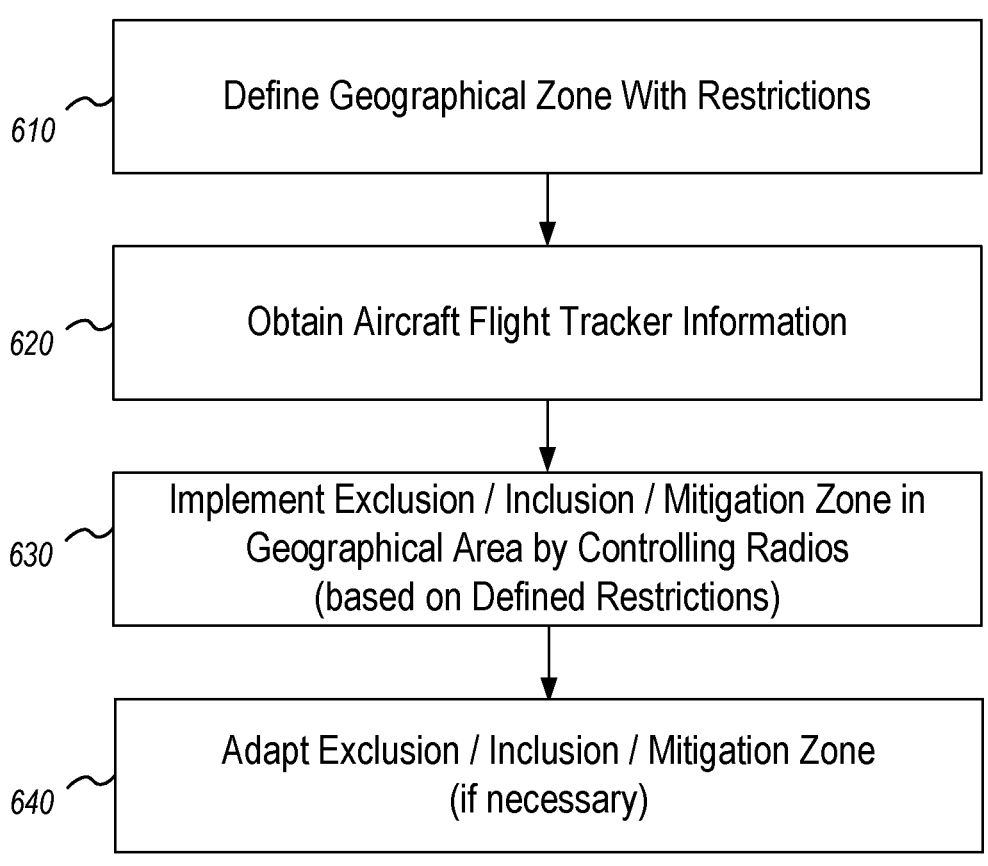
FIG. 6 illustrates a method of implementing a terrestrial network zone, according to an example.

FIG. 6 illustrates a method 600 of implementing a terrestrial network zone, according to an example. The method operations, shown in FIG. 6, may be non-exclusive: other operations may be present. In FIG. 6, the flowchart of method 600 includes: (Operation 610) Define a geographical zone with allowable set of restrictions (spectrum bands, tolerance limits, etc.); Operation 620: Obtain predetermined or real-time aircraft (or other object in transit) flight tracker information (e.g., via a third party tracking service such as the "Aero" API); Operation 630: Implement the zone within service provider network by controlling radios that are contained within the geographic zone according to the allowable restrictions; Operation 640: Adapt the zone (if desired) based on real-time or changed conditions (such as weather).

Figure 7A:
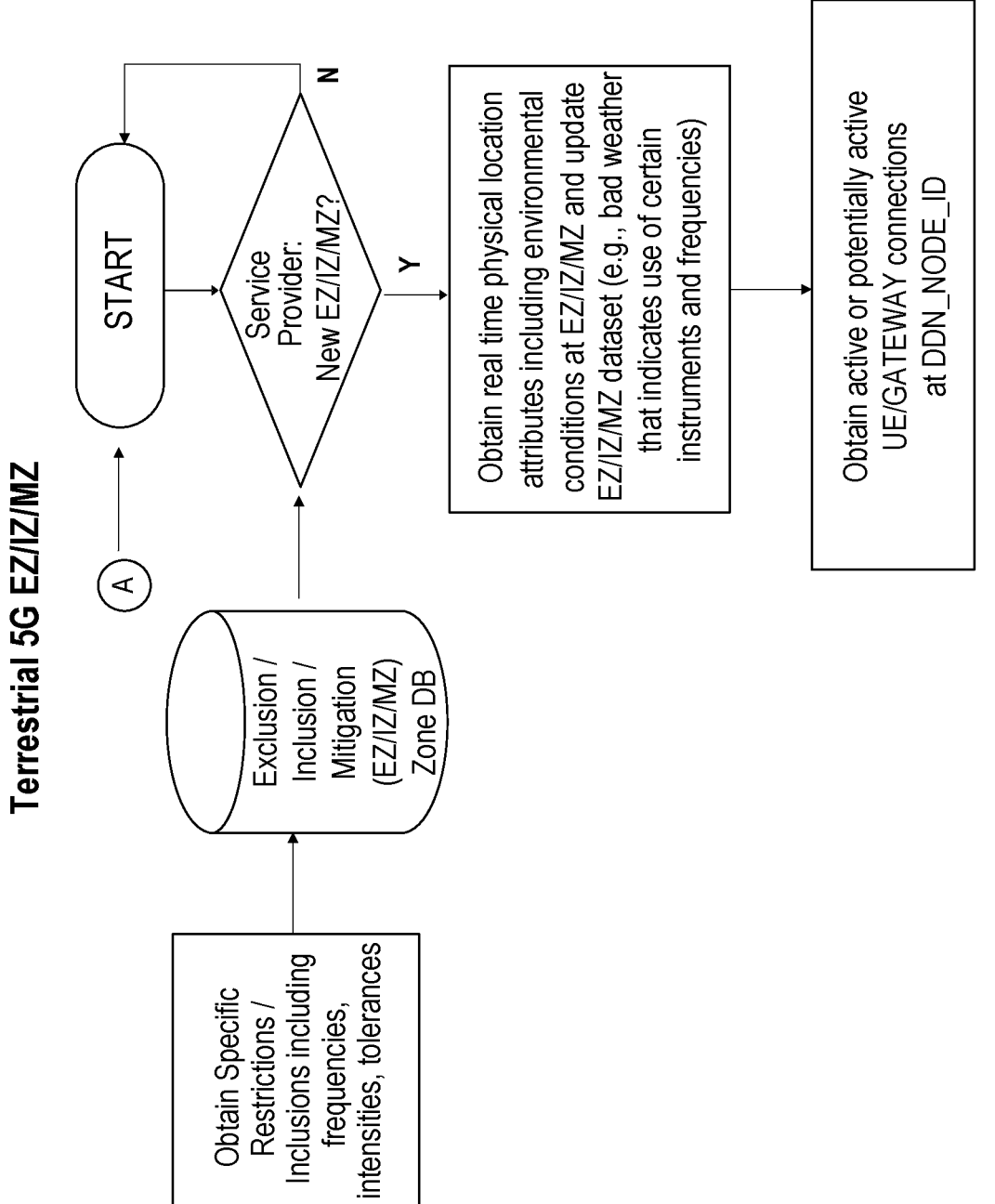
FIGS. 7A to 7C illustrate flowcharts for implementing and updating aspects of a terrestrial network zone, according to an example.
Figure 7B:
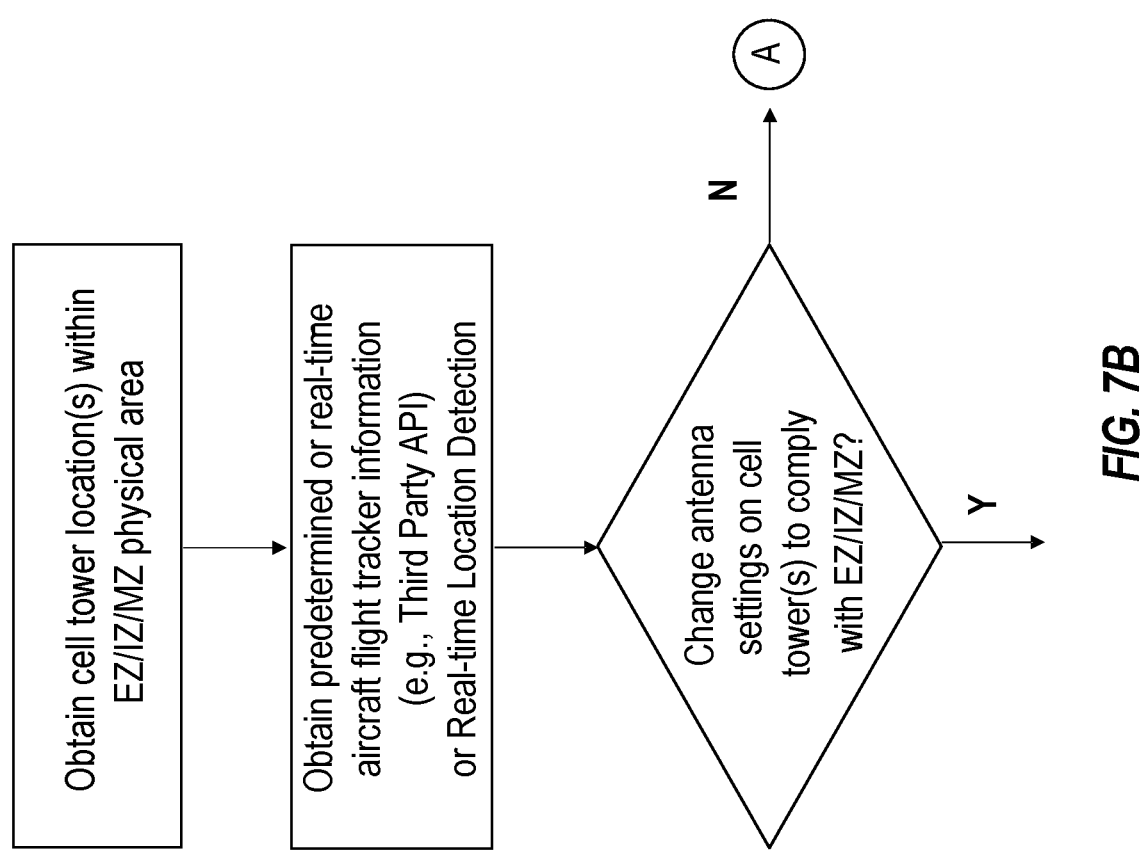
Figure 7C:
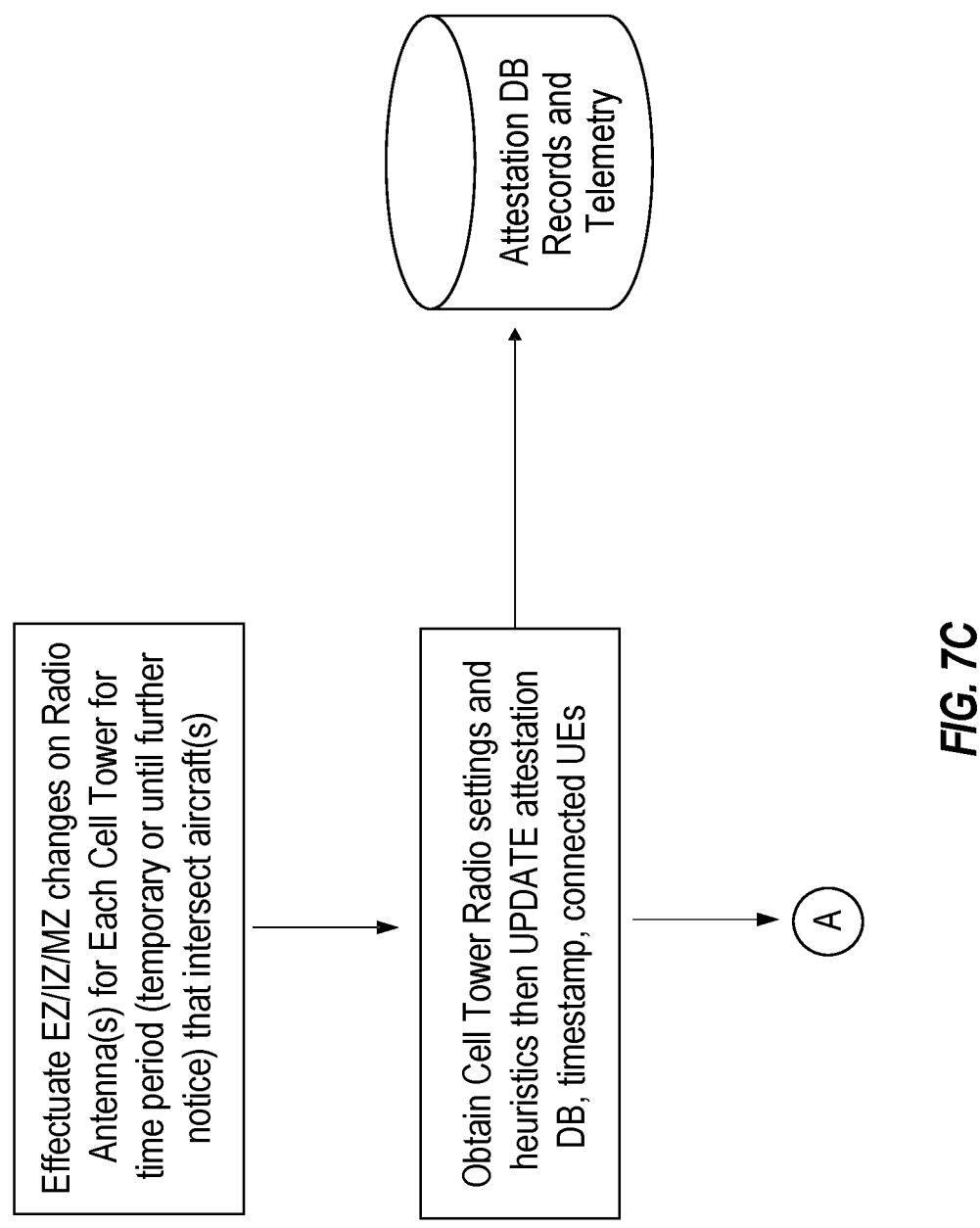

Further methods in which the zone information may be collected and implemented at various cell tower locations is detailed in the flows of FIGS. 7A to 7C. The various operations in FIGS. 7A to 7C may be implemented in an edge server, base station, or core network, dependent on a desired embodiment.

As an example, the aircraft flight tracker information obtained may include information such as: Flight number, Aircraft type, Origin and/or destination airport, last time position, longitude, latitude, groundspeed, altitude. The aircraft flight tracker information may be predetermined or updated in real-time (e.g., by a third party API), or real-time location detection may be used.

Example commands and command parameters to define a terrestrial network zone may be structured as follows:

TABLE 1

Define Terrestrial Network Exclusion Zone/Inclusion Zone/Mitigation Zone:

| (INPUT) | Parameter | Type | Description |
|---|---|---|---|
| | TN_EZ/IZ/MZn.ID | INT | EZ/IZ/MZ Unique ID |
| | TN_EZ/IZ/MZn.NAME | STRING | EZ/IZ/MZ Name |
| | TN_EZ/IZ/MZn.RADIUS | FLOAT | EZ/IZ/MZ Radius |
| | TN_EZ/IZ/MZn.LAT.PT | FLOAT | EZ/IZ/MZ Latitude Ground/ Buffer Center Point |
| | TN_EZ/IZ/MZn.LONG.PT | FLOAT | EZ/IZ/MZ Longitude Ground/ Buffer Center Point |
| | TN_EZ/IZ/MZn.IP.PT | FLOAT | EZ/IZ/MZ IP Address Ground/ Buffer Center Point |
| | TN_EZ/IZ/MZn.GPS.PT | FLOAT | EZ/IZ/MZ GPS Ground/Buffer Center Point |
| | TN_EZ/IZ/MZn.MIN. FREQBAND.THRESHOLD | FLOAT | EZ/IZ/MZ disallowed Freq Band MIN Range |
| | TN_EZ/IZ/MZn.MAX. FREQBAND.THRESHOLD | FLOAT | EZ/IZ/MZ disallowed Freq Band MAX Range |
| | TN_EZ/IZ/MZn.MIN. INTENSITY.THRESHOLD | FLOAT | EZ/IZ/MZ Min Ground/Buffer Center Point Freq Band/Freq Intensity Threshold |
| | TN_EZ/IZ/MZn.MAX. INTENSITY.THRESHOLD | FLOAT | EZ/IZ/MZ Max Ground/Buffer Center Point Freq Band/Freq Intensity Threshold |
| | TN_EZ/IZ/MZn.MIN. Weather.THRESHOLD | FLOAT | EZ/IZ/MZ Min physical env weather Threshold |
| | TN_EZ/IZ/MZn.MAX. Weather.THRESHOLD | FLOAT | EZ/IZ/MZ Max physical env weather Threshold (e.g, hurricane category 2 wind sheer >10 mph) |
| | TN_EZ/IZ/MZn.OTHER. THRESHOLD | FLOAT | EZ/IZ/MZ OTHER OPEN variable |
| | TN_EZ/IZ/MZn.RADIO.TOGGLE | ON/OFF | EZ/IZ/MZ Radio ON or OFF |
| | TN_EZ/IZ/MZn.UL.Control (DM-RS, PT-RS, PUSCH) | ON/OFF | EZ/IZ/MZ UL/DL Signal ON or OFF |
| | TN_EZ/IZ/MZn.UL.Data (DM-RS, PUCCH) | ON/OFF | EZ/IZ/MZ UL/DL Signal ON or OFF |
| | TN_EZ/IZ/MZn.UL.Sync (SRS, PRACH) | ON/OFF | EZ/IZ/MZ UL/DL Signal ON or OFF |
| | TN_EZ/IZ/MZn.DL.Control (DM-RS, PDCCH) | ON/OFF | EZ/IZ/MZ UL/DL Signal ON or OFF |
| | TN_EZ/IZ/MZ.DL.Data (DM-RS, PT-RS, PDSCH) | ON/OFF | EZ/IZ/MZ UL/DL Signal ON or OFF |
| | TN_EZ.Network.Service (Location Services | ON/OFF | EZ/IZ/MZ Required Signal ON or OFF |

Example commands and command parameters to obtain aircraft flight data may be structured as follows:

TABLE 2

Get AC Aircraft Flight Data:

| (INPUT) | Parameter | Type | Description |
|---|---|---|---|
| | Acn.ID | STRING | International Designator |
| | ACn.ID | INT | Flight Number |
| | ACn.ID.NAME | STRING | Aircraft Name |
| | ACn.GND.lat | FLOAT | Ground location latitude for AC fly-over |
| | ACn.GND.long | FLOAT | Ground location longitude for AC fly-over |

TABLE 2-continued

Get AC Aircraft Flight Data:

| (INPUT) | Parameter | Type | Description |
|---|---|---|---|
| | ACn.GND.alt | FLOAT | Ground location altitude % for freq intensity threshold calculations |
| | ACn.GND.time | INT | Amount of line of sight time |
| | ACn.Type | Minutes | Aircraft Time |
| | ACn.origin | Degrees | GEO origin |
| | ACn.destination | destination | GEO destination |
| | ACn.lasttime position | position | last time position |
| | AC.ngroundspeed | FLOAT | ground speed |

TABLE 2-continued

| | Get AC Aircraft Flight Data: | | |
|---|---|---|---|
| (INPUT) | Parameter | Type | Description |
| | AC.landing/takeoff | ON/OFF | EZ/IZ ON or OFF |
| | ACn.ID | STRING | International Designator |
| | ACn.ID | INT | Flight Number |
| | ACn.ID.NAME | STRING | Aircraft Name |
| | ACn.GND.lat | FLOAT | Ground location latitude for AC fly-over |
| | ACn.GND.long | FLOAT | Ground location longitude for AC fly-over |

Example commands and command parameters to set or define the zone within a particular base station may be structured as follows:

TABLE 3

| | Set EZ/IZ/MZ (Implement EZ/IZ/MZ within Base station): | | |
|---|---|---|---|
| (OUTPUT) | Parameter | Type | Description |
| | EZ/IZ/MZn.ID | STRING | TN zone Name |
| | BSn.ID.NAME | INT | Base Station # |
| | BSn.ID.NAME | STRING | Base Station # |
| | BSn.RADIOn.TOGGLE | ON/OFF | BS Freq Band n uplink UTC TIME START/STOP |
| | BSn.ANTENNAn.FREQn. TOGGLE | ON/OFF | SV Freq Band n Frequency n Uplink UTC TIME START/STOP |
| | BSn.ANTENNAn.FREQn. POWER | ON/OFF | Base Station Power |

For instance, the following shows an example usage of the command to define (enable) the terrestrial network zone (with example data values):

TABLE 4

| | Define Terrestrial Network EZ/IZ/MZ: | | |
|---|---|---|---|
| (INPUT) | Parameter | Type | Value |
| | Tn_EZ/IZ/MZn.ID | INT | TNEZ/IZ/MZ22 |
| | Tn_EZ/IZ/MZn.NAME | STRING | TN_EZ/IZ/MZ_PHX |

TABLE 4-continued

| | Define Terrestrial Network EZ/IZ/MZ: | | |
|---|---|---|---|
| (INPUT) | Parameter | Type | Value |
| | Tn_EZ/IZ/MZn.RADIUS | FLOAT | 2 miles |
| | Tn_EZ/IZ/MZn.LAT.PT | FLOAT | 33.54563 |
| | Tn_EZ/IZ/MZn.LONG.PT | FLOAT | −111.97624 |
| | Tn_EZ/IZ/MZn.IP.PT | FLOAT | N/A (for this exclusion zone) |
| | Tn_EZ/IZ/MZn.GPS.PT | FLOAT | N/A (for this exclusion zone) |
| | Tn_EZ/IZ/MZn.MIN. FREQBAND.THRESHOLD | FLOAT | 3.7 GHz |
| | Tn_EZ/IZ/MZn.MAX. FREQBAND.THRESHOLD | FLOAT | 3.8 GHz |
| | Tn_EZ/IZ/MZn.MIN. INTENSITY.THRESHOLD | FLOAT | OFF |
| | Tn_EZ/IZ/MZn.MAX. INTENSITY.THRESHOLD | FLOAT | OFF |
| | Tn_EZ/IZ/MZn.RADIO. TOGGLE | ON/ OFF | ON |

Also, for instance, the following shows an example usage of the command to obtain aircraft flight data (with example data values):

TABLE 5

| | Get AC Aircraft Flight Data: | | |
|---|---|---|---|
| (INPUT) | Parameter | Type | Description |
| | ACn.ID | STRING | AA123 |
| | ACn.ID | INT | 123 |
| | ACn.ID.NAME | STRING | AC7 |
| | ACn.GND.lat | FLOAT | 33 |
| | ACn.GND.long | FLOAT | −110 |
| | ACn.GND.alt | FLOAT | 1000 ft |
| | ACn.GND.time | INT | Feb. 11, 2020 13:00 |
| | ACn.Type | Minutes | Aircraft |
| | ACn.origin | Degrees | JFK |
| | ACn.destination | destination | PHX |
| | ACn.lasttime position | position | DAL |
| | AC.ngroundspeed | FLOAT | 3000 |

Also, for instance, the following shows an example usage of the command to set (enable) the exclusion zone at a particular base station (with example data values), by disabling particular frequencies from an antenna:

TABLE 6

| | Set EZ (Implement Exclusion Zone within Base station): | | |
|---|---|---|---|
| (OUTPUT) | Parameter | Type | Description |
| | BSn.ID.NAME | STRING | Airport PHX77 |
| | BSn.ID.NAME | INT | 77 |
| | BSn.ID.NAME | STRING | Southwest Cell Tower77 |
| | BSn.RADIOn.TOGGLE | ON/OFF | C-BAND |
| | BSn.ANTENNAn. FREQn.TOGGLE | ON/OFF | BS7.ANTENNA1.FREQ2.DISABLE START 2021 Mar. 3 21:43:56; STOP 2021 Mar. 3 21:45:06; |
| | BSn.ANTENNAn. FREQn.TOGGLE | ON/OFF | BS22.ANTENNA1.FREQ2.DISABLE START 2021 Mar. 3 21:43:56; STOP 2021 Mar. 3 21:45:06; |
| | BSn.ANTENNAn. FREQn.POWER | ON/OFF | ON |

For instance, the following shows an example usage of the command to define (disable) the terrestrial network exclusion zone (with example data values):

TABLE 7

| | Define Terrestrial Network Exclusion Zone: | | |
|---|---|---|---|
| (INPUT) | Parameter | Type | Value |
| | Tn_EZn.ID | INT | TNEZ943 |
| | Tn_EZn.NAME | STRING | TN_EZ_PHX |
| | Tn_EZn.RADIUS | FLOAT | 2 miles |
| | Tn_EZn.LAT.PT | FLOAT | 33.54563 |
| | Tn_EZn.LONG.PT | FLOAT | −111.97624 |
| | Tn_EZn.IP.PT | FLOAT | N/A (for this exclusion zone) |
| | Tn_EZn.GPS.PT | FLOAT | N/A (for this exclusion zone) |
| | Tn_EZn.MIN. FREQBAND.THRESHOLD | FLOAT | OFF |
| | Tn_EZn.MAX. FREQBAND.THRESHOLD | FLOAT | OFF |
| | Tn_EZn.MIN. INTENSITY.THRESHOLD | FLOAT | OFF |
| | Tn_EZn.MAX. INTENSITY.THRESHOLD | FLOAT | OFF |
| | Tn_EZn.RADIO.TOGGLE | ON/OFF | OFF |

Also for instance, the following shows an example usage of the command to obtain updated aircraft flight data (with example data values):

TABLE 8

| | Get AC Aircraft Flight Data: | | |
|---|---|---|---|
| (INPUT) | Parameter | Type | Description |
| | ACn.ID | STRING | AA123 |
| | ACn.ID | INT | 123 |
| | ACn.ID.NAME | STRING | AC66 |
| | ACn.GND.lat | FLOAT | 33 |
| | ACn.GND.long | FLOAT | −110 |
| | ACn.GND.alt | FLOAT | 1000 ft |
| | ACn.GND.time | INT | Feb. 11, 2020 13:00 |
| | ACn.Type | Minutes | Aircraft |
| | ACn.origin | Degrees | SNR |
| | ACn.destination | destination | PHX |
| | ACn.lasttime position | position | DAL |
| | AC.ngroundspeed | FLOAT | 3000 |

Also, for instance, the following shows an example usage of the command to set (enable) the exclusion zone at a particular base station (with example data values), by disabling particular frequencies entirely from a particular radio:

TABLE 9

| | Set exclusion zone (Implement exclusion zone within Base station): | | |
|---|---|---|---|
| (OUTPUT) | Parameter | Type | Description |
| | BSn.ID.NAME | STRING | Airport PHX77 |
| | BSn.ID.NAME | INT | 77 |
| | BSn.ID.NAME | STRING | Southwest Cell Tower77 |
| | BSn.RADIOn.TOGGLE | ON/OFF | C-BAND |
| | BSn.ANTENNAn. | ON/OFF | BS10.RADIO1. DISABLE |
| | FREQn.TOGGLE | | START 2021 Mar. 3 21:43:56; STOP 2021 Mar. 3 21:45:06; |

TABLE 9-continued

| | Set exclusion zone (Implement exclusion zone within Base station): | | |
|---|---|---|---|
| (OUTPUT) | Parameter | Type | Description |
| | BSn.ANTENNAn. | ON/OFF | BS25.RADIO1. DISABLE |
| | FREQn.TOGGLE | | START 2021 Mar. 3 21:43:56; STOP 2021 Mar. 3 21:45:06; |
| | BSn.ANTENNAn. FREQn.POWER | ON/OFF | ON |

As shown, a variety of settings of the base station may be established to control what to change or turn on/turn off within such an exclusion zone, and the examples above are only provided for purposes of illustration. Such settings may include settings to: apply a "brute force" exclusion (e.g., turn a frequency band on or off, discontinue use of (massive) MIMO antennas, or control the use of certain cellular network features), control or mitigate the power intensity or use of a specific frequency, or control or modify other communication parameters. Such settings may also be associated and dependent on other factors such as the weather. Other parameters related to the configuration or use of the network may also be turned on/off or adjusted within an exclusion zone, such as to mechanically turn or tilt the antennas (e.g., to tilt downwards or away from the in-flight object). In some embodiments, control and/or data signals in the excluded frequencies may be adjusted to frequencies that are in other, non-excluded bands (including use of the unlicensed spectrum).

FIGS. 8A and 8B show a chart with more detailed usage of the applicable settings for implementing a terrestrial radio zone at particular base stations, frequencies, and antennas. For example, FIG. 8A shows the data values 820A, 820B (in data structure, e.g., data table, 810A) for implementing an zone from disabling particular frequencies at particular antennas of particular base stations. FIG. 8B shows the data values 820C, 820D (in data structure, e.g., data table, 810B) for implementing a zone from disabling particular frequencies or frequency ranges via particular radios. It will be understood that further data values may be defined to provide for a "partial" exclusion zone. The tables of settings shown in FIGS. 8A and 8B may be stored in an edge server that controls different base stations (or DUs or RRHs), in the non-real time RIC (or real-time RIC), or may be stored in the core network, such as in the AMF or SMF, for example. The stored information may be reported to one or more governmental (e.g., federal) agencies periodically, based on a request, and/or based on an abnormality such as interference being detected with a particular band.

Figure 9:
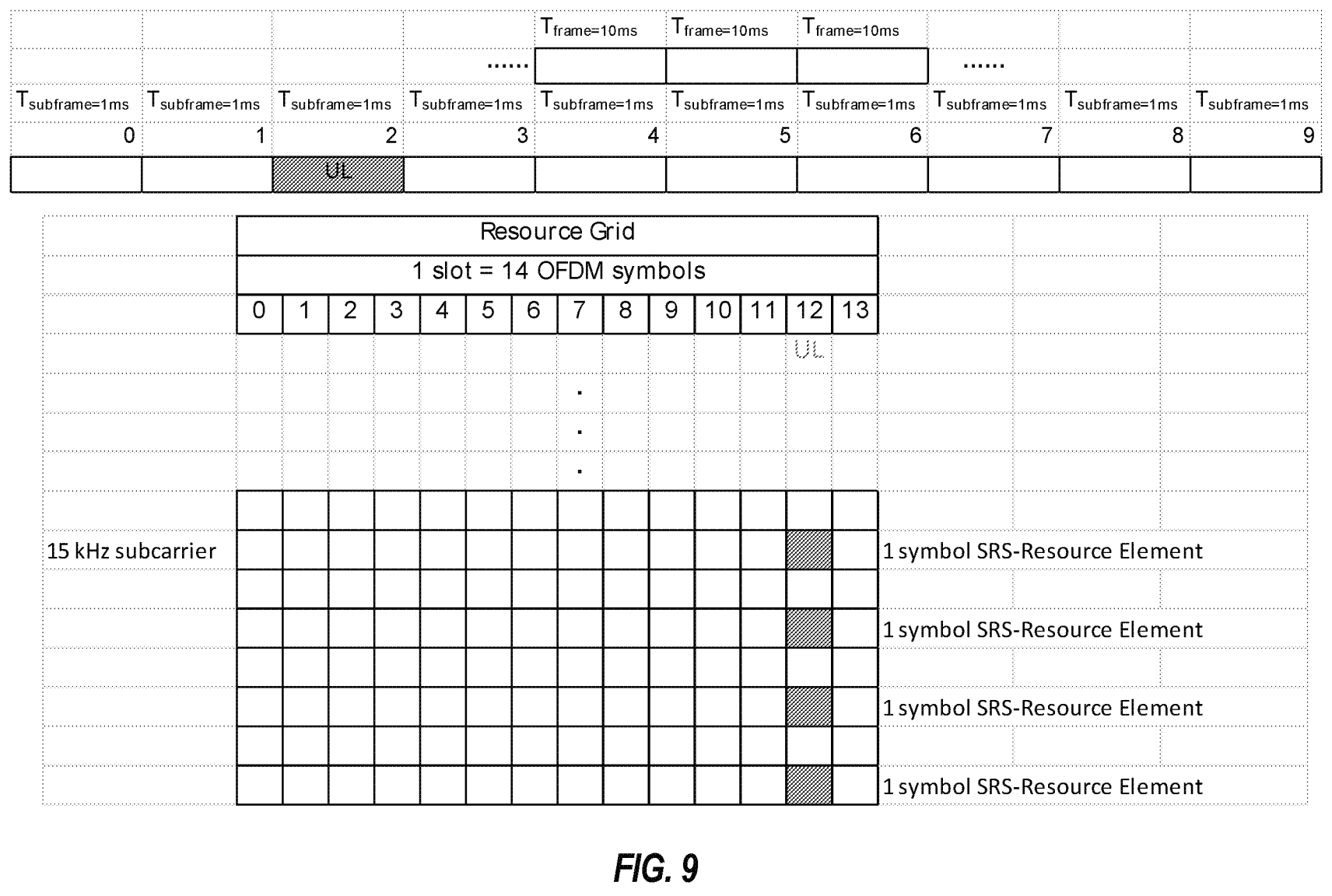

FIG. 9 depicts timing for uplink signals. In particular, FIG. 9 illustrates frames that are split into subframes. As shown, the frames are 10 ms in duration and are each split into 10 subframes of 1ms. Each subframe is formed from 2 slots of 14 OFDM symbols on a component carrier/resource element, each of which has a bandwidth (subcarrier spacing) of 15 kHz. Multiple component carriers (either adjacent and/or non-adjacent) are combined to form a resource grid over which control or data may be transmitted. In newer generations, the number, bandwidth, and/or timing (among other structural aspects of the communications) may be different from that shown. FIG. 9 also shows a time domain structure in which each subframe is either a dedicated uplink subframe, a dedicated downlink subframe, or a special subframe that is able to provide resources for both uplink and downlink transmissions. In particular, as noted above, within at least one of the uplink subframes, one or more OFDM symbols are reserved for SRS, whose transmission the base station may disable or modify.

Edge computing and edge network connectivity may include various aspects of RAN and software defined networking processing. Specifically, in many of these scenarios, wireless termination may be moved between ground and the transiting UE (e.g., airplane), depending on available processing and network resources. Examples of such processing scenarios are provided among FIG. 10, FIG. 11A, and FIG. 11B, depicting variations in scenarios in which 5G RAN processing occurs.

Figure 10:
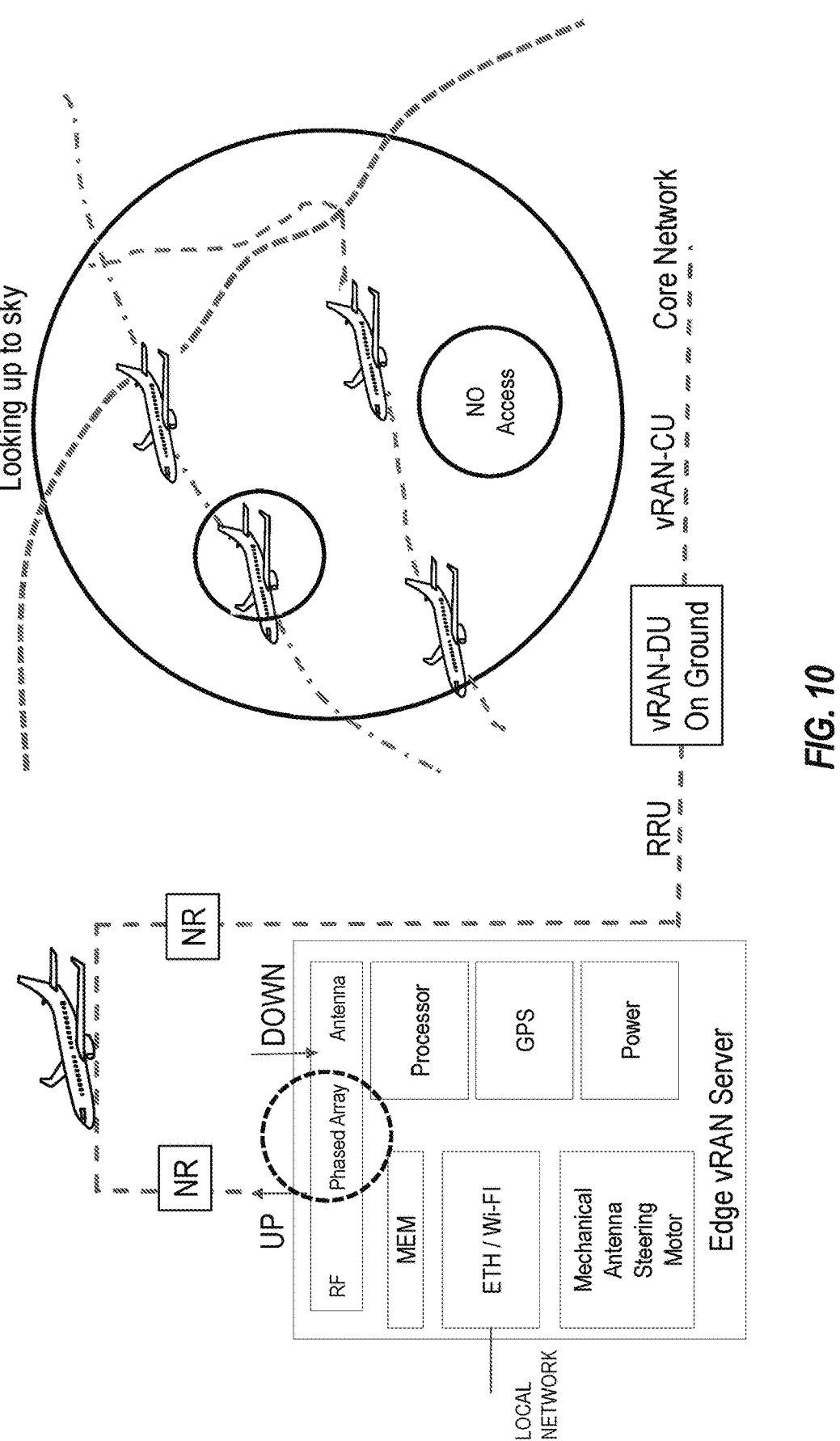
FIG. 10, FIG. 11A, and FIG. 11B depict variations in scenarios in which 5G RAN processing occurs, according to an example.
Figure 11A:
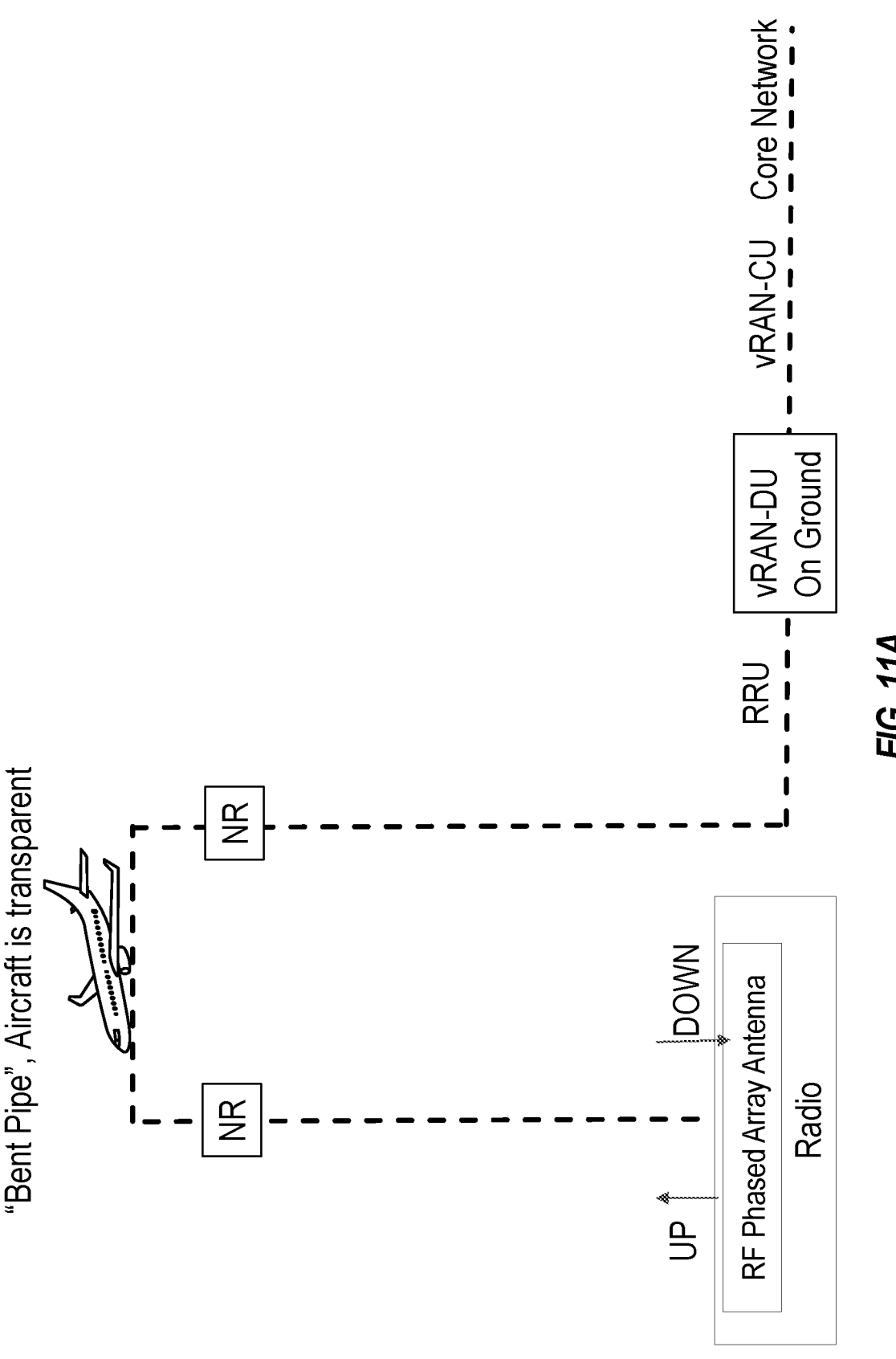
Figure 11B:
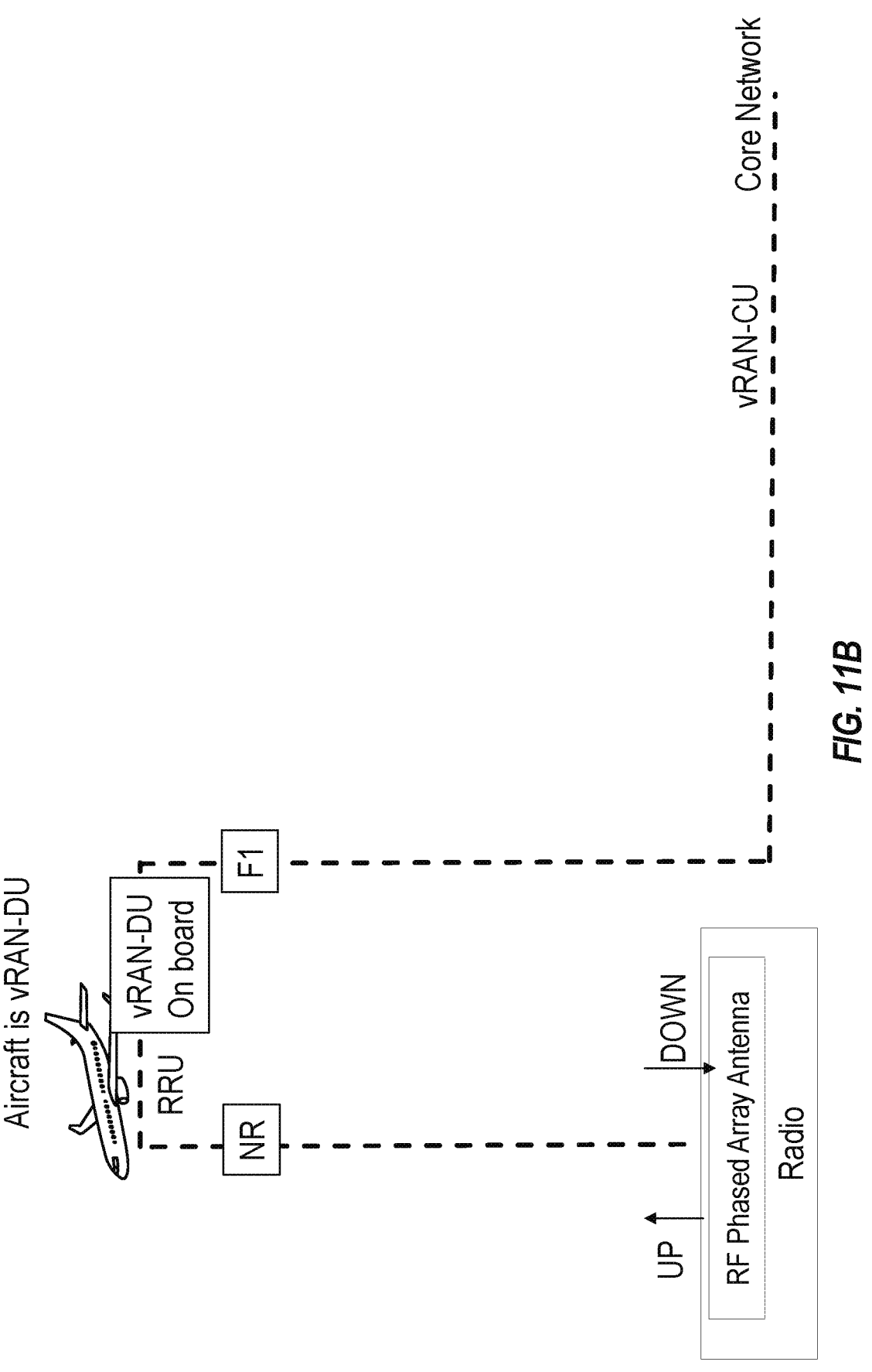

As shown in FIG. 10, FIG. 11A, and FIG. 11B, the core network may communicate with the UE via a CU, DU, and RRU. The CU, DU, and RRU may be implemented in one or more physical components. The CU and/or DU may be virtual (vRAN-CU/vRAN-DU). The RRU may contain an antenna array used to communicate with the UE. In some cases, a transponder on the UE may operate on a bent pipe principle similar to satellite transmissions, in which transmissions to the UE are sent back to an antenna array (e.g., the array in the RRU or the RF phased array antenna) in an edge server, with the transponder providing only amplification and a shift from uplink to downlink frequency.

The edge server may be a virtual edge server (edge vRAN server). The edge server may provide a number of functions described above and contain many of the components already discussed. For example, as shown, the edge server may include the RF phased array antenna to communicate with the UE, as well as a processor to provide the desired operations (e.g., determination of whether the UE is in the zone, and generate the appropriate signals if so), separate location sensors such as GPS to supplement UE location in addition to 5G methods (e.g., time difference of arrival (TDoA), angle of arrival (AoA)), power control for the components in the edge server, memory (MEM) to store data of the UE (as well as information from the core network), connections to a local network (ethernet and/or Wi-Fi, among others), and a mechanical antenna steering mechanism to adjust the RF phased array antenna based on information from the processor. In some embodiments, the bent pipe arrangement may be avoided, and the RRU may be provided in the edge server.

As illustrated, the edge server may provide network services within a broad area for a significant number of UEs within the area. A sub-area within the broad area may be defined to be an exclusion zone (or inclusion or mitigation zone) by the edge server (or core network) as described. The processor in the edge server may track each of the UEs (based on the flight information and/or 5G mobility information) to determine whether one or more of the UEs is within or is about to enter the exclusion zone. The calculations to make the determination and/or to adjust the RF phased array antenna may be performed in the edge server. Note that while only one zone is shown, multiple zones (exclusion and/or inclusion) may be present over the entire area served by the edge server and RF phased array antenna. In other embodiments, the entire area may be an exclusion zone (or inclusion or mitigation zone).

Although FIGS. 10 and 11A show the O-RAN components (vRAN-CU, vRAN-DU, and RRU) disposed on the ground (disposed within one or more physical entities), as the O-RAN components may be virtual components one or more may be disposed in other locations. This is shown in FIG. 11B, in which the vRAN-DU and RRU are disposed not on the ground along with the vRAN-CU, but instead are disposed on the UE (aircraft) to form the bent pipe. In some embodiments, control of the RF phased array antenna may not be local to the radio that houses the RF phased array antenna, instead being provided by the vRAN-DU and RRU, which may be on the ground or disposed on the UE.

It will be understood that zones may be defined or controlled by a variety of entities, such as government agencies, or particular service providers, aviation companies, or the like. Such zones may be implemented based on certain interference or activity threshold, environmental conditions (e.g., to apply exclusion logic if a rainy/stormy day and airline altimeters are in use, whereas in good weather such altimeters are not used so exclusion logic is not applied) through the mechanisms and devices above.

Other information such as cell tower/antenna locations, frequency band and location buffers, and/or real-time flight information (including airplane flight plan changes) may also be considered in implementation of the zones. In this manner, dynamic (real-time) calculations may be performed to determine whether changes are to be made to the antenna settings; and if so, to enforce creation of each zone (and modification of the characteristics thereof) by the particular radios and frequencies, on each of the cell towers. Calculation of such dynamic changes may be performed at edge computing locations such as at the edge server/vRAN/base station proximate the cell towers: the server may also be used to manage other aspects of the cellular network communications from one or more associated towers (in conjunction with the CU, DU, and core network). In other examples, various aspects of the zone may be pre-calculated and pre-distributed in advance for use at network equipment. Variations may be provided based on changes to the network equipment infrastructure, such as for those proposed in 6G networks.

Logging and data verification operations may also be associated with the exclusion zones discussed herein. For example, data records may be maintained to determine that zones were in use at particular locations (e.g., airports) at particular times (and the associated cellular equipment was not radiating in an undesired manner). Telemetry and the use of sensor data (from individual sensors and/or sensed via communications from the UE) may also provide a mechanism to determine the amount of real-time interference and to mitigate such interference with the use of the presently described exclusion zones.

Other types of cellular network zones may be implemented with the present techniques based on implementation at a geographic sensitive area. These may include variations and other types of exclusions or mitigations at locations such as at defense installations, military installations, radio telescope equipment, data centers, etc., or based on the type of aircraft, drone, or in-motion object.

Implementation of Inclusion Zone

In an example, an exclusion or mitigation zone may be overridden for emergency or broadcast purposes. This may be accomplished through an "inclusion zone." Such an inclusion zone may permit data communications within an area, such as in a manner that is opposite of exclusion zone, overriding previously defined types of communication exclusion zones (including geographic signal exclusion zones, frequency exclusion zones, etc.). In this case, a dynamically indicated (e.g., via DCI) inclusion zone or a newly instituted inclusion zone (e.g., update to one of the above tables) may override a previously indicated exclusion (or mitigation) zone. Such an inclusion zone may be used for purposes such as to enable transmission of an "amber" alert.

In an example, an inclusion zone may be defined in a similar manner as an exclusion (or mitigation) zone as discussed above, for a limited area or a limited time, or limited to a particular base station, antenna, radio, set of frequencies (e.g., non-C band such as unlicensed frequencies), geographic area, etc. For instance, an inclusion zone may be used to allow safety messages to be communicated to geographic jurisdictions that would otherwise be excluded from communications, such as a safety message relating to a tsunami or other multi-jurisdiction event. Use of an inclusion zone may enable a UE to use the prohibited communication band even though the UE would have otherwise been prohibited from communication when in the zone.

Definitions for Zone Mitigation

As will be understood, the use of exclusion, inclusion, or mitigation zones may be coordinated among multiple types of networks. For instance, standardized zone definitions and descriptions may be shared across Terrestrial (5G or other generation) and Non-Terrestrial Service Providers for consistency. As a result, exclusion, inclusion, or mitigation zones may be coordinated among multiple Terrestrial and GEO/NGOS solutions, including those between different providers.

Implementations of exclusion, inclusion, and mitigation zones within separate Non-Terrestrial Network constellation providers may vary, depending on the particular operational settings of such providers. However, zone descriptions for ground-based exclusions, inclusions, or mitigations may be sharable across multiple service providers, including across different cloud service and telecommunication service providers. This may be particularly helpful as communication scenarios may involve sessions or data being dynamically exchanged between different Non-Terrestrial Network constellation providers, including communication sessions or data being switched to a different Non-Terrestrial Network constellation provider to avoid zone conflicts.

Zone descriptions may follow or be defined by particular communication standards. Standard exclusion zone descriptions to "fixed" zones and zone values may be used to formulate and influence routing and switching payloads, that can then help service providers coordinate communication operations (especially, as there is an increase in the number of NGOS satellites). Further examples of exclusion zone definitions, descriptions, and tables, are provided in FIGS. 13 to 19, discussed below.

Example Workflows for Zones

Figure 12A:
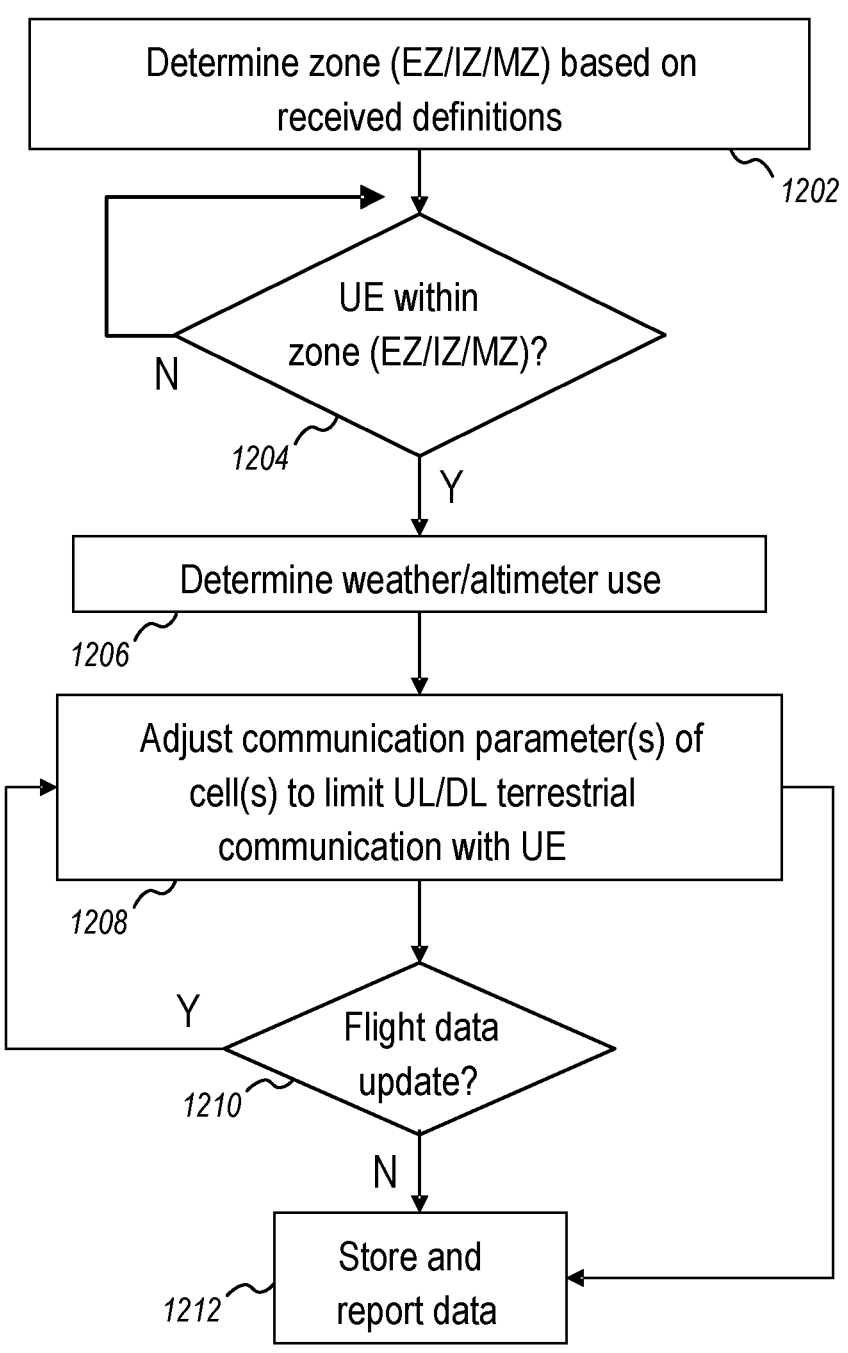
FIG. 12A illustrates a method of implementing terrestrial zones for a terrestrial communication network, according to an example.

FIG. 12A illustrates a method of implementing terrestrial mitigation zones for a terrestrial communication network, according to an example. Some operations in the method 1200A may not be present in some embodiments, while in other embodiments additional operations not shown may be present. The operations may be performed, for example, by an edge vRAN server (although other devices may perform some or all of the operations herein).

At operation 1202, the edge vRAN server may determine one or more zones based on definitions propagated to one or more airports from one or more government (e.g., federal) agencies. Each zone may have a predetermined geographical area, which may have the same size and characteristics or may be different.

At operation 1204, the edge vRAN server may determine whether a UE of controllable elevation (i.e., a UE of or in an aerial object) is within the zone of a predetermined geographical area.

At operation 1206, the edge vRAN server may determine the weather proximate to the UE and/or whether the UE has an altimeter in use.

In response to a determination that the UE is in the zone and the zone is the exclusion or mitigation zone, at operation 1208, the edge vRAN server may adjust at least one communication parameter of at least one cell to limit at least one of uplink or downlink terrestrial communication with the UE. The at least one communication parameter may include deactivation of at least one predetermined frequency band while frequency bands other than the at least one predetermined frequency band remain active, reduction of a power of communications in at least one frequency, adjustment of transmission angles of at least one predetermined frequency band, and/or physical adjustment of at least one phased array antenna controlled by the edge vRAN server (e.g., by tilting the at least one phased array antenna downwards). In some cases, the adjustment may be dependent on the weather and/or altimeter use (while in other cases the adjustment may be independent of the weather and/or altimeter use). In some aspects, the adjustment may be dependent on flight data of the UE. In some aspects, the use of an inclusion zone within an exclusion zone may permit readjustment of the at least one communication parameter to permit uplink and downlink terrestrial communication with the UE At operation 1210, the edge vRAN server may receive real-time updates of the flight data of the UE and adjust the at least one communication parameter dependent on the real-time updates.

At operation 1212, the edge vRAN server may store data of the at least one cell in the memory, the data including active frequencies and timing of when the active frequencies are deactivated, and report the data to a governmental agency.

Figure 12B:
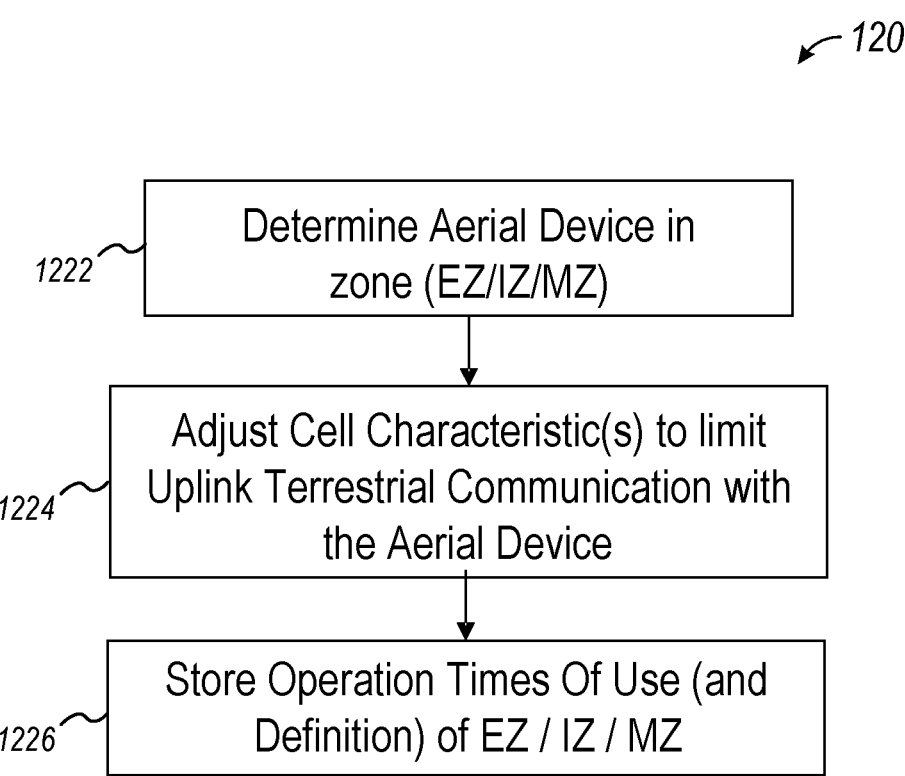
FIG. 12B illustrates another method of implementing terrestrial zones for a terrestrial communication network, according to an example.

FIG. 12B illustrates another method 1200B of implementing terrestrial zones for a terrestrial communication network, according to an example. Some operations in the method 1200B may not be present in some embodiments, while in other embodiments additional operations not shown may be present. The operations may be performed, for example, by a computing system (although one or more other devices may perform some or all of the operations herein). The computing system may include an O-RAN having a vRAN-CU, vRAN-DU, and RRU, a phased array antenna, and a memory device. The operations may be performed based on instructions embodied in the memory device. The vRAN-CU, vRAN-DU, and RRU are disposed on ground, or the vRAN-CU is disposed on ground, and at least one of the vRAN-DU or RRU are disposed on the aerial device.

At operation 1222, the computing system may determine that an aerial device is within a terrestrial network exclusion or mitigation zone of a predetermined geographical area served by a cell.

At operation 1224, the computing system may adjust at least one characteristic of the cell to limit uplink terrestrial communication with the aerial device. The at least one characteristic includes a frequency band, transmission power on the frequency band, and/or mechanical adjustment of the phased array antenna.

At operation 1226, the memory device may be configured to store a definition of the exclusion or mitigation zone and operation times of use of the exclusion or mitigation zone.

Maintenance and Coordinated Operational Uses of Zones

Note that although exclusion zones are referred to below, similar characteristics apply to mitigation zones. In other examples, the zones discussed herein may be extended to aspects of zone modification or mitigation. One implementation of such coordination may occur in the context of an in-orbit/maintenance mode exclusion zone that is specifically used to remap (reroute) a constellation. Here, an exclusion zone could define an outage ahead of time, and edge computing routing path would plan for the outage.

As one example, a maintenance-mode exclusion zone may be used when an existing satellite vehicle (SV) is to go offline for servicing and diagnostics, to change its battery, or as a result of other aspects of maintenance. A maintenance mode exclusion zone may be established at the request of the constellation operator A which may cause rerouting to constellation operator B (assuming those operators have co-sharing agreement). Such inter-operator coordination may be implemented as discussed above.

A maintenance-mode exclusion zone can also be used exclusively with a single operator to prepare for capacity expansion while minimizing service outages. This may occur, for instance, when a constellation operator launches new SVs. A maintenance-mode exclusion zone may protect customers already serviced by the existing SVs by ensuring if predetermined packet loss or latency guardbands are exceeded, the maintenance mode exclusion zone may re-route in the existing constellation (or, leverage co-sharing constellation(s) to avoid outages or service degradation).

Another variation of a maintenance mode exclusion zone may occur in the context of in-space exclusion zones designed for maintenance or for collision-avoidance purposes. For instance, a debris exclusion zone may be defined to avoid debris (e.g., space junk) using an in-orbit/in-space exclusion zone. This exclusion zone may be used to avoid collisions and or prevent operation within the exclusion zone in-orbit based on one or more predefined values set for the exclusion zone. It will be understood that this debris exclusion zone does not "clean" debris, but rather the debris exclusion zone can navigate around such debris by using orbital adjustments depending on probability of impact and or interference. A maintenance-mode exclusion zone can also be implemented as a result of other space-originated outages or interruption events, such as a solar storm, asteroid interference, or anything else that would impact space-qualified silicon and/or communications.

A debris or other maintenance exclusion zone may result in physical movement out of a planned orbital path. For impact in an exclusion zone, a physical move of an SV would be orchestrated with thrusters (e.g., without the orbit plan approved by the FCC or other regulators). A debris-related maintenance exclusion zone also may provide an ablation cascade mode that is like an emergency mode if the space debris prevents the preapproved orbital plane. The more debris is that is deposited in the atmosphere lead to more in-orbit debris exclusion zones until the debris burns up (which often takes years). Accordingly, the debris exclusion zone is updated based on debris orbital data tracked and cataloged by an organization such as NORAD. (The opposite of an exclusion zone—an inclusion zone—can also be used to target debris with mitigation to advance burn up or heat with a laser to change orbit).

It will be understood that other aspects of a maintenance exclusion zone may include adjustment or control of individual spot beams, other physical movements, and satellite controls. Further, a maintenance exclusion zone may result in a variety of rerouting or coordination of functions within a constellation, between different constellations, or even between different types of satellite networks entirely (such as coordination between networks using different types of orbits, as follows).

The exclusion zones discussed above also may be extended for use in space, in some form of in-orbit and/or hybrid earth-orbit exclusion zone. An exclusion zone may be defined between different orbit types (e.g., LEO/GEO/HEO/

Sun-Orbit), even up to the moon or beyond. An exclusion zone may be used to address the issue of interference, debris, planned missions, unplanned collisions, or other issues experienced at multiple orbit altitudes.

Figure 13:
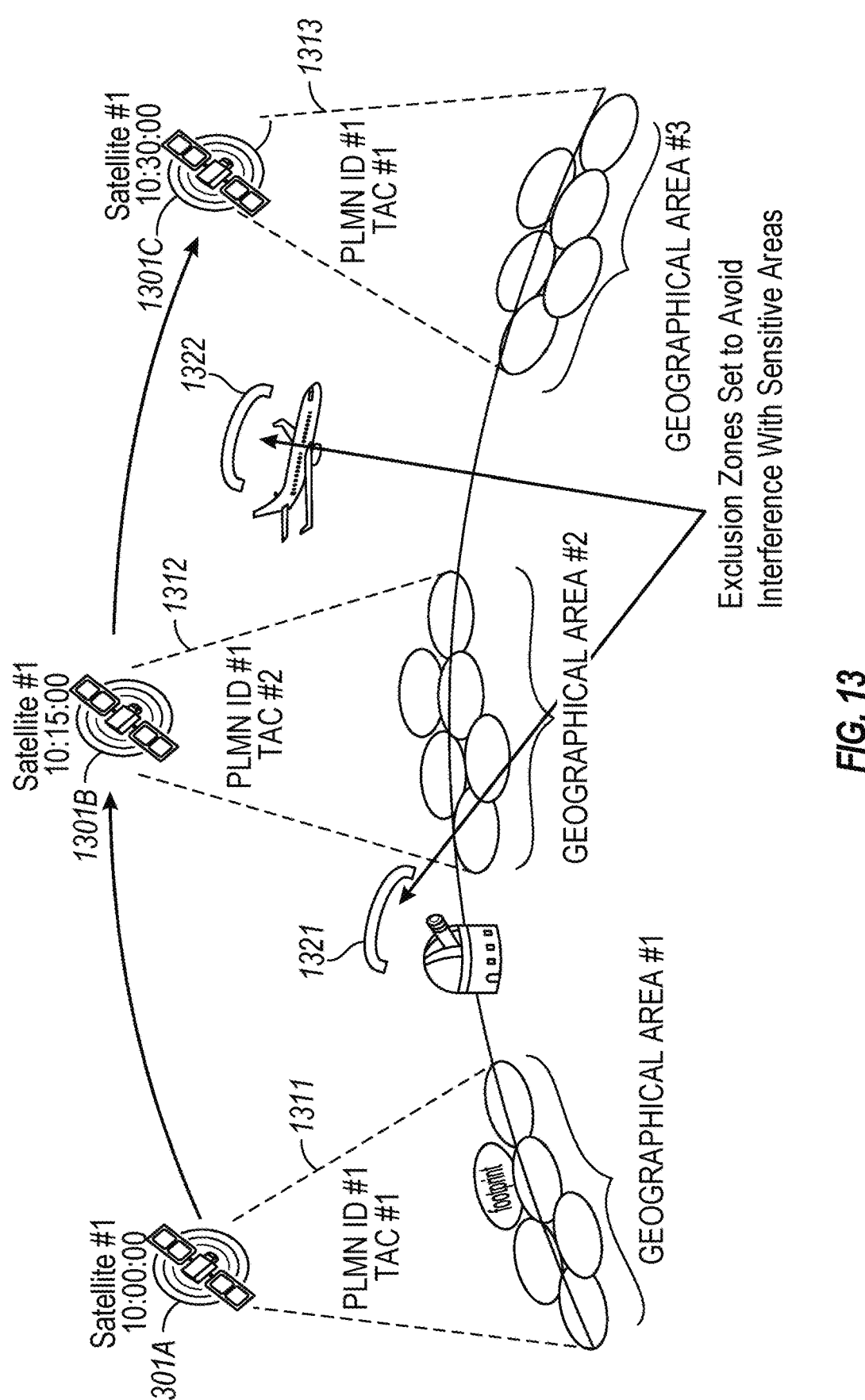
FIG. 13 illustrates an implementation of zones for a non-terrestrial communication network, according to an example.

FIG. 13 illustrates an implementation of SV-based exclusion zones for a non-terrestrial communication network, according to an example. This drawing provides additional detail on an example deployment of exclusion zones, over time, relative to a satellite #1 at orbit positions 1301A, 1301B, 1301C. At position 1301A, the satellite #1 provides coverage of its spot beam(s) in a first geographic area 1311: at position 1301B, the satellite #1 provides coverage of its spot beam(s) in a second geographic area 1312: at position 1301C, the satellite #1 provides coverage of its spot beam(s) in a third geographic area 1313.

FIG. 13 shows the implementation of a first exclusion zone 1321, which is a fixed geographic exclusion area. A fixed geographic exclusion area may be appropriate for preventing overlap with terrestrial networks which would conflict (e.g., cells established from a 4G/5G mobile network), or a fixed areas which is designated to instructed to be avoided (e.g., other countries, radio silence areas, sensitive monitoring equipment such as radio telescopes). FIG. 13 further shows the implementation of a second exclusion zone 1322, which is a mobile geographic exclusion area. A mobile geographic area may be appropriate for objects or areas which are in motion, moveable, or whose position is not necessarily fixed in a specific geographic area (e.g., airplanes, drones, other satellites), or for an area that has an irregular or changing shape. The implementation of either type of exclusion zone prevents the satellite from beaming on the area of conflict or restriction.

Figure 14:
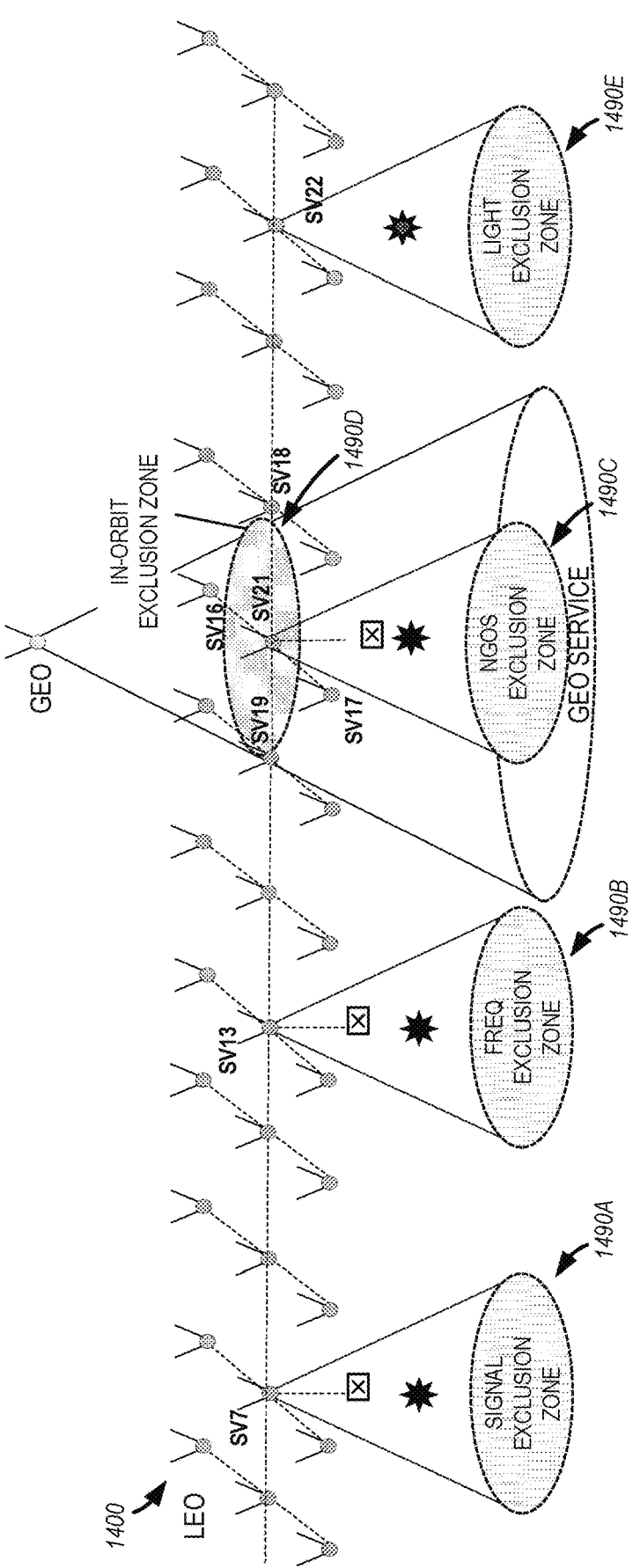
FIG. 14 illustrates various types of zones implemented for a non-terrestrial communication network, according to an example.

FIG. 14 illustrates further scenarios of network connectivity from an expanded view of a satellite constellation 1400, with the constellation comprising dozens of LEO satellites that provide connectivity to ground UEs (not shown). Within this scenario, a number of different exclusion zones are shown for deployment: a signal exclusion zone 1490A which blocks all signals from reaching a geographic area: a frequency exclusion zone 1490B which blocks certain frequency signals from reaching a geographic area: an non-geostationary orbit satellite (NGOS) exclusion zone 1490C which restricts signals from reaching a certain area which overlaps geostationary satellite service: an in-orbit exclusion zone 1490D which restricts inter-satellite communications which occur in an overlap of geostationary satellite service; and a light pollution exclusion zone 1490E which restricts reflection or causes some light reflection mitigation effect relative to an geographic area. Such exclusion zones 1490A-E may be separately or concurrently deployed with one another.

In the context of FIGS. 13 and 14, exclusion zones and associated fast path contact scheduling (discussed in more detail below) can apply to multiple constellations serviced by separate providers. For instance, different constellations may have separate GMSS identifiers (i.e., satellite equivalent of PLMN). Exclusion zones may intercept all applicable constellations, since exclusion zones are typically "fixed" and are independent of the constellation ownership and/or providers.

Pre-determined LEO routing is used to maintain orbit and ISL connectivity alignment, and may be required to be communicated to the LEO vehicles on a frequent basis, such as each day. Exclusion zones among ISLs may be implemented to be coordinated with planned network routing calculations and communications that already occur among ground and space nodes of the LEO network. For instance, the regular communication of routing information that is provided to LEO vehicles may also be used to provide a specification of multiple exclusion zones at the same time (including, exclusion zones defined between SV-to-SV (to enable or disable ISLs) or between SV-Earth (to enable or disable geographic coverage)). The definition of exclusion zones with routing information increases efficiency of constellation, especially for form-flying constellations (e.g., similar to Iridium, Starlink, and the like).

In an example, exclusion zones may be calculated and provided with orbit and ISL connectivity alignment information. Thus, LEO SVs may be instructed to implement exclusion zones, when receiving instructions to adjust orbital position. Such instructions may include turning various ISL connections on and off, adjusting right, left, fore and aft antennas (regardless or implementation type), if a scenario is projected where an ISL is interfering with a higher-orbit satellite communication (or vice versa). Other considerations established with these exclusion zones may include routing that considers ground and space nodes, including exclusion zones implemented at the same time (whether SV-to-SV or SV-earth exclusion zones), while increasing the efficiency of a constellation. These exclusion zones may also consider that form-flying ISLs antennas often require (1) beam steering, (2) high directivity, and (3) longer ranges and larger apertures than free flying swarm constellations.

FIG. 15 illustrates a flowchart of an example method 1500 of defining and communicating exclusion zones.

The method begins, at operation 1510, to calculate, based on a future orbital position of a low-earth orbit satellite vehicle, an exclusion condition for communications from the satellite vehicle.

The method continues, at operation 1520, to identify, based on the exclusion condition and the future orbital position, a timing for implementing the exclusion condition for the communications from the satellite vehicle.

The method continues, at operation 1530, to generate exclusion zone data for use by the satellite vehicle. In an example, the exclusion zone data indicates the timing for implementing the exclusion condition for the communications from the satellite vehicle.

The method completes, at operation 1540, to cause communication of the exclusion zone data to the satellite vehicle. In an example, the operations of the method 1500 are performed by a ground-based data processing server at a regular interval, and this communication occurs from the ground-based data processing server to the satellite vehicle. In further examples, the operations of the method 1500 are performed at least in part using computing hardware of the satellite vehicle.

In an example, the exclusion condition of method 1500 is an exclusion of use of a communication frequency onto a terrestrial geographic area. For instance, the exclusion zone data may further identify the communication frequency, and implementation of the exclusion zone data at the satellite vehicle causes the satellite vehicle to discontinue use of the communication frequency while in communication range over the terrestrial geographic area.

In an example, the exclusion condition of method 1500 is an exclusion of use of a spot beam onto a terrestrial geographic area, and the exclusion zone data further identifies the spot beam of the satellite vehicle, as implementation of the exclusion zone data at the satellite vehicle causes the satellite vehicle to discontinue use of the spot beam while in communication range over the terrestrial geographic area.

In an example, the exclusion condition of method 1500 is an exclusion of use of an inter-satellite link from the satellite vehicle, and the exclusion condition is based on the future orbital position overlapping with communications from another satellite vehicle. For instance, the inter-satellite link may be defined based on a fore, aft, right, or left direction from the satellite vehicle.

In an example, the exclusion condition of method 1500 is an exclusion of use of a cellular network coverage at a geographic area, and implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In an example, the exclusion zone data of method 1500 is communicated to the satellite vehicle with a routing table, as the routing table operates to control the future orbital position of the satellite vehicle. In other examples, aspects of a routing protocol, routing protocol data, routing data, or configuration data (e.g., in a particular format) for routing and routing settings may be communicated. In a further example, the exclusion zone data includes attestation or authentication information for verification by the satellite vehicle. Additionally, in a further example, the exclusion zone data may be designated and used by a plurality of satellite vehicles in a constellation including the satellite vehicle.

Figure 16A:
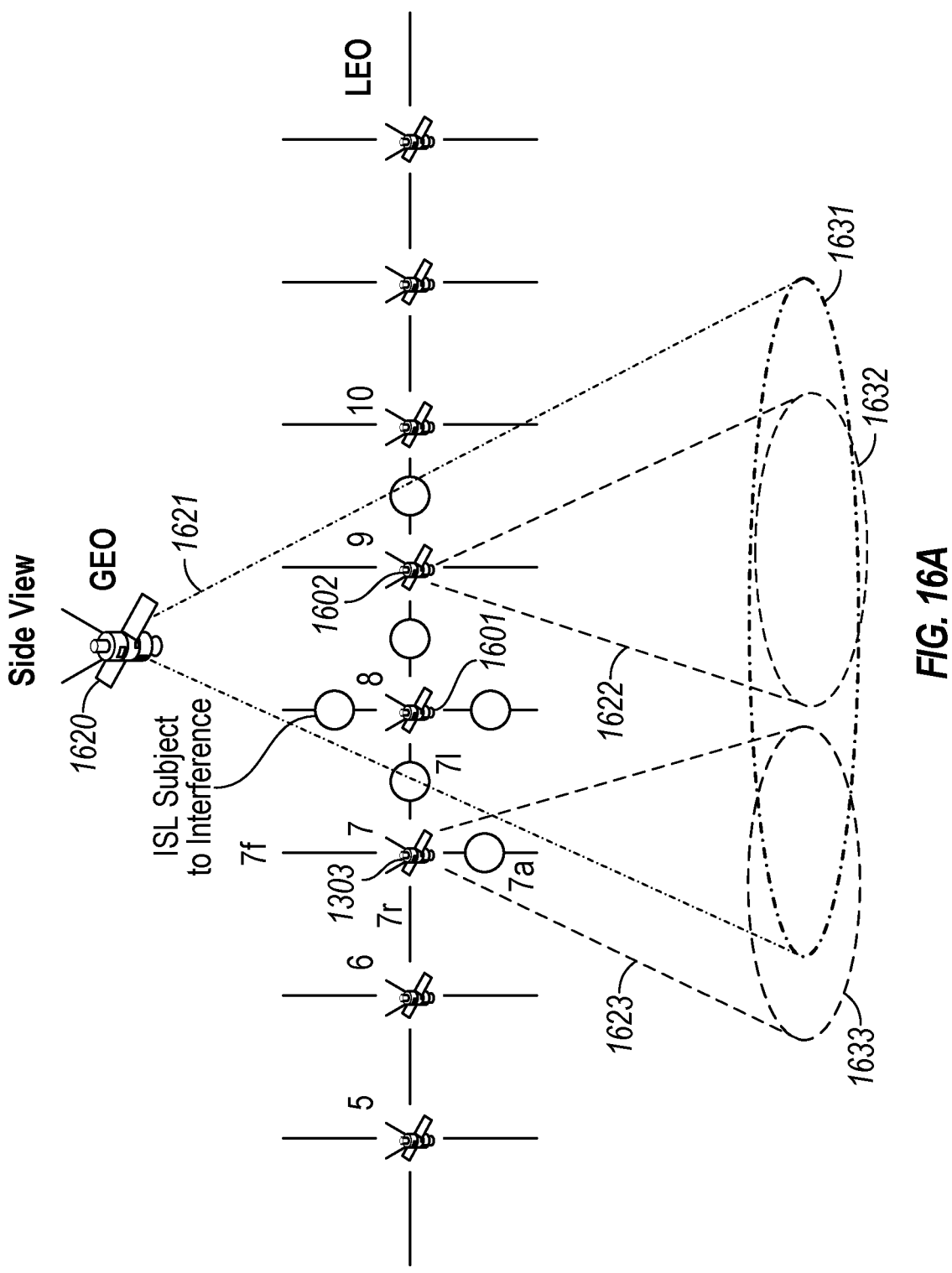
FIGS. 16A and 16B illustrate views of an example interference scenario in inter-satellite communications of a non-terrestrial communication network according to an example.
Figure 16B:
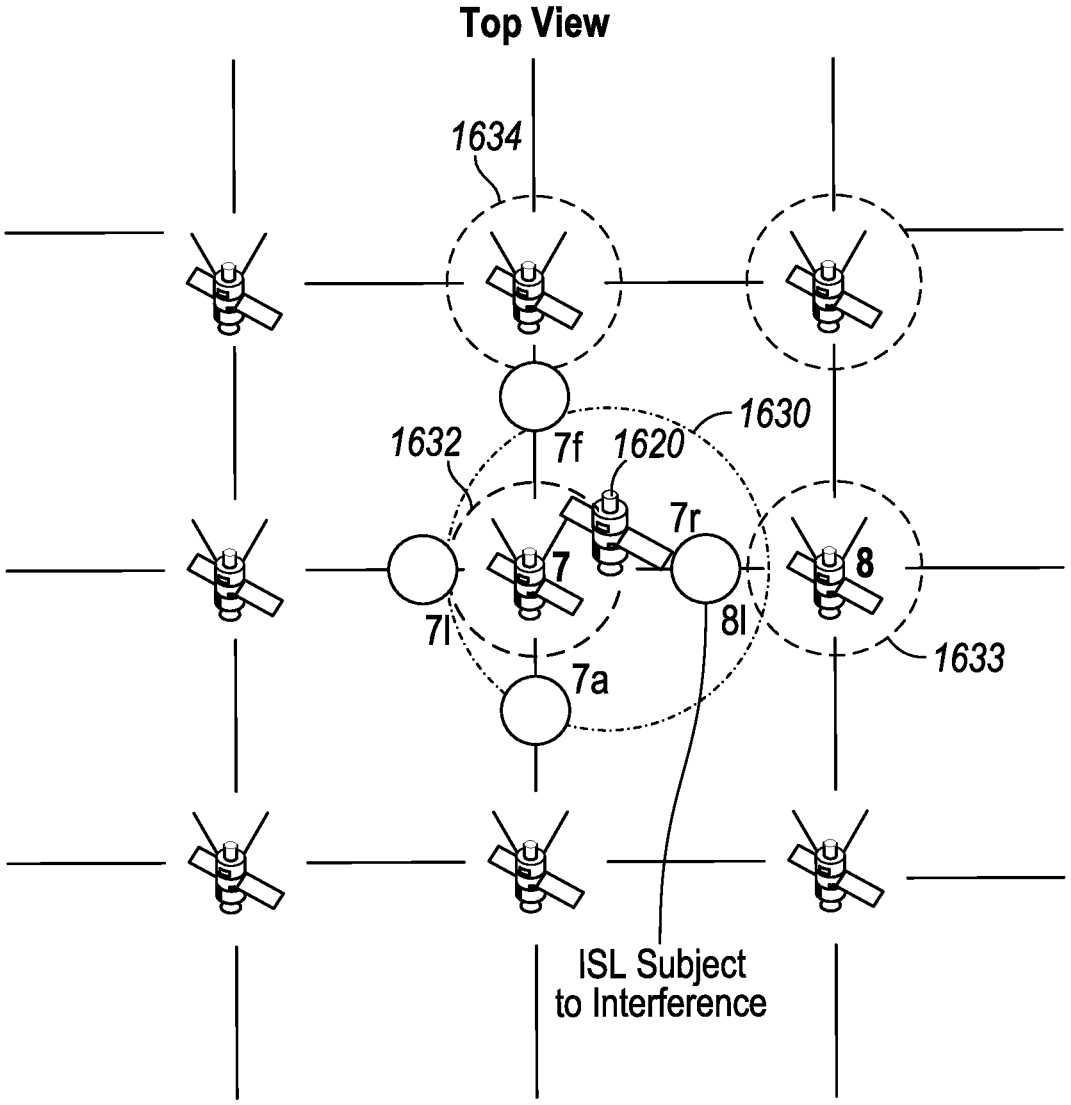

FIGS. 16A and 16B illustrate side and top views, respectively, of an example interference scenario in inter-satellite communications of a non-terrestrial communication network. As shown, a GEO satellite 1620 provides a beam coverage 1621 at a geographic area 1631. LEO satellites 7 (1603), 8 (1601), and 9 (1602) provide coverage that overlaps the geographic area at least in part, shown with LEO spot beam 1623 from satellite 7 1603, and LEO spot beam 1622 from satellite 9 1602.

Among LEO satellites 1601, 1602, 1603, a number of inter-satellite connections (ISLs) exist, in right, left, fore, aft directions. This is demonstrated from a top view in FIG. 16B, where satellite 7 1603 and satellite 8 1601 use ISLs to communicate with each other and a number of other satellites in the constellation. In response to determining that the GEO satellite 1620 will encounter interference with inter-satellite links within the coverage of its beam 1630 (at the LEO altitude), relevant ISLs which potentially interfere with the beam may be disabled.

A designation of beams, or specific frequency in links, to disable is shown in FIG. 16B, where all ISLs with satellite 7 1602 are turned off (due to satellite 7 1602 being located entirely within the coverage area of the beam 1630), in the fore, aft, left, right locations; whereas only the left communication between satellite 7 1602 and satellite 8 1601 is disabled.

The use of exclusion zones may be implemented in simple or complex terms, including simple methods to turn the antennas (and communication paths) off to reduce interference. This provides a method of imposing organic exclusion zones for constellation routing, and reduces wear and tear on network and network processing.

In an example, a service provider can initiate an ISL interference mitigation exclusion zone, by communicating relevant parameters discussed in the examples below (e.g., exclusion zone.id, exclusion zone.name, exclusion zone.ground, exclusion zone.ground.radius, exclusion zone.ground.lat, exclusion zone.ground.long, exclusion zone.ground.IP, exclusion zone.ground.GPS, exclusion zone.min.intensity). For example, such parameters may specify ID GEOsatelliten, and the characteristics of when an ISL exclusion zone should be in operation (e.g., when operating over a ground latitude and longitude at 111 degrees meridian west). A system implementing an ISV exclusion zone also may obtain future SV (fly-over) positions relative to a ground location. The response provided from a footprint command (e.g., Get SV Footprint, discussed below), may provide information to determine an expected response from fly-over telemetry (readily available via NORAD or from a constellation provider).

To prevent interference, a calculation of the exclusion zone may evaluate: (1) Does SV.n.fly-over overlap/intercept with exclusion zone.n.area? (2) If there is overlap of the area, does SV.min.intensity>exclusion zone.min.intensity? (3) If Yes, then prepare to turn-off (or, lower intensity in accordance with a service provider agreement) the SV beams, links, or specific frequencies within beams or links by using an appropriate command (e.g., Set SV exclusion zone command).

In an example, a Set SV exclusion zone command is defined to include the following parameters to control inter-satellite communication links:

TABLE 10

| Parameter | Type | Comments |
|-----------|------|----------|
| SV.EZ.fore | Int | On/off based on interference |
| SV.EZ.aft | Int | On/off based on interference |
| SV.EZ.right | Int | On/off based on interference |
| SV.EZ.left | Int | On/off based on interference |

In an example, with no interference, SV.EZ.fore, SV.EZ.aft, SV.EZ.right, and SV.EZ.left, are set to "on". In an example, with calculated interference from other satellites, one or more of these values (e.g., SV.EZ.aft, SV.EZ.right, SV.EZ.left) are set to "off", while zero or more of the values (e.g., "SV.EZ.fore") are set to "on". Thus, in scenarios where GEO and LEO deployments are overlapping via the LEO ISLs, the capability of turning on and off a link in a particular direction may immediately remedy any possible interference.

ISL exclusion zones can also be defined to address potential interference concerns related to potential competitive LEO constellations or even for the same constellation in the different orbital planes. Thus, an exclusion zone may be defined to apply to particular frequency bands, or whatever frequency (e.g., to disable all ISLs of LEOs that fly under the GEO, or that have a potential of disruption based on other GEO, MEO, or LEOs).

In further examples, the consideration of interference or possible disruption, and the use of ISL exclusion zones, may be based on a service provider policy. For example, a LEO provider which operates a premium service using ISLs, may disable or adapt aspects of the ISLs based on any possibility of disruption or interference (e.g., relying on ISL routing through other paths).

Accordingly, any of the examples of ISL exclusion zones may be implemented and determined based on inter-constellation interference or disruption (e.g., within the same constellation), from other satellites or constellations (e.g., within different satellite altitudes) in the same or different orbital plane, or for policy considerations (e.g., to guarantee premium routing services do not encounter disruption). Other variation for the control, definition, and use of exclusion zones (and controls of frequency bands or types of communications within an exclusion zone) may also be provided.

Comparison of Exclusion Zone Commands and Techniques

As will be understood, standard exclusion zone Descriptions (and Language) may be shared across Terrestrial/Non-Terrestrial Service Providers for consistency and coordination among multiple-5G Terrestrial and geostationary/non-geostationary orbit (NGO) solutions. Implementations of exclusion zones within separate Constellation Providers may vary but exclusion zone Descriptions for ground-based keep-out areas may be sharable across Service Providers, including Cloud and Telecommunication Service Providers. In general, standard "fixed" exclusion zones descriptions may be used to formulate and influence routing and switching payloads to help Service Providers coordinate as the number of NGO satellites and systems increase.

In an example, various commands for exclusion zones may include commands to: Define exclusion zone (to define exclusion zones), Get SV (to obtain SV orbital fly-by information), and Set exclusion zone (to implement an exclusion zone within a constellation). Such commands may be extended for use with constellations, with the following definitions (with "EZn" referring to an identifier of an nth exclusion zone):

TABLE 11

| Define exclusion zone (Define Exclusion Zone): | | |
|-----------|------|-------------|
| Parameter | Type | Description |
| EZn.ID | INT | EZ Unique ID |
| EZn.NAME | STRING | EZ Name |
| EZn.RADIUS | FLOAT | EZ Radius for KEEP OUT AREA |
| EZn.LAT.PT | FLOAT | EZ Latitude Ground/Sky Center Point for KEEP OUT AREA |
| EZn.LONG.PT | FLOAT | EZ Longitude Ground/Sky Center Point for KEEP OUT AREA |
| EZn.IP.PT | FLOAT | EZ IP Address Ground/Sky Center Point for KEEP OUT AREA |
| EZn.GPS.PT | FLOAT | EZ GPS Ground/Sky Center Point for KEEP OUT AREA |
| EZn.MIN.INTENSITY.THRESHOLD | FLOAT | EZ Min Ground/Sky Center Point Spot Beam/Freq Intensity Threshold |
| EZn.MAX.INTENSITY.THRESHOLD | FLOAT | EZ Max Ground/Sky Center Point Spot Beam/Freq Intensity Threshold |

TABLE 11-continued

Define exclusion zone (Define Exclusion Zone):

| Parameter | Type | Description |
|---|---|---|
| EZn.ISL.TOGGLE | ON/ OFF | EZ Intersatellite Link (ISL) ON or OFF |
| EZn.LRM.TOGGLE | ON/ OFF | EZ Light Reflection Mitigation (LRM) ON or OFF |
| EZn.SPOT.TOGGLE | ON/ OFF | EZ Spot Beam (SPOT) ON or OFF |

TABLE 12

Get SV (Get SV Orbital "fly-by" information):

| Parameter | Type | Description |
|---|---|---|
| SVn.ID.International | STRING | International Designator |
| SVn.ID.NORAD | INT | NORAD Catalog Number |
| SVn.ID.NAME | STRING | SV Name |
| SVn.GND.lat | FLOAT | Ground location latitude for SV fly-over |
| SVn.GND.long | FLOAT | Ground location longitude for SV fly-over |
| SVn.GND.alt | FLOAT | Ground location altitude % for intensity threshold calculations |
| SVn.GND.time | INT | Amount of time to obtain SV flyover(s) |
| SVn.Period | Minutes | Location Minutes |
| SVn.Inclination | Degrees | Location Inclination |
| SVn.Apogee.Height | KM | Location Apogee |
| SVn.Perigee.Height | KM | Location Perigee |
| SVn. Eccentricity | FLOAT | Location Eccentricity |

TABLE 13

Set exclusion zone (Implement exclusion zone within Constellation):

| Parameter | Type | Description |
|---|---|---|
| SVn.ID.International | STRING | International Designator |
| SVn.ID.NORAD | INT | NORAD Catalog Number |
| SVn.ID.NAME | STRING | SV Name |
| SVn.SPOTn.TOGGLE | ON/OFF | SV Spot Beam n Downlink UTC TIME START/STOP |
| SVn.SPOTn.FREQn. TOGGLE | ON/OFF | SV Spot Beam n Frequency n Downlink UTC TIME START/STOP |
| SVn.ISL.FORE.TOGGLE | ON/OFF | SV Intersatellite Link UTC TIME START/STOP |
| SVn.ISL.AFT.TOGGLE | ON/OFF | SV Intersatellite Link UTC TIME START/STOP |
| SVn.ISL.RIGHT.TOGGLE | ON/OFF | SV Intersatellite Link UTC TIME START/STOP |
| SVn.ISL.LEFT.TOGGLE | ON/OFF | SV Intersatellite Link UTC TIME START/STOP |
| SVn.SHADE.TOGGLE | ON/OFF | SV Reflection Shade UTC TIME START/STOP |
| SV.EZ.method | INT | ON/OFF or Intensity reduction (e.g., based on service provider SLA) |

Figure 17:
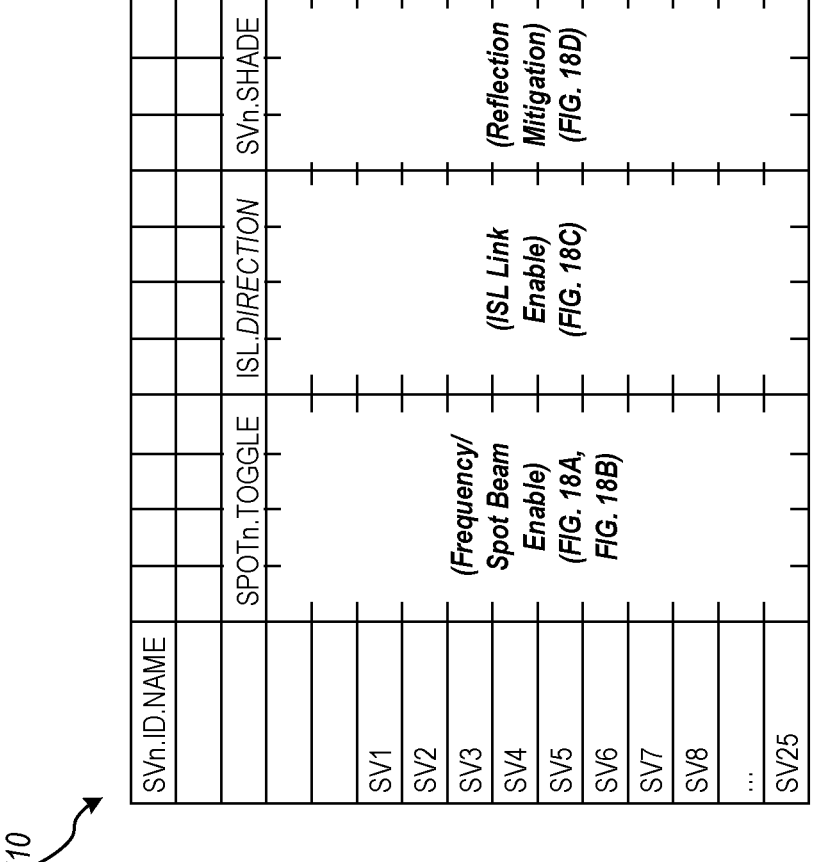

One configuration of an exclusion zone definition for multiple satellites of a constellation is depicted in a table 1710 of FIG. 17. Here, this drawing illustrates how different portions of a table or grid of data may allow definition of different values for different vehicles, on the basis of multiple exclusion zone types or characteristics. For example, a portion of this table 1710 may be used to define a toggle (disable/enable) value for a spot beam or a frequency within a spot beam, as described below with reference to FIGS. 19A and 19B and defined within the tables of FIGS. 18A and 18B. Another portion of this table 1410 may be used to define a toggle (disable/enable) value for inter-satellite links, including different communication directions for the links, as described below with reference to FIG. 19C and defined within the table of FIG. 18C. Finally, another portion of this table 1710 may be used to define a reflection mitigation control, as described below with reference to FIG. 19D and defined within the table of FIG. 18D. This data format and table format is provided only for purposes of illustration: many other data representations, definitions, and formats may be used to communicate or represent exclusion zone data.

Figures 19A, 19B:
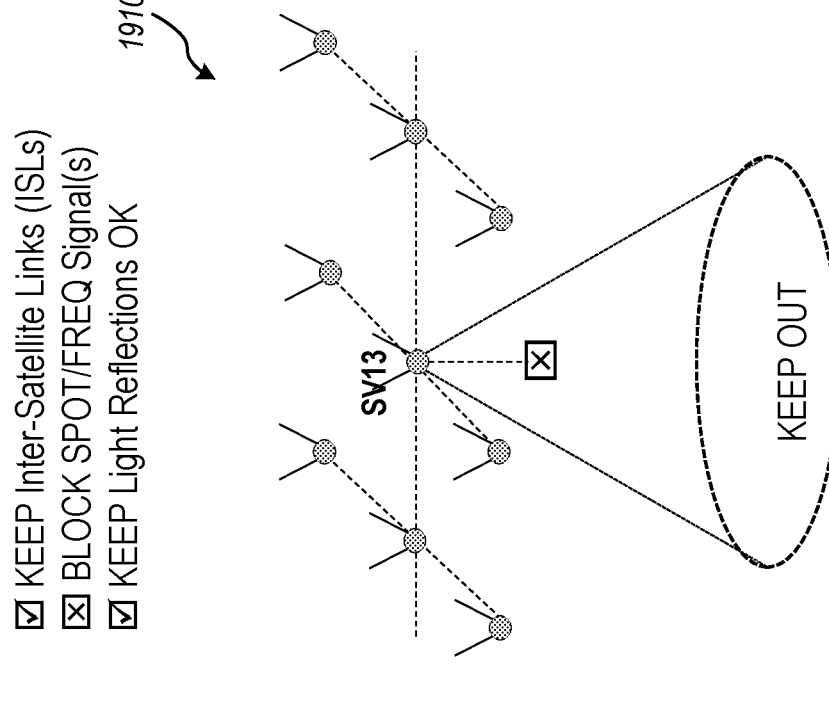

FIG. 19A illustrates further views of an example interference scenario 1910A over a geographic area, and the use of spot beam frequency exclusion zones to implement a keep-out area from SV7. Here, the intent of the exclusion zone is to block specific signals from radiating on the ground, such as where different countries or geographical areas impose different intensity limits. For instance, to implement this exclusion zone based on frequency, values such as the following may be established via the following Define exclusion zone (TABLE 14), Get SV (TABLE 15), and Set exclusion zone (TABLE 16) commands:

TABLE 14

Define exclusion zone (Input)

| Parameter | Value |
|---|---|
| EZn.ID | EZ22.12345 |
| EZn.NAME | EZ22.AZ_GND_STATION_KO |
| EZn.RADIUS | 100 Meters |
| EZn.LAT.PT | 33.54563 |
| EZn.LONG.PT | −111.97624 |

TABLE 14-continued

| Define exclusion zone (Input) | |
| --- | --- |
| Parameter | Value |
| EZn.IP.PT | N/A (for this exclusion zone) |
| EZn.GPS.PT | N/A (for this exclusion zone) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 15

| Get SV (input) | |
| --- | --- |
| Parameter | Value |
| SVn.ID.International | 2019-029BD |
| SVn.ID.NORAD | 44286 |
| SVn.ID.NAME | SV7 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 16

| Set exclusion zone (Output per SV) (Disable different frequencies in respective spotbeams) | |
| --- | --- |
| Parameter | Value |
| SVn.ID.International | 2019-029BD |
| SVn.ID.NORAD | 44286 |
| SVn.ID.NAME | SV7 |
| SVn.SPOTn.TOGGLE | ON |
| SVn.SPOTn.FREQn.TOGGLE | SV7.SPOT1.FREQ2.DISABLE START Mar. 3, 2021 21:43:56; STOP Mar. 3, 2021 21:45:06; |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | ON |
| SV.EZ.method | ON >15% |

A detailed charting of a subset of SET exclusion zone values to disable a particular spot beam frequency is shown in table 1810A of FIG. 18A, where a value 1820A to disable a particular spot beam of a particular satellite vehicle at a particular time (and for a particular duration) is communicated.

FIG. 19B illustrates further views of an example interference scenario 1910B over a geographic area, and the use of combined spot beam frequency exclusion zones to implement a keep-out area of all frequencies from a spot beam of SV13. For instance, to implement this exclusion zone for an entire spot beam, values such as the following may be established via the following Define exclusion zone (TABLE 17), Get SV (TABLE 18), and Set exclusion zone (TABLE 19) commands:

TABLE 17

| Define exclusion zone (Input) | |
| --- | --- |
| Parameter | Value |
| EZn.ID | EZ22.12345 |
| EZn.NAME | EZ22.AZ_GND_STATION_KO |
| EZn.RADIUS | 100 Meters |
| EZn.LAT.PT | 33.54563 |
| EZn.LONG.PT | −111.97624 |
| EZn.IP.PT | N/A (for this exclusion zone) |
| EZn.GPS.PT | N/A (for this exclusion zone) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 18

| Get SV (input) | |
| --- | --- |
| Parameter | Value |
| SVn.ID.International | 2019-029BD |
| SVn.ID.NORAD | 44286 |
| SVn.ID.NAME | SV13 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 19

| Set exclusion zone (Output per SV) (Disable respective spotbeams) | |
| --- | --- |
| Parameter | Value |
| SVn.ID.International | 2019-029BD |
| SVn.ID.NORAD | 44286 |
| SVn.ID.NAME | SV13 |
| SVn.SPOTn.TOGGLE | SV13.SPOT2.DISABLE START May 4, 2021 22:43:56; STOP May 4, 2021 22:46:06; |
| SVn.SPOTn.FREQn.TOGGLE | OFF |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | ON |
| SV.EZ.method | OFF |

A detailed charting of a subset of SET exclusion zone values to disable an entire spot beam is shown in table 1810B of FIG. 18B, where a value 1820B to disable a particular spot beam of a particular satellite vehicle at a particular time (and for a particular duration) is communicated.

It will be understood that other variations to the approaches of FIGS. 19A and 19B may be implemented with exclusion zones to block transmissions onto defined areas. For instance, such exclusion zones may provide permutations of a spot beam block, a frequency block within a beam, or an "ignore" setting when the intensity of the spot beam is below the intensity of allowance in the keep out zone.

FIG. 19C illustrates further views of an example interference scenario 1810C in inter-satellite communications of a non-terrestrial communication network. Depending on orbit positions, altitude, type of interference, and other characteristics, it is possible that some directions of communications (e.g., between satellite SV21 and SV19) will be determined to interfere or experience interference, whereas communications in a different direction (e.g., between satellite SV19 and other satellites) will not interfere or experience interference with higher-altitude satellite communications.

To implement an exclusion zone for control of intersatellite links, values such as the following may be established for an exclusion zone involving SV21 of FIG. 18C via the following Define exclusion zone (TABLE 20), Get SV (TABLE 21), and Set exclusion zone (TABLE 22) commands:

TABLE 20

| Define exclusion zone (Input) | |
| --- | --- |
| Parameter | Value |
| EZn.ID | EZ22.12345 |
| EZn.NAME | EZ22.AZ_GEO_KO |
| EZn.RADIUS | 2000 Meters |
| EZn.LAT.PT | 33.54563 |
| EZn.LONG.PT | −111.97624 |
| EZn.IP.PT | N/A (for this exclusion zone) |
| EZn.GPS.PT | N/A (for this exclusion zone) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 21

| Get SV (input) | |
| --- | --- |
| Parameter | Value |
| SVn.ID.International | 2019-029BD |
| SVn.ID.NORAD | 44286 |
| SVn.ID.NAME | SV21 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 22

| Set exclusion zone (Output per SV) (Disable impacted ISLs) | |
| --- | --- |
| Parameter | Value |
| SVn.ID.International | 2019-029BD |
| SVn.ID.NORAD | 44286 |
| SVn.ID.NAME | SV21 |
| SVn.SPOTn.TOGGLE | |
| SVn.SPOTn.FREQn.TOGGLE | ON |
| SVn.ISL.FORE.TOGGLE | SV21.ISL.FORE.DISABLE START May 4, 2021 22:43:56; STOP May 4, 2021 22:46:06; |

TABLE 22-continued

| Set exclusion zone (Output per SV) (Disable impacted ISLs) | |
| --- | --- |
| Parameter | Value |
| SVn.ISL.AFT.TOGGLE | SV21.ISL.AFT.DISABLE START May 4, 2021 22:43:56; STOP May 4, 2021 22:46:06; |
| SVn.ISL.RIGHT.TOGGLE | SV21.ISL.RIGHT.DISABLE START May 4, 2021 22:43:56; STOP May 4, 2021 22:46:06; |
| SVn.ISL.LEFT.TOGGLE | SV21.ISL.LEFT.DISABLE START May 4, 2021 22:43:56; STOP May 4, 2021 22:46:06; |
| SVn.SHADE.TOGGLE | ON |
| SV.EZ.method | OFF |

As shown in FIG. 19C, the exclusion zone for ISLs is defined relative to the GEO coverage area. A detailed charting of SET exclusion zone values to disable ISLs is shown in FIG. 18C, such as value 1820D for SV21 to indicate a time and direction to disable ISLs of SV21 from FIG. 18C. To implement an exclusion zone for control of inter-satellite links for SV20, SV18, SV17, SV16, to meet the scenario shown in FIG. 19C, the Get SV (TABLE 18) SVn.ID.NAME and Set exclusion zone (TABLE 19) SVn.ID.NAME values would substitute "SV21" with the respective "SV20", "SV18", "SV17", "SV16" values, and the Set exclusion zone (TABLE 19) SV.ISL.FORE, .AFT, .LEFT. RIGHT toggle values would substitute with values relevant to the respective SVs (values 1820C, 1820E, 1820F, 1820G, 1820H in FIG. 18C).

FIG. 19D illustrates further views of an example light pollution scenario 1910D based on reflections from individual SVs of a non-terrestrial communication network. To implement an exclusion zone for control of SV mechanisms to mitigate light reflections, values such as the following may be established for an exclusion zone involving SV22 of FIG. 19D via the following Define exclusion zone (TABLE 14), Get SV (TABLE 15), and Set exclusion zone (TABLE 16) commands:

TABLE 14

| Define exclusion zone (Input) | |
| --- | --- |
| Parameter | Value |
| EZn.ID | EZ22.12345 |
| EZn.NAME | EZ22.AZ ASTRO |
| EZn.RADIUS | 50 Meters |
| EZn.LAT.PT | 33.54563 |
| EZn.LONG.PT | −111.97624 |
| EZn.IP.PT | N/A (for this exclusion zone) |
| EZn.GPS.PT | N/A (for this exclusion zone) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 15

| Get SV (input) | |
| --- | --- |
| Parameter | Value |
| SVn.ID.International | 2019-029BD |
| SVn.ID.NORAD | 44333 |
| SVn.ID.NAME | SV22 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 16

| Set exclusion zone (Output per SV) (Shade SV) | |
| --- | --- |
| Parameter | Value |
| SVn.ID.International | 2019-029BD |
| SVn.ID.NORAD | 44333 |
| SVn.ID.NAME | SV22 |
| SVn.SPOTn.TOGGLE | |
| SVn.SPOTn.FREQn.TOGGLE | ON |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | SV22.SHADE ENABLED START May 4, 2021 22:43:56; STOP May 4, 2021 22:46:06; |
| SV.EZ.method | OFF |

A detailed charting of a subset of SET exclusion zone values to enable (toggle) a shade or light reflection feature is shown in table 1810D of FIG. 18D, where a value 1820J to enable a sunshade of a particular satellite vehicle at a particular time (and for a particular duration) is communicated.

Other permutations of the previously described exclusion zones may include establishing borders or zones between different LEO constellations, such as to prevent LEO constellations from different service provides from talking with one another. Likewise, other permutations may involve cooperation between constellations to enable or restrict aspects of "roaming" or accessing services offered from other service providers, network companies, or countries.

Implementation in Edge Computing Scenarios

It will be understood that the present communication and networking arrangements may be integrated with many aspects of edge computing strategies and deployments. Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by: moving workloads onto compute equipment at satellite vehicles: using satellite connections to offer backup or (redundant) links and connections to lower-latency services: coordinating workload processing operations at terrestrial access points or base stations: providing data and content via satellite networks; and the like. Thus, many of the same edge computing scenarios that are described below for mobile networks and mobile client devices are equally applicable when using a non-terrestrial network.

Figure 20:
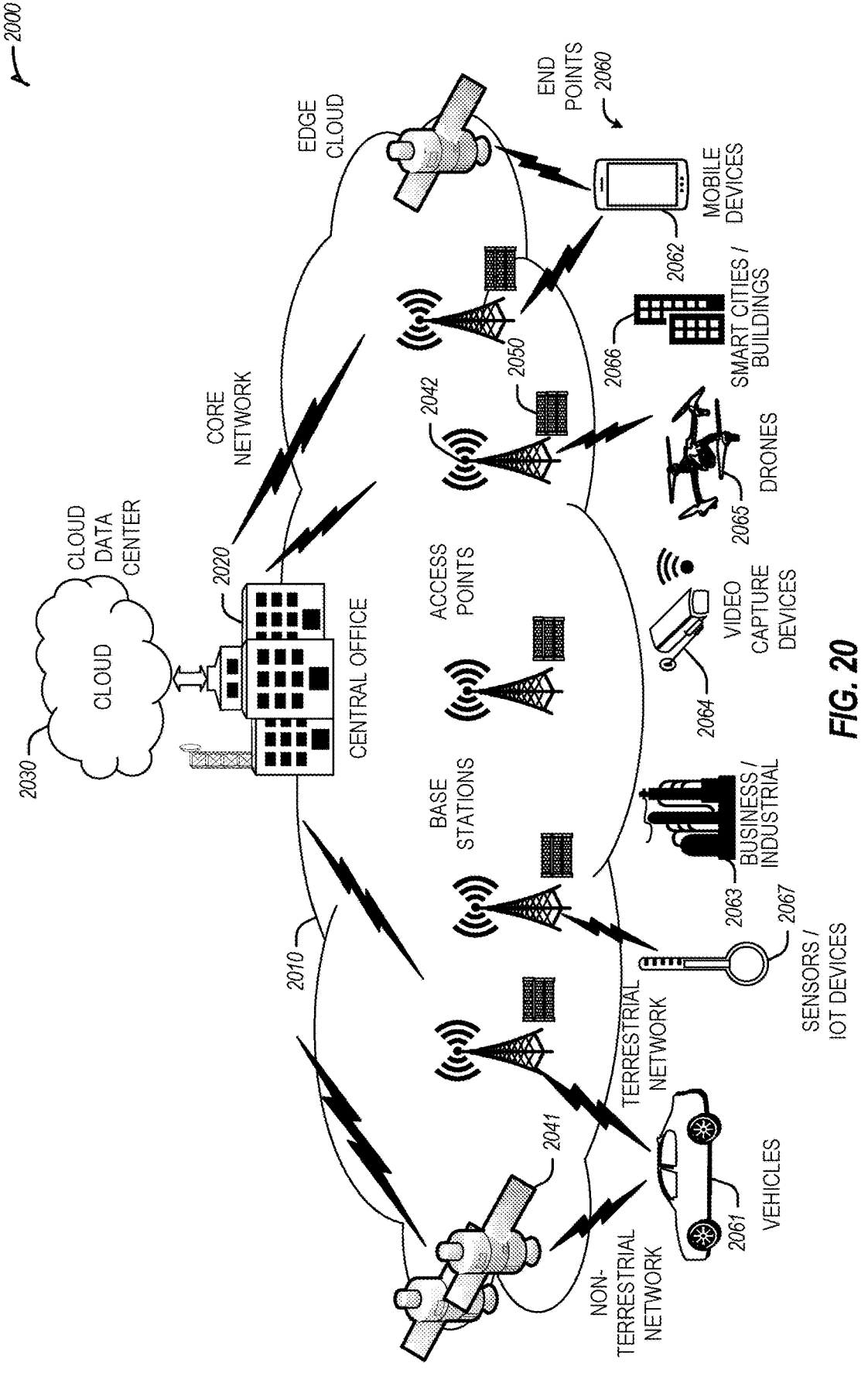
FIG. 20 illustrates an overview of an edge cloud configuration for edge computing, according to an example.

FIG. 20 is a block diagram 2000 showing an overview of a configuration for edge computing, which includes a layer of processing referenced in many of the current examples as an "edge cloud". This network topology, which may include a number of conventional networking layers (including those not shown herein), may be extended through use of the satellite and non-terrestrial network communication arrangements discussed herein.

As shown, the edge cloud 2010 is co-located at an edge location, such as a satellite vehicle 2041, a base station 2042, a local processing hub 2050, or a central office 2020, and thus may include multiple entities, devices, and equipment instances. The edge cloud 2010 is located much closer to the endpoint (consumer and producer) data sources 2060 (e.g., autonomous vehicles 2061, user equipment 2062, business and industrial equipment 2063, video capture devices 2064, drones 2065, smart cities and building devices 2066, sensors and IoT devices 2067, etc.) than the cloud data center 2030. Compute, memory, and storage resources which are offered at the edges in the edge cloud 2010 are critical to providing ultra-low or improved latency response times for services and functions used by the endpoint data sources 2060 as well as reduce network backhaul traffic from the edge cloud 2010 toward cloud data center 2030 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time. In the scenario of non-terrestrial network, distance and latency may be far to and from the satellite, but data processing may be better accomplished at edge computing hardware in the satellite vehicle rather requiring additional data connections and network backhaul to and from the cloud.

In an example, an edge cloud architecture extends beyond typical deployment limitations to address restrictions that some network operators or service providers may have in their own infrastructures. These include, variation of configurations based on the edge location (because edges at a base station level, for instance, may have more constrained performance): configurations based on the type of compute, memory, storage, fabric, acceleration, or like resources available to edge locations, tiers of locations, or groups of locations: the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services which the compute resource will be "moved" to the data, as well as scenarios in which the data will be "moved" to the compute resource. Or as an example, base station (or satellite vehicle) compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 20, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 21:
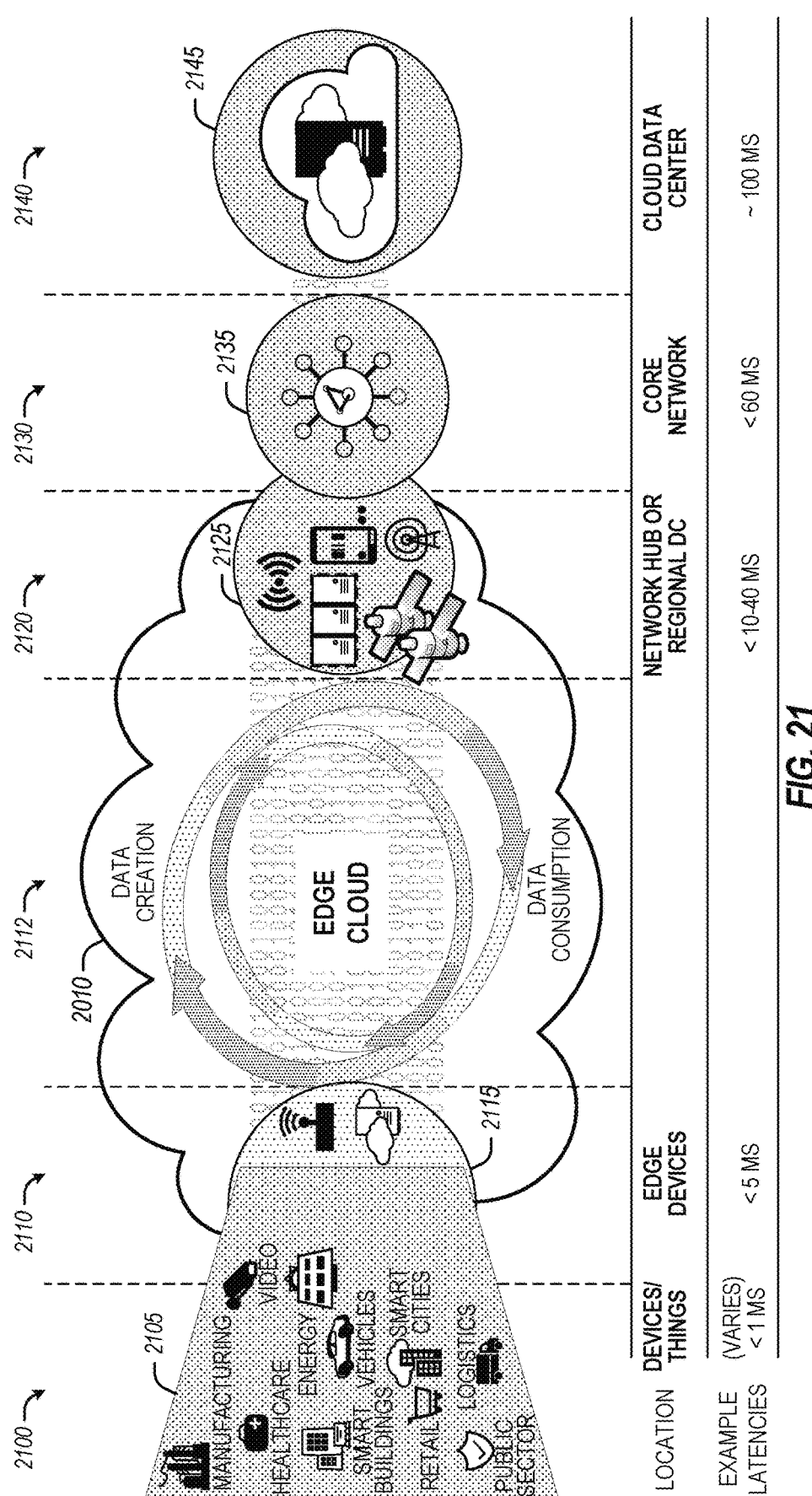
FIG. 21 illustrates an overview of layers of distributed compute deployed among an edge computing system, according to an example.

FIG. 21 illustrates operational layers among endpoints, an edge cloud, and cloud computing environments. Specifically, FIG. 21 depicts examples of computational use cases 2105, utilizing the edge cloud 2010 among multiple illustrative layers of network computing. The layers begin at an endpoint (devices and things) layer 2100, which accesses the edge cloud 2010 to conduct data creation, analysis, and data consumption activities. The edge cloud 2010 may span multiple network layers, such as an edge devices layer 2110 having gateways, on-premise servers, or network equipment (nodes 2115) located in physically proximate edge systems: a network access layer 2120, encompassing base stations, radio processing units, network hubs, regional data centers (DC), or local network equipment (equipment 2125); and any equipment, devices, or nodes located therebetween (in layer 2112, not illustrated in detail). The network communications within the edge cloud 2010 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 2100, under 5 ms at the edge devices layer 2110, to even between 10 to 40 ms when communicating with nodes at the network access layer 2120. (Variation to these latencies is expected with use of non-terrestrial networks). Beyond the edge cloud 2010 are core network layer 2130 and cloud data center layer 2140, each with increasing latency (e.g., between 50-60 ms at the core network layer 2130, to 100 or more ms at the cloud data center layer). As a result, operations at a core network data center 2135 or a cloud data center 2145, with latencies of at least 50 to 100 ms or more, will not be able to accomplish many time-critical functions of the use cases 2105. Each of these latency values are provided for purposes of illustration and contrast: it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2135 or a cloud data center 2145, a central office or content data network may be considered as being located within a "near edge" layer ("near" to the cloud, having high latency values when communicating with the devices and endpoints of the use cases 2105), whereas an access point, base station, on-premise server, or network gateway may be considered as located within a "far edge" layer ("far" from the cloud, having low latency values when communicating with the devices and endpoints of the use cases 2105). It will be understood that other categorizations of a particular network layer as constituting a "close", "local", "near", "middle", or "far" edge may be based on latency, distance, number of network hops, or other measurable characteristics, as measured from a source in any of the network layers 2100-2140.

The various use cases 2105 may access resources under usage pressure from incoming streams, due to multiple services utilizing the edge cloud. To achieve results with low latency, the services executed within the edge cloud 2010 balance varying requirements in terms of: (a) Priority (throughput or latency) and Quality of Service (QoS) (e.g., traffic for an autonomous car may have higher priority than a temperature sensor in terms of response time requirement: or, a performance sensitivity/bottleneck may exist at a compute/accelerator, memory, storage, or network resource, depending on the application): (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2010 may provide the ability to serve and respond to multiple applications of the use cases 2105 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications which require connection via satellite, and the additional latency that trips via satellite would require to the cloud.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2010 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2010 (network layers 2100-2140), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other thing capable of communicating as a producer or consumer of data. Further, the label "node" or "device" as used in the edge computing system does not necessarily mean that such node or device operates in a client or agent/minion/follower role: rather, any of the nodes or devices in the edge computing system refer to individual entities, nodes, or subsystems which include discrete or connected hardware or software configurations to facilitate or use the edge cloud 2010.

As such, the edge cloud 2010 is formed from network components and functional features operated by and within edge gateway nodes, edge aggregation nodes, or other edge compute nodes among network layers 2110-2130. The edge cloud 2010 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2010 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2010 may be servers, multi-tenant servers, appliance computing devices, and/or any other type of computing devices. For example, a node of the edge cloud 2010 may include an appliance computing device that is a self-contained electronic device including a housing, a chassis, a case or a shell. In some circumstances, the housing may be dimensioned for portability such that it may be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto.

Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 25. The edge cloud 2010 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 22:
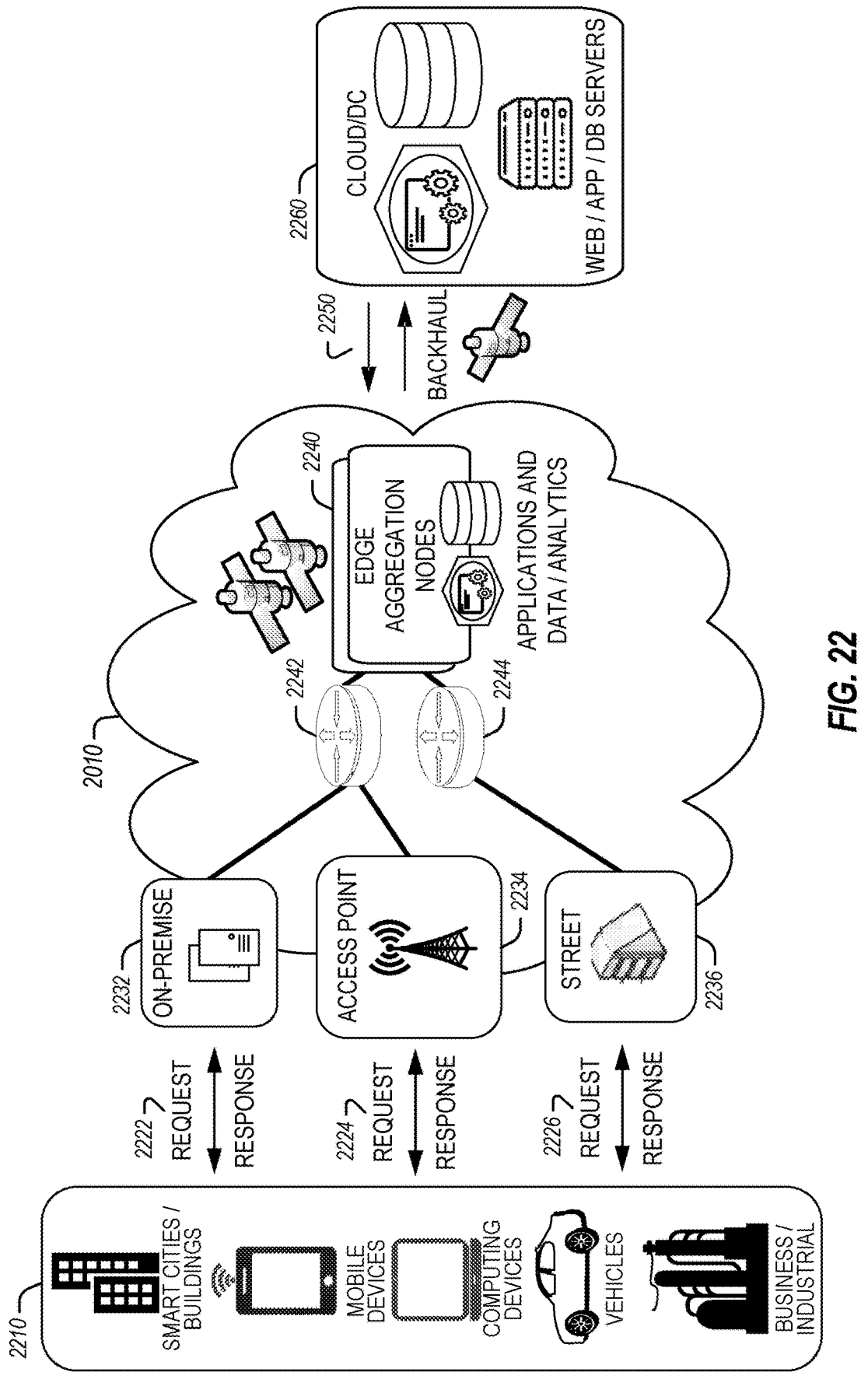
FIG. 22 illustrates operational layers among endpoints, an edge cloud, and cloud computing environments.

In FIG. 22, various client endpoints 2210 (in the form of mobile devices, computers, autonomous vehicles, business computing equipment, industrial processing equipment) exchange requests and responses that are specific to the type of endpoint network aggregation. For instance, client endpoints 2210 may obtain network access via a wired broadband network, by exchanging requests and responses 2222 through an on-premise network system 2232. Some client endpoints 2210, such as mobile computing devices, may obtain network access via a wireless broadband network, by exchanging requests and responses 2224 through an access point (e.g., cellular network tower) 2234. Some client endpoints 2210, such as autonomous vehicles may obtain network access for requests and responses 2226 via a wireless vehicular network through a street-located network system 2236. However, regardless of the type of network access, the TSP may deploy aggregation points 2242, 2244 within the edge cloud 2010 to aggregate traffic and requests. Thus, within the edge cloud 2010, the TSP may deploy various compute and storage resources, such as at edge aggregation nodes 1940 (including those located at satellite vehicles), to provide requested content. The edge aggregation nodes 2240 and other systems of the edge cloud 2010 are connected to a cloud or data center 2260, which uses a backhaul network 2250 (such as a satellite backhaul) to fulfill higher-latency requests from a cloud/data center for websites, applications, database servers, etc. Additional or consolidated instances of the edge aggregation nodes 2240 and the aggregation points 2242, 2244, including those deployed on a single server framework, may also be present within the edge cloud 2010 or other areas of the TSP infrastructure.

At a more generic level, an edge computing system may be described to encompass any number of deployments operating in the edge cloud 2010, which provide coordination from client and distributed computing devices. FIG. 21 provides a further abstracted overview of layers of distributed compute deployed among an edge computing environment for purposes of illustration.

Figure 23:
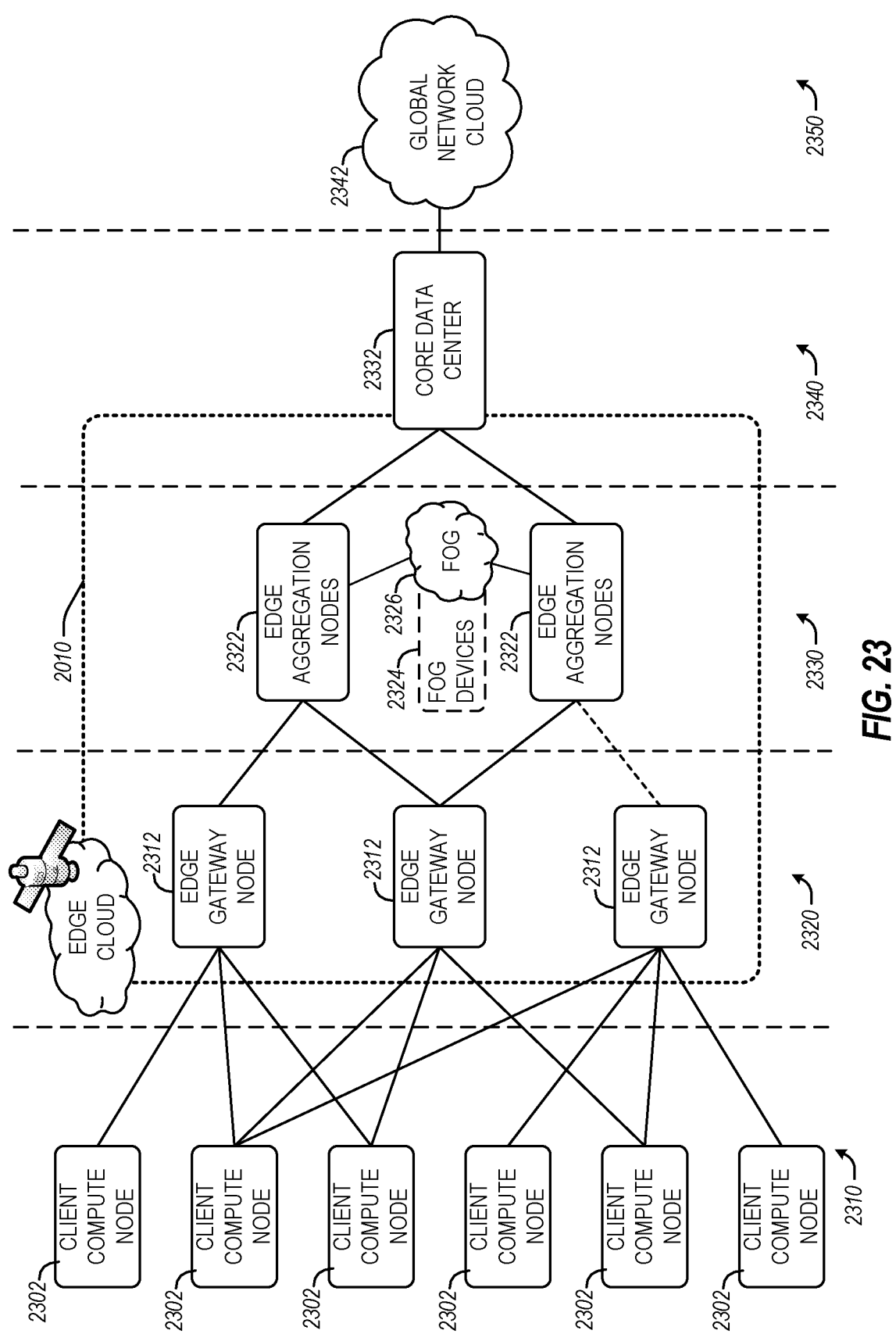
FIG. 23 illustrates an example approach for networking and services in an edge computing system.

FIG. 23 generically depicts an edge computing system for providing edge services and applications to multi-stakeholder entities, as distributed among one or more client compute nodes 2302, one or more edge gateway nodes 2312, one or more edge aggregation nodes 2322, one or more core data centers 2332, and a global network cloud 2342, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 2100, 2110, 2120, 2130, 2140. For example, the client compute nodes 2302 are each located at an endpoint layer 2100, while each of the edge gateway nodes 2312 are located at an edge devices layer 2110 (local level) of the edge computing system. Additionally, each of the edge aggregation nodes 2322 (and/or fog devices 2324, if arranged or operated with or among a fog networking configuration 2326) are located at a network access layer 2120 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein: many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 2332 is located at a core network layer 2130 (e.g., a regional or geographically-central level), while the global network cloud 2342 is located at a cloud data center layer 2140 (e.g., a national or global layer). The use of "core" is provided as a term for a centralized network location-deeper in the network-which is accessible by multiple edge nodes or components: however, a "core" does not necessarily designate the "center" or the deepest location of the network. Accordingly, the core data center 2332 may be located within, at, or near the edge cloud 2010.

Although an illustrative number of client compute nodes 2302, edge gateway nodes 2312, edge aggregation nodes 2322, core data centers 2332, global network clouds 2342 are shown in FIG. 23, it should be appreciated that the edge computing system may include more or fewer devices or systems at each layer. Additionally, as shown in FIG. 23, the number of components of each layer 2100, 2110, 2120, 2130, 2140 generally increases at each lower level (i.e., when moving closer to endpoints). As such, one edge gateway node 2312 may service multiple client compute nodes 2302, and one edge aggregation node 2322 may service multiple edge gateway nodes 2312.

Consistent with the examples provided herein, each client compute node 2302 may be embodied as any type of end point component, device, appliance, or "thing" capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2010.

As such, the edge cloud 2010 is formed from network components and functional features operated by and within the edge gateway nodes 2312 and the edge aggregation nodes 2322 of layers 2120, 2130, respectively. The edge cloud 2010 may be embodied as any type of network that provides edge computing and/or storage resources which are proximately located to radio access network (RAN) capable endpoint devices (e.g., mobile computing devices, IoT devices, smart devices, etc.), which are shown in FIG. 21 as the client compute nodes 2302. In other words, the edge cloud 2310 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 2010 may form a portion of or otherwise provide an ingress point into or across a fog networking configuration 2326 (e.g., a network of fog devices 2324, not shown in detail), which may be embodied as a system-level horizontal and distributed architecture that distributes resources and services to perform a specific function. For instance, a coordinated and distributed network of fog devices 2324 may perform computing, storage, control, or networking aspects in the context of an IoT system arrangement. Other networked, aggregated, and distributed functions may exist in the edge cloud 2010 between the cloud data center layer 2140 and the client endpoints (e.g., client compute nodes 2302). Some of these are discussed in the following sections in the context of network functions or service virtualization, including the use of virtual edges and virtual services which are orchestrated for multiple stakeholders.

The edge gateway nodes 2312 and the edge aggregation nodes 2322 cooperate to provide various edge services and security to the client compute nodes 2302. Furthermore, because each client compute node 2302 may be stationary or mobile, each edge gateway node 2312 may cooperate with other edge gateway devices to propagate presently provided edge services and security as the corresponding client compute node 2302 moves about a region. To do so, each of the edge gateway nodes 2312 and/or edge aggregation nodes 2322 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 24A and 24B. Each compute node may be embodied as a type of device, appliance, computer, or other "thing" capable of communicating with other edge, networking, or endpoint components.

Figure 24A:
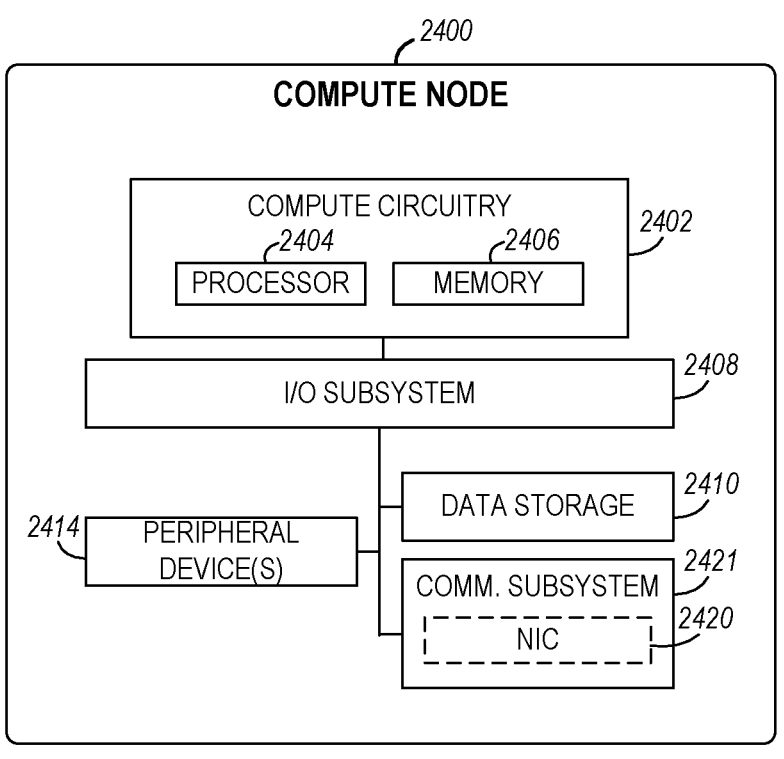
FIG. 24A illustrates an overview of example components deployed at a compute node system, according to an example.

In the simplified example depicted in FIG. 24A, an edge compute node 2400 includes a compute engine (also referred to herein as "compute circuitry") 2402, an input/output (I/O) subsystem 2408, data storage device 2410, communication circuitry 2412 (communication circuitry subsystem), and, optionally, one or more peripheral devices 2414. In other examples, each compute device may include other or additional components, such as those used in personal or server computing systems (e.g., a display, peripheral devices, etc.).

Additionally, in some examples, one or more of the illustrative components may be incorporated in, or otherwise form a portion of, another component.

The compute node 2400 may be embodied as any type of engine, device, or collection of devices capable of performing various compute functions. In some examples, the compute node 2400 may be embodied as a single device such as an integrated circuit, an embedded system, a field-programmable gate array (FPGA), a system-on-a-chip (SOC), or other integrated system or device. In the illustrative example, the compute node 2400 includes or is embodied as a processor 2404 and a memory 2406. The processor 2404 may be embodied as any type of processor capable of performing the functions described herein (e.g., executing an application). For example, the processor 2404 may be embodied as a multi-core processor(s), a microcontroller, or other processor or processing/controlling circuit. In some examples, the processor 2404 may be embodied as, include, or be coupled to an FPGA, an application specific integrated circuit (ASIC), reconfigurable hardware or hardware circuitry, or other specialized hardware to facilitate performance of the functions described herein.

The main memory 2406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory, other storage class memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 2406 may be integrated into the processor 2404. The main memory 2406 may store various software and data used during operation such as one or more applications, data operated on by the application(s), libraries, and drivers.

The compute circuitry 2402 is communicatively coupled to other components of the compute node 2400 via the I/O subsystem 2408, which may be embodied as circuitry and/or components to facilitate input/output operations with the compute circuitry 2402 (e.g., with the processor 2404 and/or the main memory 2406) and other components of the compute circuitry 2402. For example, the I/O subsystem 2408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2408 may form a portion of a system-on-a-chip (SoC) and be incorporated, along with one or more of the processor 2404, the main memory 2406, and other components of the compute circuitry 2402, into the compute circuitry 2402.

The one or more illustrative data storage devices 2410 may be embodied as any type of devices configured for short-term or long-term storage of data such as, for example, memory devices and circuits, memory cards, hard disk drives, solid-state drives, or other data storage devices. Each data storage device 2410 may include a system partition that stores data and firmware code for the data storage device 2410. Each data storage device 2410 may also include one or more operating system partitions that store data files and executables for operating systems depending on, for example, the type of compute node 2400.

The communication circuitry 2412 may be embodied as any communication circuit, device, or collection thereof, capable of enabling communications over a network between the compute circuitry 2402 and another compute device (e.g., an edge gateway node 2312 of an edge computing system).

The communication circuitry 2412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 2412 includes a network interface controller (NIC) 2420, which may also be referred to as a host fabric interface (HFI). The NIC 2420 may be embodied as one or more add-in-boards, daughter cards, network interface cards, controller chips, chipsets, or other devices that may be used by the compute node 2400 to connect with another compute device (e.g., an edge gateway node 2312). In some examples, the NIC 2420 may be embodied as part of a system-on-a-chip (SoC) that includes one or more processors, or included on a multichip package that also contains one or more processors. In some examples, the NIC 2420 may include a local processor (not shown) and/or a local memory (not shown) that are both local to the NIC 2420. In such examples, the local processor of the NIC 2420 may be capable of performing one or more of the functions of the compute circuitry 2402 described herein. Additionally or alternatively, in such examples, the local memory of the NIC 2420 may be integrated into one or more components of the client compute node at the board level, socket level, chip level, and/or other levels.

Additionally, in some examples, each compute node 2400 may include one or more peripheral devices 2414. Such peripheral devices 2414 may include any type of peripheral device found in a compute device or server such as audio input devices, a display, other input/output devices, interface devices, and/or other peripheral devices, depending on the particular type of the compute node 2400. In further examples, the compute node 2400 may be embodied by a respective edge compute node in an edge computing system (e.g., client compute node 2302, edge gateway node 2312, edge aggregation node 2322) or like forms of appliances, computers, subsystems, circuitry, or other components.

Figure 24B:
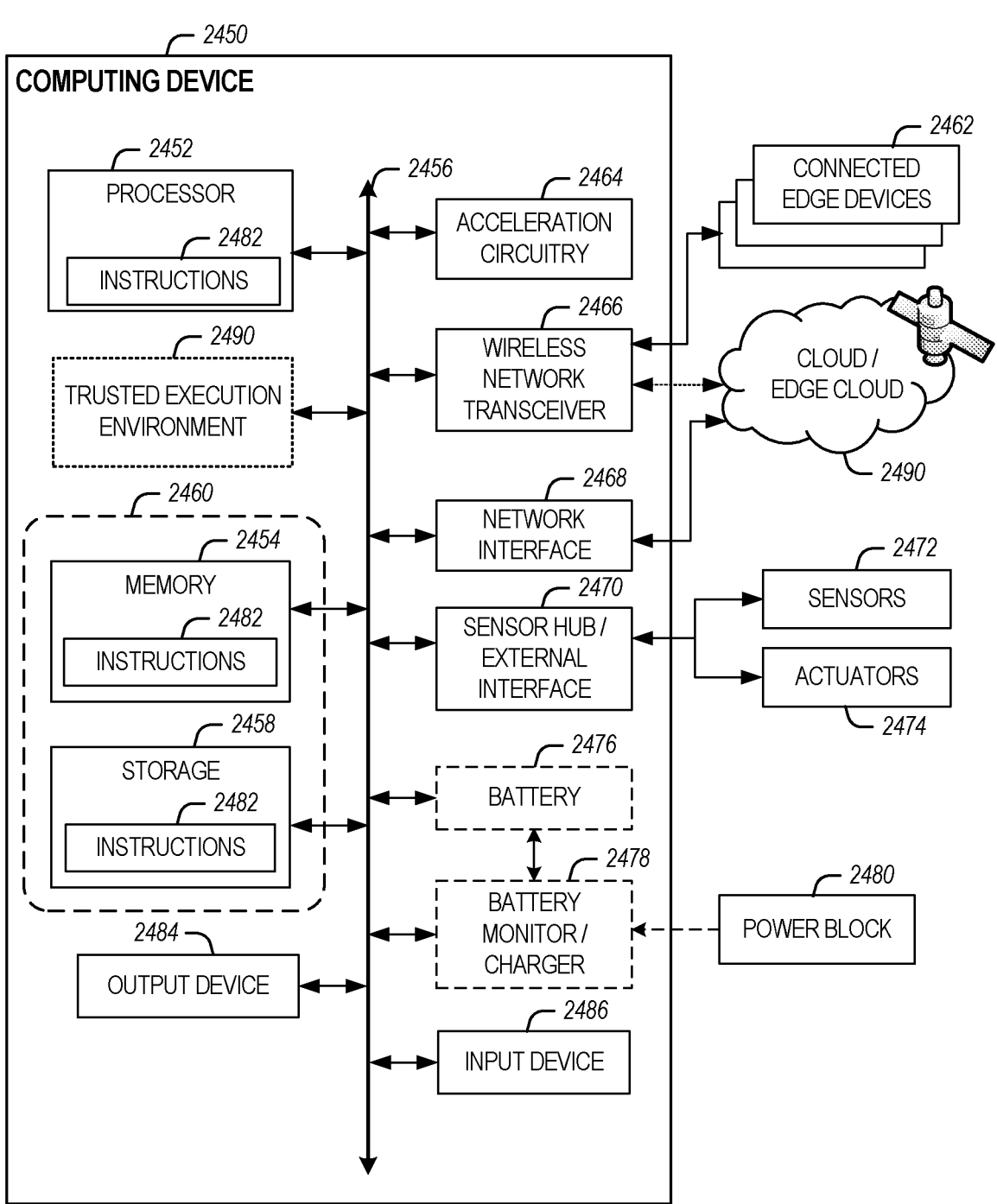
FIG. 24B illustrates a further overview of example components within a computing device, according to an example.

In a more detailed example, FIG. 24B illustrates a block diagram of an example of components that may be present in an edge computing node 2450 for implementing the techniques (e.g., operations, processes, methods, and methodologies) described herein. The edge computing node 2450 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 2450, or as components otherwise incorporated within a chassis of a larger system. Further, to support the security examples provided herein, a hardware ROT (e.g., provided according to a DICE architecture) may be implemented in each IP block of the edge computing node 2450 such that any IP Block could boot into a mode where a RoT identity could be generated that may attest its identity and its current booted firmware to another IP Block or to an external entity.

The edge computing node 2450 may include processing circuitry in the form of a processor 2452, which may be a microprocessor, a multi-core processor, a multithreaded processor, an ultra-low voltage processor, an embedded processor, or other known processing elements. The processor 2452 may be a part of a system on a chip (SoC) in which the processor 2452 and other components are formed into a single integrated circuit, or a single package, such as the Edison™ or Galileo™ SoC boards from Intel Corporation, Santa Clara, California. As an example, the processor 2452 may include an Intel® Architecture Core™ based processor, such as a Quark™, an Atom™, a Xeon™ an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 2452 may communicate with a system memory 2454 over an interconnect 2456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2458 may also couple to the processor 2452 via the interconnect 2456. In an example, the storage 2458 may be implemented via a solid-state disk drive (SSDD). Other devices that may be used for the storage 2458 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 2458 may be on-die memory or registers associated with the processor 2452. However, in some examples, the storage 2458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 2456. The interconnect 2456 may include any number of technologies, including industry standard architecture (ISA), extended ISA (EISA), peripheral component interconnect (PCI), peripheral component interconnect extended (PCIx), PCI express (PCIe), NVLink, or any number of other technologies. The interconnect 2456 may be a proprietary bus, for example, used in an SoC based system. Other bus systems may be included, such as an I2C interface, an SPI interface, point to point interfaces, and a power bus, among others.

The interconnect 2456 may couple the processor 2452 to a transceiver 2466, for communications with the connected edge devices 2462. The transceiver 2466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2466 (or multiple transceivers) may communicate using multiple standards or radios for communications at a different range. For example, the edge computing node 2450 may communicate with close devices, e.g., within about 10 meters, using a local transceiver based on BLE, or another low power radio, to save power. More distant connected edge devices 2462, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 2466 (e.g., a radio transceiver) may be included to communicate with devices or services in the edge cloud 2490 via local or wide area network protocols. The wireless network transceiver 2466 may be an LPWA transceiver that follows the IEEE 802.15.4, or IEEE 802.15.4g standards, among others. The edge computing node 2450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2466, as described herein. For example, the transceiver 2466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2468 may be included to provide a wired communication to nodes of the edge cloud 2490 or to other devices, such as the connected edge devices 2462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 2468 may be included to enable connecting to a second network, for example, a first NIC 2468 providing communications to the cloud over Ethernet, and a second NIC 2468 providing communications to other devices over another type of network.

Given the variety of types of applicable communications from the device to another component or network, applicable communications circuitry used by the device may include or be embodied by any one or more of components 2464, 2466, 2468, or 2470. Accordingly, in various examples, applicable means for communicating (e.g., receiving, transmitting, etc.) may be embodied by such communications circuitry.

The edge computing node 2450 may include or be coupled to acceleration circuitry 2464, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 2456 may couple the processor 2452 to a sensor hub or external interface 2470 that is used to connect additional devices or subsystems. The devices may include sensors 2472, such as accelerometers, level sensors, flow sensors, optical light sensors, camera sensors, temperature sensors, a global positioning system (GPS) sensors, pressure sensors, barometric pressure sensors, and the like. The hub or external interface 2470 further may be used to connect the edge computing node 2450 to actuators 2474, such as power switches, valve actuators, an audible sound generator, a visual warning device, and the like.

In some optional examples, various input/output (I/O) devices may be present within or connected to, the edge computing node 2450. For example, a display or other output device 2484 may be included to show information, such as sensor readings or actuator position. An input device 2486, such as a touch screen or keypad may be included to accept input. An output device 2484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 2450.

A battery 2476 may power the edge computing node 2450, although, in examples in which the edge computing node 2450 is mounted in a fixed location, it may have a power supply coupled to an electrical grid. The battery 2476 may be a lithium ion battery, or a metal-air battery, such as a zinc-air battery, an aluminum-air battery, a lithium-air battery, and the like.

A battery monitor/charger 2478 may be included in the edge computing node 2450 to track the state of charge (SoCh) of the battery 2476. The battery monitor/charger 2478 may be used to monitor other parameters of the battery 2476 to provide failure predictions, such as the state of health (SoH) and the state of function (SoF) of the battery 2476. The battery monitor/charger 2478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2478 may communicate the information on the battery 2476 to the processor 2452 over the interconnect 2456. The battery monitor/charger 2478 may also include an analog-to-digital (ADC) converter that enables the processor 2452 to directly monitor the voltage of the battery 2476 or the current flow from the battery 2476. The battery parameters may be used to determine actions that the edge computing node 2450 may perform, such as transmission frequency, mesh network operation, sensing frequency, and the like.

A power block 2480, or other power supply coupled to a grid, may be coupled with the battery monitor/charger 2478 to charge the battery 2476. In some examples, the power block 2480 may be replaced with a wireless power receiver to obtain the power wirelessly, for example, through a loop antenna in the edge computing node 2450. A wireless battery charging circuit, such as an LTC4020 chip from Linear Technologies of Milpitas, California, among others, may be included in the battery monitor/charger 2478. The specific charging circuits may be selected based on the size of the battery 2476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2458 may include instructions 2482 in the form of software, firmware, or hardware commands to implement the techniques described herein. Although such instructions 2482 are shown as code blocks included in the memory 2454 and the storage 2458, it may be understood that any of the code blocks may be replaced with hardwired circuits, for example, built into an application specific integrated circuit (ASIC).

In an example, the instructions 2482 provided via the memory 2454, the storage 2458, or the processor 2452 may be embodied as a non-transitory, machine-readable medium 2460 including code to direct the processor 2452 to perform electronic operations in the edge computing node 2450. The processor 2452 may access the non-transitory, machine-readable medium 2460 over the interconnect 2456. For instance, the non-transitory, machine-readable medium 2460 may be embodied by devices described for the storage 2458 or may include specific storage units such as optical disks, flash drives, or any number of other hardware devices. The non-transitory, machine-readable medium 2460 may include instructions to direct the processor 2452 to perform a specific sequence or flow of actions, for example, as described with respect to the flowchart(s) and block diagram (s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices: magnetic disks such as internal hard disks and removable disks: magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 24A and 24B are intended to depict a high-level view of components of a device, subsystem, or arrangement of an edge computing node. However, it will be understood that some of the components shown may be omitted, additional components may be present, and a different arrangement of the components shown may occur in other implementations.

FIG. 25 illustrates an example software distribution platform 2505 to distribute software, such as the example computer readable instructions 2482 of FIG. 24B, to one or more devices, such as example processor platform(s) 2510 and/or other example connected edge devices or systems discussed herein. The example software distribution platform 2505 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 2505). Example connected edge devices may operate in commercial and/or home automation environments. In some examples, a third party is a developer, a seller, and/or a licensor of software such as the example computer readable instructions 2482 of FIG. 24B. The third parties may be consumers, users, retailers, OEMs, etc. that purchase and/or license the software for use and/or re-sale and/or sublicensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 25, the software distribution platform 2505 includes one or more servers and one or more storage devices that store the computer readable instructions 2482. The one or more servers of the example software distribution platform 2505 are in communication with a network 2515, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2482 from the software distribution platform 2505. For example, the software, which may correspond to example computer readable instructions, may be downloaded to the example processor platform(s), which is/are to execute the computer readable instructions 2482. In some examples, one or more servers of the software distribution platform 2505 are communicatively connected to one or more security domains and/or security devices through which requests and transmissions of the example computer readable instructions 2482 must pass. In some examples, one or more servers of the software distribution platform 2505 periodically offer, transmit, and/or force updates to the software (e.g., the example computer readable instructions 2482 of FIG. 24B) to ensure improvements, patches, updates, etc. are distributed and applied to the software at the end user devices.

In the illustrated example of FIG. 25, the computer readable instructions 2482 are stored on storage devices of the software distribution platform 2505 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 2482 stored in the software distribution platform 2505 are in a first format when transmitted to the example processor platform(s) 2510. In some examples, the first format is an executable binary in which particular types of the processor platform(s) 2510 can execute. However, in some examples, the first format is uncompiled code that requires one or more preparation tasks to transform the first format to a second format to enable execution on the example processor platform(s) 2510. For instance, the receiving processor platform(s) 2500 may need to compile the computer readable instructions 2482 in the first format to generate executable code in a second format that is capable of being executed on the processor platform(s) 2510. In still other examples, the first format is interpreted code that, upon reaching the processor platform(s) 2510, is interpreted by an interpreter to facilitate execution of instructions.

In the examples above, many references were provided to low-earth orbit (LEO) satellites and constellations. However, it will be understood that the examples above are also relevant to many forms of middle-earth orbit satellites and constellations, geosynchronous orbit satellites and constellations, and other high altitude communication platforms such as balloons. Thus, it will be understood that the techniques discussed for LEO network settings are also applicable to many other network settings.

IMPLEMENTATION METHODS AND EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is an edge virtual radio access network (vRAN) server comprising: processing circuitry to configure the edge vRAN server to: determine whether a user equipment (UE) in an aerial object is within a zone of a predetermined geographical area, the zone provided from a group of zones that includes, an inclusion zone, a mitigation zone and an exclusion zone, wherein an elevation of the UE is controllable; and in response to a determination that the UE is in the zone and the mitigation zone is the exclusion or mitigation zone, adjust at least one communication parameter of at least one cell to limit at least one of uplink or downlink terrestrial communication with the UE; and a memory configured to store characteristics of the zone.

In Example 2, the subject matter of Example 1 includes, wherein adjustment of the at least one communication parameter includes deactivation of at least one predetermined frequency band while frequency bands other than the at least one predetermined frequency band remain active.

In Example 3, the subject matter of Examples 1-2 includes, wherein adjustment of the at least one communication parameter includes reduction of a power of communications of at least one frequency.

In Example 4, the subject matter of Examples 1-3 includes, wherein adjustment of the at least one communication parameter includes adjustment of transmission angles of at least one predetermined frequency band.

In Example 5, the subject matter of Examples 1-4 includes, wherein adjustment of the at least one communication parameter includes physical adjustment of at least one phased array antenna controlled by the edge vRAN server.

In Example 6, the subject matter of Example 5 includes, wherein the physical adjustment is limited to tilting the at least one antenna downwards.

In Example 7, the subject matter of Examples 1-6 includes, wherein the processing circuitry further configures the edge vRAN server to adjust the at least one communication parameter dependent on weather proximate to the UE.

In Example 8, the subject matter of Examples 1-7 includes, wherein: the UE comprises an aircraft or drone, and adjustment of the at least one communication parameter is dependent on flight data of the UE.

In Example 9, the subject matter of Example 8 includes, wherein the processing circuitry further configures the edge vRAN server to receive real-time updates to the flight data, adjustment of the at least one communication parameter dependent on the real-time updates.

In Example 10, the subject matter of Examples 8-9 includes, wherein the processing circuitry further configures the edge vRAN server to: store data of the at least one cell in the memory, the data including active frequencies and timing of when the active frequencies are deactivated, and report the data to a governmental agency.

In Example 11, the subject matter of Examples 8-10 includes, wherein the flight data includes ground location latitude, longitude, altitude, and ground speed of the aircraft.

In Example 12, the subject matter of Examples 1-11 includes, wherein: the UE comprises an aircraft, and the processing circuitry further configures the edge vRAN server to determine whether an altimeter is in use based on weather proximate to the UE and adjust the at least one communication parameter in response to a determination that the altimeter is in use.

In Example 13, the subject matter of Examples 1-12 includes, wherein the processing circuitry further configures the edge vRAN server to determine inclusion zones, exclusion zones, and mitigation zones set by different governmental agencies and having definitions propagated to multiple airports.

In Example 14, the subject matter of Examples 1-13 includes, wherein the processing circuitry further configures the edge vRAN server to determine an inclusion zone within an exclusion or mitigation zone to adjust the at least one communication parameter of the at least one cell to permit uplink and downlink terrestrial communication with the UE.

Example 15 is a computing system, comprising: an open radio access network (O-RAN) comprising: a virtual radio access network (vRAN) central unit (vRAN-CU): a vRAN distributed unit (vRAN-DU) coupled to the vRAN-CU; and a remote radio unit (RRU) coupled to the vRAN-DU: a phased array antenna controlled by the RRU; and a memory device including instructions embodied thereon, wherein the instructions, which when executed by processing circuitry of the O-RAN, configure the processing circuitry to perform operations that: determine that an aerial device is within a terrestrial network exclusion or mitigation zone of a predetermined geographical area served by a cell; and adjust at least one characteristic of the cell to limit uplink terrestrial communication with the aerial device, the at least one characteristic provided from a group of characteristics that include, a frequency band, transmission power on the frequency band, and mechanical adjustment of the phased array antenna.

In Example 16, the subject matter of Example 15 includes, wherein the vRAN-CU, vRAN-DU, and RRU are disposed on ground.

In Example 17, the subject matter of Examples 15-16 includes, wherein the vRAN-CU is disposed on ground, and at least one of the vRAN-DU or RRU are disposed on the aerial device.

In Example 18, the subject matter of Examples 15-17 includes, wherein the memory device is configured to store a definition of the exclusion or mitigation zone and operation times of use of the exclusion or mitigation zone.

Example 19 is a method for implementing a terrestrial network exclusion zone, performed by processing circuitry of a computing device, the method comprising: determining that an aerial device is within a terrestrial network exclusion or mitigation zone of a predetermined geographical area served by a phased array antenna of a cell; and in response to determining that the aerial device is within the exclusion or mitigation zone, adjust at least one characteristic to limit uplink terrestrial communication with the aerial device, the at least one characteristic provided from a group of characteristics that include, a frequency band, transmission power on the frequency band, and mechanical adjustment of the phased array antenna.

In Example 20, the subject matter of Example 19 includes, store a definition of the exclusion or mitigation zone and operation times of use of the exclusion or mitigation zone; and report the operation times of use of the exclusion or mitigation zone to at least one governmental agency.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20. Example 24 is a method to implement of any of Examples 1-20.

Although these implementations have been described with reference to specific exemplary aspects, it will be evident that various modifications and changes may be made to these aspects without departing from the broader scope of the present disclosure. Many of the arrangements and processes described herein may be used in combination or in parallel implementations that involve terrestrial network connectivity (where available) to increase network band-width/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An edge virtual radio access network (vRAN) server comprising:

processing circuitry to configure the edge vRAN server to:

determine whether a user equipment (UE) in an aerial object is within a zone of a predetermined geographical area, the zone provided from a group of zones that includes an inclusion zone, a mitigation zone, and an exclusion zone, wherein an elevation of the UE is controllable; and in response to a determination that the UE is in the zone and the zone is the exclusion or mitigation zone, adjust at least one communication parameter of at least one cell to limit at least one of uplink or downlink terrestrial communication with the UE, adjustment of the at least one communication parameter including physical adjustment of at least one phased array antenna controlled by the edge vRAN server; and a memory configured to store characteristics of the zone.

2. The edge vRAN server of claim 1, wherein adjustment of the at least one communication parameter includes deactivation of at least one predetermined frequency band while frequency bands other than the at least one predetermined frequency band remain active.

3. The edge vRAN server of claim 1, wherein adjustment of the at least one communication parameter includes reduction of a power of communications of at least one frequency.

4. The edge vRAN server of claim 1, wherein adjustment of the at least one communication parameter includes adjustment of transmission angles of at least one predetermined frequency band.

5. The edge vRAN server of claim 1, wherein the physical adjustment is limited to tilting the at least one phased array antenna downwards.

6. The edge vRAN server of claim 1, wherein the processing circuitry further configures the edge vRAN server to adjust the at least one communication parameter dependent on weather proximate to the UE.

7. The edge vRAN server of claim 1, wherein:

the UE comprises an aircraft or drone, and adjustment of the at least one communication parameter is dependent on flight data of the UE.

8. The edge vRAN server of claim 7, wherein the processing circuitry further configures the edge vRAN server to receive real-time updates to the flight data, adjustment of the at least one communication parameter dependent on the real-time updates.

9. The edge vRAN server of claim 7, wherein the processing circuitry further configures the edge vRAN server to:

store data of the at least one cell in the memory, the data including active frequencies and timing of when the active frequencies are deactivated, and report the data to a governmental agency.

10. The edge vRAN server of claim 7, wherein the flight data includes ground location latitude, longitude, altitude, and ground speed of the aircraft.

11. The edge vRAN server of claim 1, wherein:

the UE comprises an aircraft, and the processing circuitry further configures the edge vRAN server to determine whether an altimeter is in use based on weather proximate to the UE and adjust the at least one communication parameter in response to a determination that the altimeter is in use.

12. The edge vRAN server of claim 1, wherein the processing circuitry further configures the edge vRAN server to determine inclusion zones, exclusion zones, and mitigation zones set by different governmental agencies and having definitions propagated to multiple airports.

13. The edge vRAN server of claim 1, wherein the processing circuitry further configures the edge vRAN server to determine an inclusion zone within an exclusion or mitigation zone to adjust the at least one communication parameter of the at least one cell to permit uplink and downlink terrestrial communication with the UE.

14. A computing system, comprising:

an open radio access network (O-RAN) comprising:

a virtual radio access network (vRAN) central unit (vRAN-CU);

a vRAN distributed unit (vRAN-DU) coupled to the vRAN-CU;

a remote radio unit (RRU) coupled to the vRAN-DU;

a phased array antenna controlled by the RRU; and a memory device including instructions embodied thereon, wherein the instructions, which when executed by processing circuitry of the O-RAN, configure the processing circuitry to perform operations that:

determine that an aerial device is within a terrestrial network exclusion or mitigation zone of a predetermined geographical area served by a cell; and adjust at least one characteristic of the cell to limit uplink terrestrial communication with the aerial device, the at least one characteristic provided from a group of characteristics that include a frequency band, transmission power on the frequency band, and mechanical adjustment of the phased array antenna.

15. The computing system of claim 14, wherein the vRAN-CU, vRAN-DU, and RRU are disposed on ground.

16. The computing system of claim 14, wherein the vRAN-CU is disposed on ground, and at least one of the vRAN-DU or RRU are disposed on the aerial device.

17. The computing system of claim 14, wherein the memory device is configured to store a definition of the exclusion or mitigation zone and operation times of use of the exclusion or mitigation zone.

18. A method for implementing a terrestrial network exclusion zone, performed by processing circuitry of a computing device, the method comprising:

determining that an aerial device is within a terrestrial network exclusion or mitigation zone of a predetermined geographical area served by a phased array antenna of a cell; and in response to determining that the aerial device is within the exclusion or mitigation zone, adjust at least one characteristic to limit uplink terrestrial communication with the aerial device, the at least one characteristic provided from a group of characteristics that include a frequency band, transmission power on the frequency band, and mechanical adjustment of the phased array antenna.

19. The method of claim 18, further comprising:

store a definition of the exclusion or mitigation zone and operation times of use of the exclusion or mitigation zone; and report the operation times of use of the exclusion or mitigation zone to at least one governmental agency.

20. An edge virtual radio access network (vRAN) server comprising:

processing circuitry to configure the edge vRAN server to:

determine whether a user equipment (UE) in an aerial object is within a zone of a predetermined geographical area, the zone provided from a group of zones that includes an inclusion zone, a mitigation zone, and an exclusion zone, wherein an elevation of the UE is controllable;

in response to a determination that the UE is in the zone and the zone is the exclusion or mitigation zone, adjust at least one communication parameter of at least one cell to limit at least one of uplink or downlink terrestrial communication with the UE;

determine whether a first inclusion zone is disposed within the exclusion or mitigation zone; and in response to a determination that the UE is in the first inclusion zone, further adjust the at least one communication parameter of the at least one cell to permit uplink and downlink terrestrial communication with the UE; and a memory configured to store characteristics of the zone.

21. The edge vRAN server of claim 20, wherein the processing circuitry further configures the edge vRAN server to dynamically override the exclusion or mitigation zone to institute the first inclusion zone, the override performed in real time based on emergency or broadcast purposes.

* * * * *